(12) United States Patent
Hirata et al.

(10) Patent No.: US 8,032,136 B2
(45) Date of Patent: Oct. 4, 2011

(54) SERVICE PROVIDING SYSTEM, SERVICE USING DEVICE, AND TEMPLATE TRANSMITTING DEVICE

(75) Inventors: Masafumi Hirata, Ichikawa (JP); Toru Ueda, Kyouto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1783 days.

(21) Appl. No.: 11/227,519

(22) Filed: Sep. 16, 2005

(65) Prior Publication Data
US 2006/0270387 A1  Nov. 30, 2006

Related U.S. Application Data

(60) Provisional application No. 60/685,690, filed on May 31, 2005.

(51) Int. Cl.
*H04W 4/00* (2009.01)
(52) U.S. Cl. ............... 455/432.3; 455/414.1; 455/414.3; 370/328; 370/338
(58) Field of Classification Search ............... 455/432.3, 455/414.1, 414.3; 370/328, 338
See application file for complete search history.

(56) References Cited

U.S. PATENT DOCUMENTS

| 7,236,799 B2 * | 6/2007 | Wilson et al. ............... 455/456.3 |
| 2002/0065109 A1 * | 5/2002 | Mansikkaniemi et al. ... 455/566 |
| 2003/0041123 A1 * | 2/2003 | Sato et al. ..................... 709/219 |
| 2003/0083962 A1 | 5/2003 | Araki et al. |

FOREIGN PATENT DOCUMENTS

| JP | 2001-136136 | 5/2001 |
| JP | 2001-145081 | 5/2001 |
| JP | 2002-215586 | 8/2002 |
| JP | 2003-067411 | 3/2003 |
| JP | 2003-203141 | 7/2003 |
| JP | 2004-118275 A | 4/2004 |

OTHER PUBLICATIONS

"Development of the Blog Client for Cellular Phones" M. Hirata, et al, Platform Technology Development Center, 2005.

* cited by examiner

*Primary Examiner* — Nghi Ly
(74) *Attorney, Agent, or Firm* — Birch, Stewart, Kolasch & Birch, LLP

(57) ABSTRACT

A service providing system, including a service using device; a service providing device for providing a service to the service using device, the service providing device being communicably connected to the service using device; and a template transmitting device for transmitting a template to the service using device, the template containing: transmission destination information indicating a transmission destination to which the service using device transmits data for use in authentication; and user input assisting information based on which display device either provided in the service using device or communicably connected to the service using device displays an interface for use by a service user entering data to the service using device.

15 Claims, 34 Drawing Sheets

Hot Asian Stocks=yes, Key to Success in Business=no, 123 Successful People =yes, Postal code=272-1234, Address = Motohachiman, Ichikawa , Authentication data =<auth><userid>aiueo</userid><password>%wer3234)cuj&2#4%</password></auth>,

FIG. 26 get= Buy DVD, Authentication data
=<auth><userid>aiueo</userid><password
>%wer3234)cuj&2#4%</password></auth>,

FIG. 27

OK, Template = CD purchase template.zip
(archived template data)

Template information template.xml

```
<template>
<name>Book purchase template</name>
<expireDate>2005/05/31:12:00</expireDate>
<terminalIDLimit>3434234346345</terminalIDLimit>
</template>
```

<expiryDate> specifies expiry date of template. <terminalIDlimit> specifies terminal ID capable of reproducing template.

FIG. 32 (a)

Transmission data information data.xml

```
<data param="comma_de_tsunagu">
<send name="GPS" data="getGPSData()" />
<send name="Use count" data="getNumberOfUse()" />
<send name="Authentication data" src="auth.xml" />
</data>
```

Suppose that the terminal has a function, getGPSData (), by which GPS-based location information is obtained and another function, getNumberOfUse (), by which a template use count is obtained.

If transmission data information contains a description to send the GPS-based location information and the template use count, these are sent automatically in data transmission.

FIG. 32 (b)

Example of data transmitted from template reproducing device to data receiving device GPS=ido:035°26'33'0/keido:139°37'36'1, Use count=12, Authentication data =<auth><userid>aiueo</userid><password>%wer3234)cuj&2#4%</password ></auth>,

FIG. 34 (a)

Transmission data information data.xml

```
<data param="comma_de_tsunagu">
<send name="Authentication data" src="getTerminalID()" />
</data>
```

Suppose, for example, the terminal has a function, getTerminalID (), by which a terminal ID is obtained.

If transmission data information contains a description to obtain and send a terminal ID, these are sent automatically in data transmission.

FIG. 34 (b)

Authentication data=43922349123,

FIG. 37

Transmission destination information send.xml

```
<sendto>
http://tv.votiong/service/
</sendto>
```

Authentication information auth.xml

```
<auth>
<userid></userid>
<password>password>
</auth>
```

Transmission data information data.xml

```
<data param="comma_de_tsunagu">
<send name="Voting" data="I want it." />
<send name="Authentication data" src="getTerminalID()" />
</data>
```

Transmission data information data.xml

```
<data param="comma_de_tsunagu">
<send name="Voting" data=" I don't want it." />
<send name="Authentication data " src="getTerminalID()" />
</data>
```

User input assisting information ui1.xml

```
<xhtml>
TV voting<br/>
<img ="TV" />
<send to="send.xml" data="data.xml" OK="ui2.xml" NG="ui3.xml" button="I want it. "/>
<send to="send.xml" data="data2.xml" OK="ui2.xml" NG="ui3.xml" button="I don't want it. "/>
</xhtml>
```

User input assisting information ui2.xml

```
<xhtml>
TV voting<br/>
Thank you for voting <br/>
</xhtml>
```

User input assisting information ui3.xml

```
<xhtml>
Authentication failed<br/>
<a href="terminate">End</a>
</xhtml>
```

SERVICE PROVIDING SYSTEM, SERVICE USING DEVICE, AND TEMPLATE TRANSMITTING DEVICE

This Nonprovisional application claims priority under 35 U.S.C. §119(a) on Provisional Patent Application No. 60/685,690 filed on May 31, 2005, the entire contents of which are hereby incorporated by reference.

FIELD OF THE INVENTION

The present invention relates to a service providing system made up of a service using device and a service providing device which provides services to the service using device. To describe it in more detail, the present invention relates to a service providing system, as well as a service using device and a template transmitting device used in the service providing system, which is together capable of reducing the number of communication process steps needed when utilizing services.

BACKGROUND OF THE INVENTION

There exists conventional technology enabling a service providing device on the Internet or another network to provide various services to personal computers, mobile phones, and other service using terminals connected over the network.

For example, a service provider prepares computer programs which will run on the service using terminals to carry out communication functions with the service providing device and display functions for service content. The programs are downloaded by service users to their service using terminals so that the service users can use services provided by the service providing device on the service using terminals.

In these situations, however, to change the service content, the service provider needs to revise the program which then needs to be downloaded by the service user. These procedures entail development costs of the program on the service provider and labor and communication costs for the download on the service user.

These problems are addressed by, for example, Japanese Unexamined Patent Publication 2004-118275, or Tokukai 2004-118275, published Apr. 15, 2004. The mobile terminal performs authentication by referring to service definition based on the client identity information transmitted from an external device. A result is sent to the external device. If the authentication is successful, the external device carries out processes to provide services in accordance with predetermined procedures and sends the mobile terminal manipulation requests corresponding to the service content provided. In this configuration, it is only the service definition and the external device that depend on the service content. The mobile terminal does not depend on the service content. Therefore, in the Tokukai 2004-118275 technology, the service of the mobile terminal is rewritten based on the manipulation requests transmitted from the external device. Thus, the service content is alterable without changing the structure of the mobile terminal.

Some services provided as in the above are provided only to registered users. In such services, prior to the provision of services, the service providing device typically authenticates the user based on the authentication information received from the connected service using terminal, such as a user ID (username) and a password. The services are provided only when the authentication is successful.

However, in the Tokukai 2004-118275 technology, to authenticate based on a user ID and a password, at least two rounds of communication process steps are needed between the external device and the mobile terminal before the external device receives input data entered by the service user on the mobile terminal.

Specifically, in the Tokukai 2004-118275 technology, to authenticate based on the user ID, etc., (1) the external device transmits client identity information to the mobile terminal. (2) The mobile terminal transmits an output of the authentication to the external device. (3) If the authentication is successful, the external device sends the mobile terminal manipulation requests corresponding to the service content provided. (4) The mobile terminal transmits user input data to the external device.

To implement these steps, the Tokukai 2004-118275 technology takes a long time to perform authentication based on the user ID, etc. This naturally results in high communications costs which must be borne by the service user.

SUMMARY OF THE INVENTION

In view of these problems, the present invention has an objective to reduce the number of communication process steps needed when utilizing services in a service providing system including a service using terminal and a service providing device which provides services to the service using terminal.

To solve the problems, a service providing system of the present invention is characterized as follows. The service providing system includes: a service using device; and a service providing device for providing a service to the service using device. The service providing device is communicably connected to the service using device. The service providing system includes a template transmitting device for transmitting a template to the service using device. The template contains: transmission destination information indicating a transmission destination to which the service using device transmits data for use in authentication; and user input assisting information based on which display means either provided in the service using device or communicably connected to the service using device displays an interface for use by a service user entering data to the service using device. The service using device includes: template storage means for storing the template received from the template transmitting device; user input means for receiving input operation by the service user; and data transmitting means for transmitting transmission data to the transmission destination indicated in the transmission destination information, the transmission data containing user input information entered by the service user through the user input means.

According to the configuration, the service user can implement an authentication process by entering necessary information for the authentication through the user input means and the interface displayed on the display means on the basis of the user input assisting information and transmitting the transmission data containing the entered user input information to the transmission destination indicated in the transmission destination information.

In this case, the service providing system needs to perform only two communication process steps: (1) The template transmitting means transmits the template to the service using device. (2) The service using device transmits the transmission data containing the user input information to the transmission destination indicated in the template. Aforementioned Tokukai 2004-118275 technology requires at least two rounds of (at least four) communication process steps for an authentication. On the other hand, the service providing system can perform the authentication in the two communication process steps. Thus, the authentication takes less time and reduced communications cost. The service user is charged a smaller amount of fees.

To solve the problems, a service using device of the present invention is characterized as follows. The service using device is for receiving service provision from a service providing device communicably connected thereto. The service using device includes: user input means for receiving input operation by a service user; template obtaining means for obtaining a template containing: transmission destination information indicating a transmission destination to which data for authentication is transmitted and user input assisting information based on which display means either provided in the service using device or communicably connected to the service using device displays an interface for use by the service user entering data; and data transmitting means for transmitting transmission data to the transmission destination indicated by the transmission destination information, the transmission data containing user input information entered by the service user through the user input means and basic authentication information contained in the template.

According to the configuration, the service user can implement an authentication process by entering necessary information for the authentication through the user input means and the interface displayed on the display means on the basis of the user input assisting information and transmitting the transmission data containing the entered user input information to the transmission destination indicated in the transmission destination information.

In this case, only two communication process steps need be performed between the service using device and another device: (1) The service using device obtains the template. (2) The service using device transmits the transmission data containing the user input information to the transmission destination indicated in the template. Aforementioned Tokukai 2004-118275 technology requires at least two rounds of (at least four) communication process steps for an authentication. On the other hand, the configuration can perform the authentication in the two communication process steps. Thus, the authentication takes less time and reduced communications cost. The service user is charged a smaller amount of fees.

To solve the problems, a template transmitting device of the present invention is characterized as follows. The template transmitting device includes: template storage means for storing a template containing: transmission destination information indicating a transmission destination to which a service using device for receiving service provision from a communicably connected service providing device transmits data for authentication; and user input assisting information based on which display means either provided in the service using device or communicably connected to the service using device displays an interface for use by a service user entering data to the service using device; and template transmitting means for transmitting the template stored in the template storage means to the service using device.

According to the configuration, the service user can implement an authentication process by entering necessary information for the authentication through the interface displayed on the display means on the basis of the user input assisting information and the user input means provided to the service using device and transmitting the transmission data containing the entered user input information from the service using device to the transmission destination indicated in the transmission destination information.

In this case, the service providing system containing the template transmitting device and the service using device needs to perform only two communication process steps: (1) The template transmitting means transmits the template to the service using device. (2) The service using device transmits the transmission data containing the user input information to the transmission destination indicated in the template. Aforementioned Tokukai 2004-118275 technology requires at least two rounds of (at least four) communication process steps for an authentication. On the other hand, the service providing system can perform the authentication in the two communication process steps. Thus, the authentication takes less time and reduced communications cost. The service user is charged a smaller amount of fees.

To solve the problems, another template transmitting device of the present invention is characterized as follows. The template transmitting device includes: data receiving means for receiving data from a service using device for receiving service provision from a communicably connected service providing device, the data being used in authentication of the service using device or a service user utilizing a service on the service using device; basic template information storage means for storing basic template information including: second transmission destination information indicating a transmission destination to which the service using device transmits data requesting service provision; and user input assisting information based on which display means either provided in the service using device or communicably connected to the service using device displays an interface for use by the service user entering data to the service using device; template generating means for generating a template by combining the basic template information stored in the basic template information storage means and the data received by the data receiving means; and template transmitting means for transmitting the template generated by the template generating means to the service using device.

According to the configuration, the data for use in authentication is received from the service using device. A new template is generated by combining the received data and the basic template information. The generated template is transmitted to the service using device. Thus, the template transmitted to the service using device additionally contains the user input information entered by the service user through the user input means.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 26 is an illustration depicting exemplary data transmitted from a service using terminal to a service providing device during the second-time and subsequent authentication processes in the service providing system shown in FIG. 22.

FIG. 27 is an illustration depicting exemplary data transmitted from a service providing device to a service using terminal during the second-time and subsequent authentication processes in the service providing system shown in FIG. 22.

FIG. 32(a) is an illustration depicting exemplary transmission data information contained in a regular use template used in a service providing system in accordance with an embodiment of the present invention. FIG. 32(b) is an illustration depicting exemplary data, transmitted from a service using terminal to a service providing device, which is generated on the basis of the transmission data information shown in FIG. 32(a).

FIG. 34(a) is an illustration depicting exemplary transmission data information contained in a regular use template used in a service providing system shown in FIG. 33. FIG. 34(b) is an illustration depicting exemplary data, transmitted from a service using terminal to a service providing device, which is generated on the basis of the transmission data information shown in FIG. 34(a).

FIG. 37 is an illustration depicting an exemplary regular use template used in the service providing system shown in FIG. 35.

DESCRIPTION OF THE EMBODIMENTS

Embodiment 1

Figure 2:
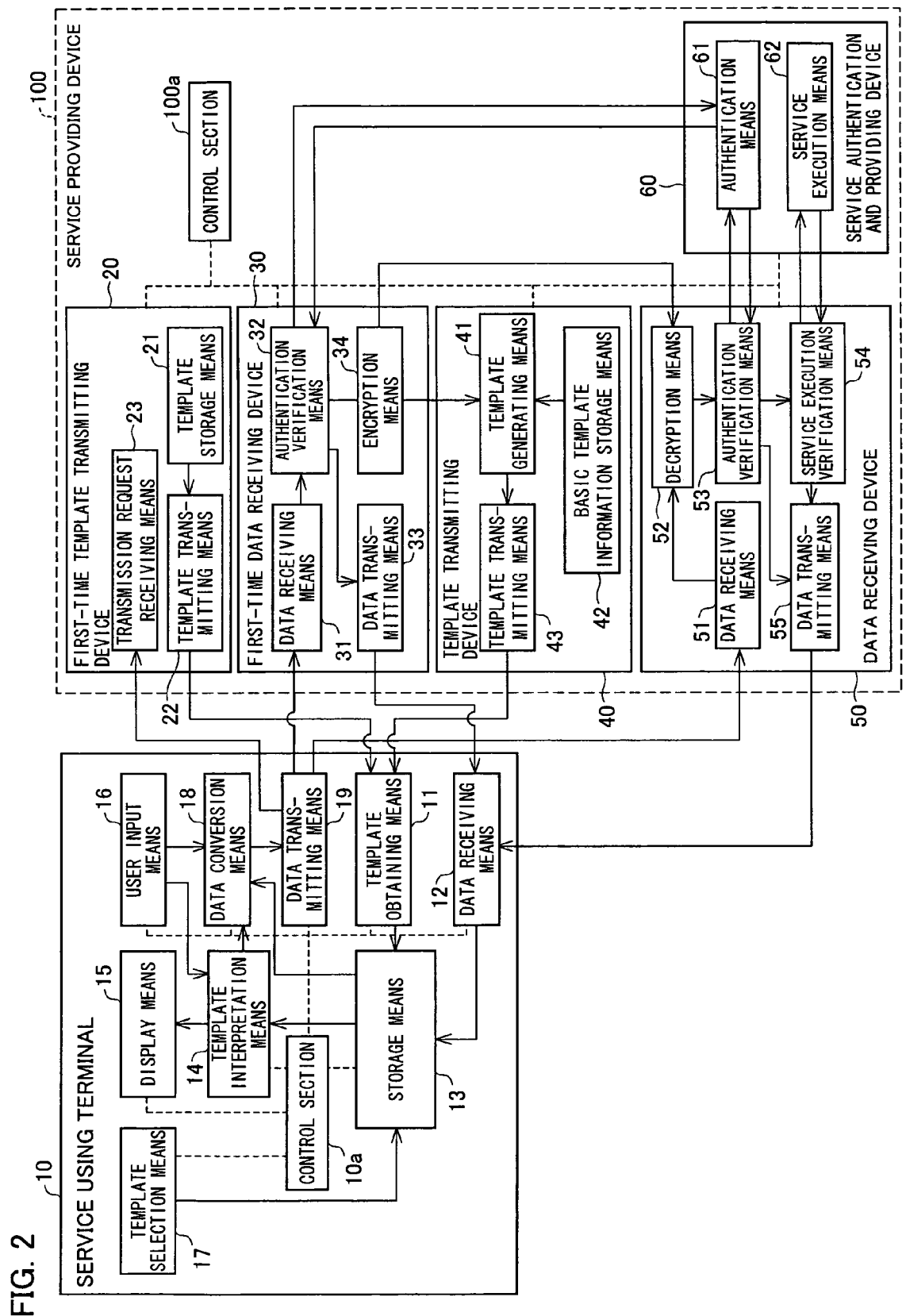
FIG. 2 is a block diagram depicting the configuration of a service using terminal and a service providing device in a service providing system in accordance with an embodiment of the present invention.
Figure 3:
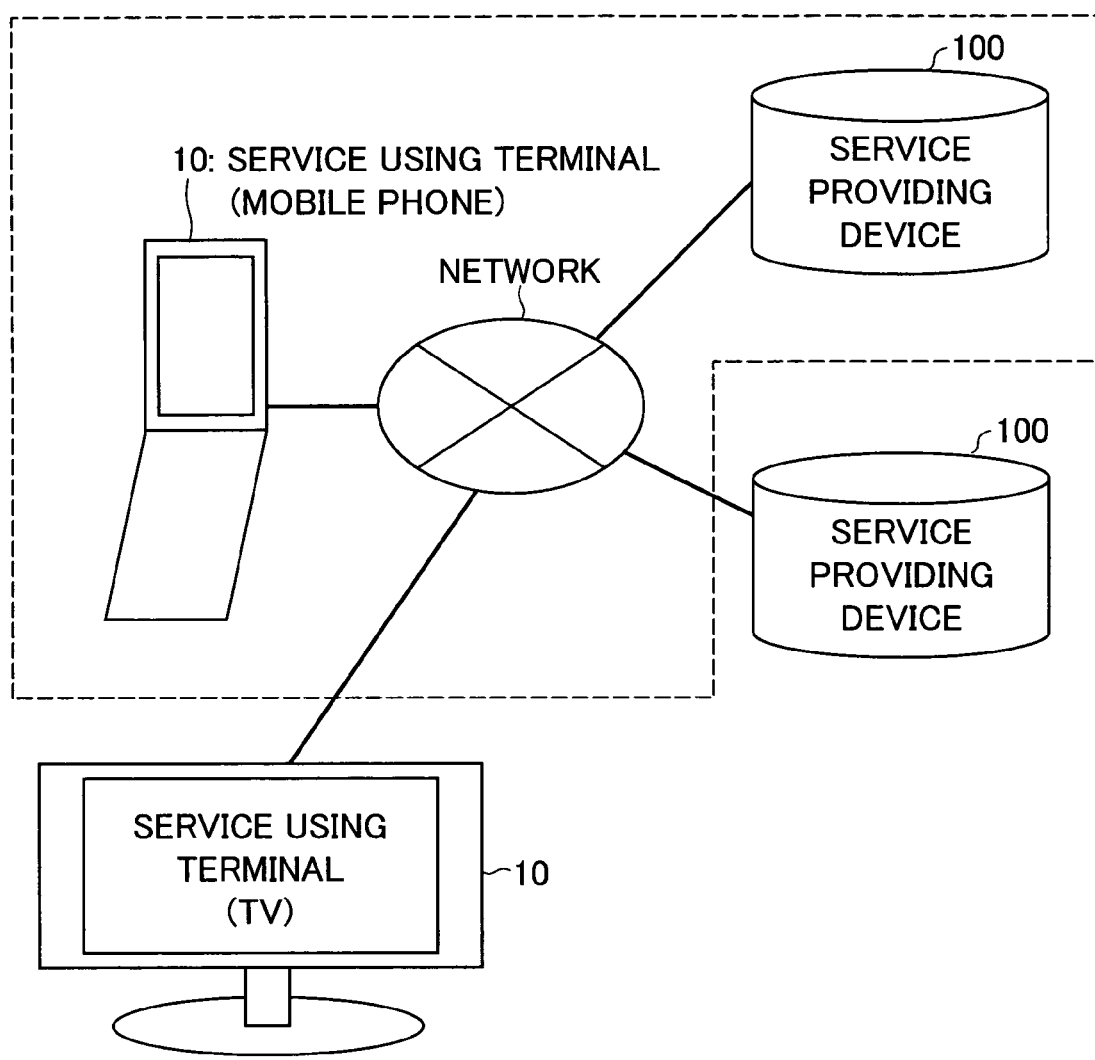
FIG. 3 is a schematic illustration of the configuration of a service providing system in accordance with an embodiment of the present invention.

An embodiment of the present invention will be described. FIG. 2 is a block diagram depicting the configuration of a service using terminal (template reproduction device, service using device) 10 and a service providing device 100 in a service providing system 1 in accordance with an embodiment of the present invention. FIG. 3 is a schematic illustration of the configuration of the service providing system 1.

Referring to FIG. 3, the service providing system 1 includes a service using terminal 10 and service providing devices 100 which are connected over the Internet or another network in a communicable manner. The service using terminal 10 is, for example, a mobile phone or a television.

Still referring to FIG. 3, multiple service providing devices 100 are present on the network. Each service providing device 100 is set up to provide pre-designated services to the service using terminal 10. The individual service providing device 100 in advance contains service content to be provided. On the service using terminal 10, a service user requests the service providing device 100 which provides a desired service to provide that service, so that the user can utilize the service.

The service providing devices 100 do not necessarily connect to the network. One or more service using terminals 10 may utilize a service(s) provided by one service providing device 100. For example, the service providing device 100 may be a consumer electronics device (television, radio, and wired broadcast receiver, video and sound recorder/player, telephone, facsimile, etc.) which provides an electronic service for use on a service using terminal 10 which is communicable, whether wired or wireless, with the service providing device 100.

Possible examples of the services provided by the service providing device 100 (or service providing device 300) include blog or weblog browsing services (generic name for Web sites which are updated on a daily basis like diaries); blog message-posting services; book information providing services providing an author name, publisher name, price, and other book information; price comparison services giving price comparison of commercial goods; commercial goods purchasing services purchasing commercial goods (for example, books, DVDs, CDs); online storage services storing images, photographs, etc. uploaded from information terminal devices; and voting services which enabling the transmission of answers (votes) to questionnaires from the service using terminal. These services are mere examples provided by the service providing device(s) 100. Other great varieties of services are also possible.

The service providing device 100 provides services to only users and service using terminals who meet predetermined conditions (for example, those having completed registration in advance). Prior to the provision of a service, the device 100 authenticates the user or the service using terminal on the basis of authentication information, such as a user ID (username), password, and terminal ID, received from the service using terminal 10. The device 100 provides the service only when the authentication is successful.

Now moving to FIG. 2, the service using terminal 10 includes a control section 10a, template obtaining means 11, data receiving means 12, storage means 13, template interpretation means 14, display means 15, user input means 16, template selection means 17, data conversion means 18, and data transmitting means 19.

The control section 10a, being the core of the service using terminal 10, controls the operation of the members in the service using terminal 10. The service using terminal 10 includes a ROM and a RAM (neither shown). The ROM contains various computer programs so that they are available for use by the control section 10a. The RAM temporarily contains various information for use by the control section 10a. The control section 10a loads computer programs from the ROM to the RAM.

The template obtaining means 11 obtains a template by receiving it from the service providing device 100. To describe it in more detail, the template obtaining means 11 obtains a first-time template (first-time authentication template) as it is transmitted from the service providing device 100 (first-time template transmitting device 20). The means 11 also obtains a regular use template as it is. transmitted from the service providing device 100 (template transmitting device 40). Also, the template obtaining means 11 stores the obtained template (first-time template, regular use template) in the storage means 13.

A template here is a collection of the following essential data for the service user to utilize the services provided by the service providing device 100 on the service using terminal 10: (1) transmission destination information needed when transmitting data from the service using terminal 10, (2) basic authentication information by which to identify and authenticate the user or the service using terminal, and (3) user input assisting information based on which to display service-related information and an interface which enables the service user to input data.

The template may contain various data (e.g., audio, graphical, video) in accordance with the services provided, as well as the transmission destination information, the basic authentication information, and the user input assisting information.

The transmission destination information is information by which are identified the protocol for data transmission from the service using terminal 10 and the address of a transmission destination. The transmission destination information may be, for example, a URL, an email address, a telephone number, a terminal ID (transmission destination device ID), an SIM card (FOMA card) ID, a content ID, a template ID, a Universal Description, Discovery and Integration (UDDI), or service search conditions. Two or more of these items may be used in combination.

The basic authentication information is information by which to identify the user of a service (service user) or the service using terminal and to determine whether the service user or service using terminal has a right to utilize the service. The basic authentication information is, for example, a user ID, a password, or a terminal ID (that of the service using terminal). The basic authentication information may be partially or entirely encrypted for use. The basic authentication information may be partially or entirely encrypted before embedded in the template.

The user input assisting information may be, for example, given in XHTML, SMIL, SVG, or any of their combinations. The user input assisting information may include an interactive description by which the display means shows items the service user needs to fill in so that the service user can make necessary entries under the items in accordance with the displayed information.

The data receiving means 12 obtains incoming data from the service providing device 100 (first-time data receiving device 30) and the service providing device 100 (data receiving device 50). The data receiving means 12 also stores the obtained data in the storage means 13.

The storage means 13, as mentioned above, is a memory which records the templates (first-time and regular use templates) obtained by the template obtaining means 11 and the data obtained by the data receiving means 12, for example. The storage means 13 also contains computer programs which interprets and reproduces the templates.

Figure 4:
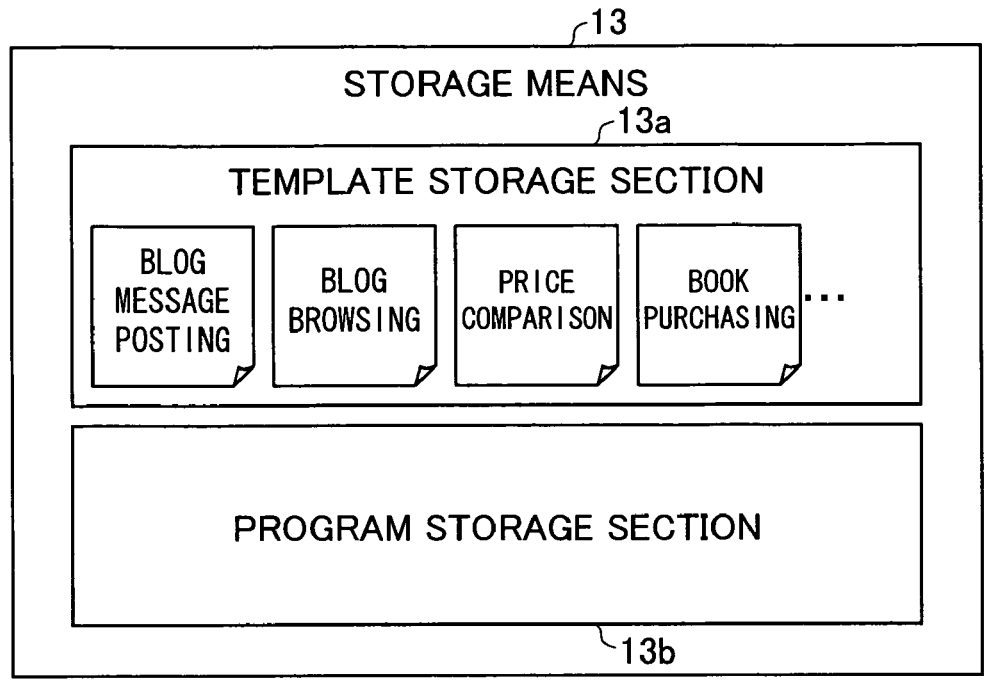
FIG. 4 is an illustration of the structure of storage means in a service using terminal in a service providing system in accordance with an embodiment of the present invention.

FIG. 4 is an illustration of the structure of the storage means 13. As shown in the figure, the storage means 13 has a template storage section 13*a* and a program storage section 13*b*.

The template storage section 13*a* records the templates provided for various services (blog message-posting services, blog browsing services, price comparison services, book purchasing services in the FIG. 4 example) from the service providing devices 100. The service using terminal 10 can add, to the content of the template storage section 13*a*, new templates obtained by downloading from a Web page or receiving an electronic file with an attached template, for example.

The program storage section 13*b* records computer programs which interprets (analyzes) and reproduces the templates. The service templates are not computer programs, but data. Each template can be interpreted and reproduced by a single computer program.

Figure 5:
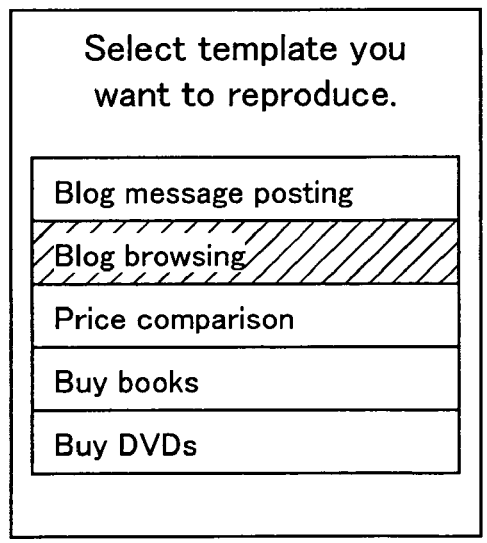
FIG. 5 is an illustration of an example of a template selection screen shown on display means of a service using terminal in a service providing system in accordance with an embodiment of the present invention.

The template selection means 17 causes the display means 15 to display a list of services (template selection screen) for which the templates are stored in the storage means 13. FIG. 5 is an example of the template selection screen shown on the display means 15 by the template selection means 17. The service user can select a desired service template on the template selection screen using the user input means 16. The service user can select by the template selection means 17 a service template he wants to use on the template selection screen produced by the display means 15.

The template interpretation means 14 interprets the template recorded in the storage means 13 for display on the display means 15 or transfer to the data conversion means 18. Specifically, the template interpretation means 14 retrieves from the program storage section 13*b* in the storage means 13 a template interpreting and reproducing program. Using this program, the means 14 interprets the template for display on the display means 15. Alternatively, the means 14 transfers an output of the interpretation to the data conversion means 18. Also, the template interpretation means 14 can associate data inputs via the user input means 16 with the template content for display on a part of the display means 15.

The display means 15 displays various information including the template as it is interpreted by the template interpretation means 14 and data inputs by the service user.

The user input means 16 allows the service user to enter various commands. For example, the service using terminal 10 may be provided with user input means 16 with multiple keys (operation buttons). This is achieved by enabling the service user to enter letters, numbers, and symbols and/or select from various processes executed on the service using terminal 10 through the manipulation of combinations of these keys, for example. The user input means 16 is by no means limited in terms of its structure: the means 16 may be, for example, a keyboard, a mouse pointer, a jog dial, a pen input device, or a touch panel. The means 16 may allow for oral inputs. These input means may be integrated into the service using terminal 10 or connected to the service using terminal 10 over a wired or wireless link.

The data conversion means 18 converts the data including the template contained in the storage means 13 and the service user inputs using the user input means 16 into a format for transmission to the service providing device 100 (first-time data receiving device 30, data receiving device 50). When information is included as to -a template conversion method, the data is converted based on that information.

The data transmitting means 19 transmits the data converted by the data conversion means 18 to the service providing device 100 (first-time data receiving device 30, data receiving device 50).

The service providing device 100, as shown in FIG. 2, includes a control section 100*a*, the first-time template transmitting device (template transmitting device) 20, the first-time data receiving device (template transmitting device, second template transmitting device) 30, the template transmitting device 40, the data receiving device 50, and a service authentication and providing device 60.

The control section 100*a*, being the core of the service providing device 100, controls the operation of the members in the service providing device 100. The service providing device 100 includes a ROM and a RAM (neither shown). The ROM contains various computer programs so that they are available for use by the control section 100*a*. The RAM temporarily contains various information for use by the control section 10*a*. The control section 100*a* loads programs from the ROM to the RAM.

The first-time template transmitting device 20 includes template storage means 21, template transmitting means 22, and transmission request receiving means 23.

The template storage means 21 contains a first-time template. The first time template contains (1) transmission destination information needed when transmitting data from the service using terminal 10 to the first-time data receiving device 30 (for example, the URL of the first-time data receiving device 30), (2) part of basic authentication information by which to identify and authenticate the user or the service using terminal (for example, a user ID), and (3) user input assisting information based on which to display service-related information and an interface which enables the service user to input data. The first-time template may contain information to be included in the converted data (elements transmitted as conversion data from the service using terminal 10 to the service providing device 100 (first-time data receiving device 30)), a conversion method, etc. which will be needed when the data is converted by the data conversion means 18 in the service using terminal 10.

The transmission request receiving means 23 receives a transmission request for the first-time template from the service using terminal 10.

As the transmission request receiving means 23 receives a transmission request for the first-time template from the service using terminal 10, the template transmitting means 22 retrieves the first-time template from the template storage means 21 for transmission to a specified service using terminal 10. The present embodiment presumes that a transmission request for the first-time template is sent from the service using terminal 10 to the first-time template transmitting device 20. Alternatives are also possible: for example, the transmission request may be transmitted for the service using terminal 10 from a device communicable with the first-time template transmitting device 20 to the first-time template transmitting device 20. Another possibility is to equip the first-time template transmitting device 20 with command input means (not shown) where external command inputs are received so that the first-time template can be transmitted to the specified service using terminal 10 via the command input means.

The first-time data receiving device 30 includes data receiving means 31, first-time authentication verification means 32, data transmitting means 33, and encryption means 34.

The data receiving means 31 receives data from the service using terminal 10 and transfers the received data to the first-time authentication verification means 32. The data includes basic authentication information by which to identify and authenticate the user.

The first-time authentication verification means 32 transfers to the authentication means 61 in the service authentication and providing device 60 the basic authentication information contained in the data transmitted from the service using terminal 10. The means 32 also receives an output of the authentication from the authentication means 61 in the service authentication and providing device 60. If the authentication is a failure, the means 32 sends an authentication failure signal to the data transmitting means 33. If the authentication is successful, the means 32 sends the basic authentication information to the encryption means 34.

As the data transmitting means 33 receives an authentication failure signal from the first-time authentication verification means 32, the means 33 responds by transmitting data indicating an authentication failure to the service using terminal 10.

Having received the basic authentication information from the first-time authentication verification means 32, the encryption means 34 encrypts part or the entirety of the basic authentication information. The means 34 transfers this partially or entirely encrypted basic authentication information (encrypted authentication information) to template generating means 41 in the template transmitting device 40. Also, the means 34 transfers necessary information to decrypt the encrypted authentication information to decryption means 52 in the data receiving device 50.

If the basic authentication information does not need to be encrypted, the encryption means 34 and the decryption means 52 are omittable. When this is the case, the basic authentication information for which the authentication has been successful is transferred from the first-time authentication verification means 32 to the template generating means 41. The present embodiment presumes that the encryption means 34 is provided in the first-time data receiving device 30. Alternatively, the encryption means 34 may be provided in the template transmitting device 40.

The template transmitting device (template transmitting device, second template transmitting device) 40 includes the template generating means 41, basic template information storage means 42, and template transmitting means 43.

The basic template information storage means 42 contains basic template information which gives a proto-template from which the template generating means 41 generates a template. A template contains a complete set of all of transmission destination information, basic authentication information, and user input assisting information, whereas the basic template information lacks part or the entirety of any of these three types of information. Typically, the basic authentication information is partly missing, which is presumed in the present embodiment.

The template generating means 41 retrieves the basic template information from the basic template information storage means 42. The means 41 then combines the retrieved basic template information with the basic authentication information received from the encryption means 34 in the first-time data receiving device 30 to generate a template (regular use template). In other words, the template generating means 41 generates a template by making up for the missing part of the basic template information stored in the basic template information storage means 42 with the basic authentication information received from the encryption means 34 in the first-time data receiving device 30. The means 41 transfers the generated template to the template transmitting means 43.

To sum up the above description, the service user enters authentication information to the service using terminal 10. In the service providing device 100, the first-time data receiving device 30 receives basic authentication information including the authentication information. The service authentication and providing device 60 authenticates based on the basic authentication information. If the authentication is successful, the basic authentication information is either partly or entirely encrypted by the encryption means 34 in the first-time data receiving device 30. A template is generated from the encrypted basic authentication information and the basic template information.

The template transmitting means 43 transmits the template generated by the template generating means 41 to the service using terminal 10 (template obtaining means 11 in the service using terminal 10).

The data receiving device 50 includes data receiving means 51, the decryption means 52, authentication verification means 53, service execution verification means 54, and data transmitting means 55.

The data receiving means 51 receives data from the service using terminal 10 to transfer the received data to the decryption means 52. If the decryption means 52 is omitted as mentioned earlier, the data receiving means 51 transfers the data received from the service using terminal 10 to the authentication verification means 53.

The decryption means 52 decrypts the encrypted authentication information contained in the data transmitted from the service using terminal 10. The means 52 then sends an output of the decryption to the authentication verification means 53. Specifically, the decryption means 52 is equipped with storage means (not shown) which contains necessary information to decrypt the encrypted authentication information received from the encryption means 34 in the first-time data receiving device 30. If the data receiving means 51 receives information containing the encrypted authentication information from the service using terminal 10, the means 52 decrypts the encrypted authentication information using the information contained in the storage means.

The authentication verification means 53 transfers the basic authentication information decrypted by the decryption means 52 to the authentication means 61 in the service authentication and providing device 60. The means 53 also receives the output of the authentication from the authentication means 61 in the service authentication and providing device 60. If the authentication is a failure, the means 53 sends an authentication failure signal to the data transmitting means 55. In contrast, if the authentication is successful, the means 53 sends the data received from the service using terminal 10 to the service execution verification means 54.

Based on the data received from the service using terminal 10, the service execution verification means 54 requests the service execution means 62 in the service authentication and providing device 60 to provide the service requested by the service user. The means 54 also obtains the service content as provided by the service execution means 62 in the service authentication and providing device 60 in accordance with the request, and transfers the obtained service content to the data transmitting means 55.

If the data transmitting means 55 has received an authentication failure signal from the authentication verification means 53, the means 55 responds by transmitting authentication failure data to the service using terminal 10. In contrast, if the means 55 has received the service content from the service execution verification means 54, the means 55 transmits the service content to the service using terminal 10.

The service authentication and providing device (service providing device) 60 includes the authentication means 61 and the service execution means 62.

The authentication means 61 checks if the user or the service using terminal 10 making the service provision request matches with a user predesignated (registered) as a user or a service using terminal for which the service provision is authorized. Specifically, the authentication means 61 checks if the basic authentication information (user ID, password) contained in the data received from the service using terminal 10 matches with basic authentication information, contained in authentication information storage means (not shown), which is predesignated as a user or a service using terminal for which the service provision is authorized. If the two sets of information match up, the user making the service provision request is authenticated as a user for whom the service provision is authorized.

The service execution means 62 provides the service content to users for whom service provision is authorized. Specifically, the means 62 transmits the service content to the service execution verification means 54 if the service execution verification means 54 in the data receiving device 50 requests service provision (the service execution verification means 54 does so if the authentication means 61 has been successful in the authentication).

Next, the service providing system 1 will be described in terms of its operation. In the description, the invention is applied to "recommended book purchasing services," as an example, where the service providing device 100 provides recommended book information to the service using terminal 10 every week and enables the service user to select and buy a desired book from the recommend ones.

Figure 6:
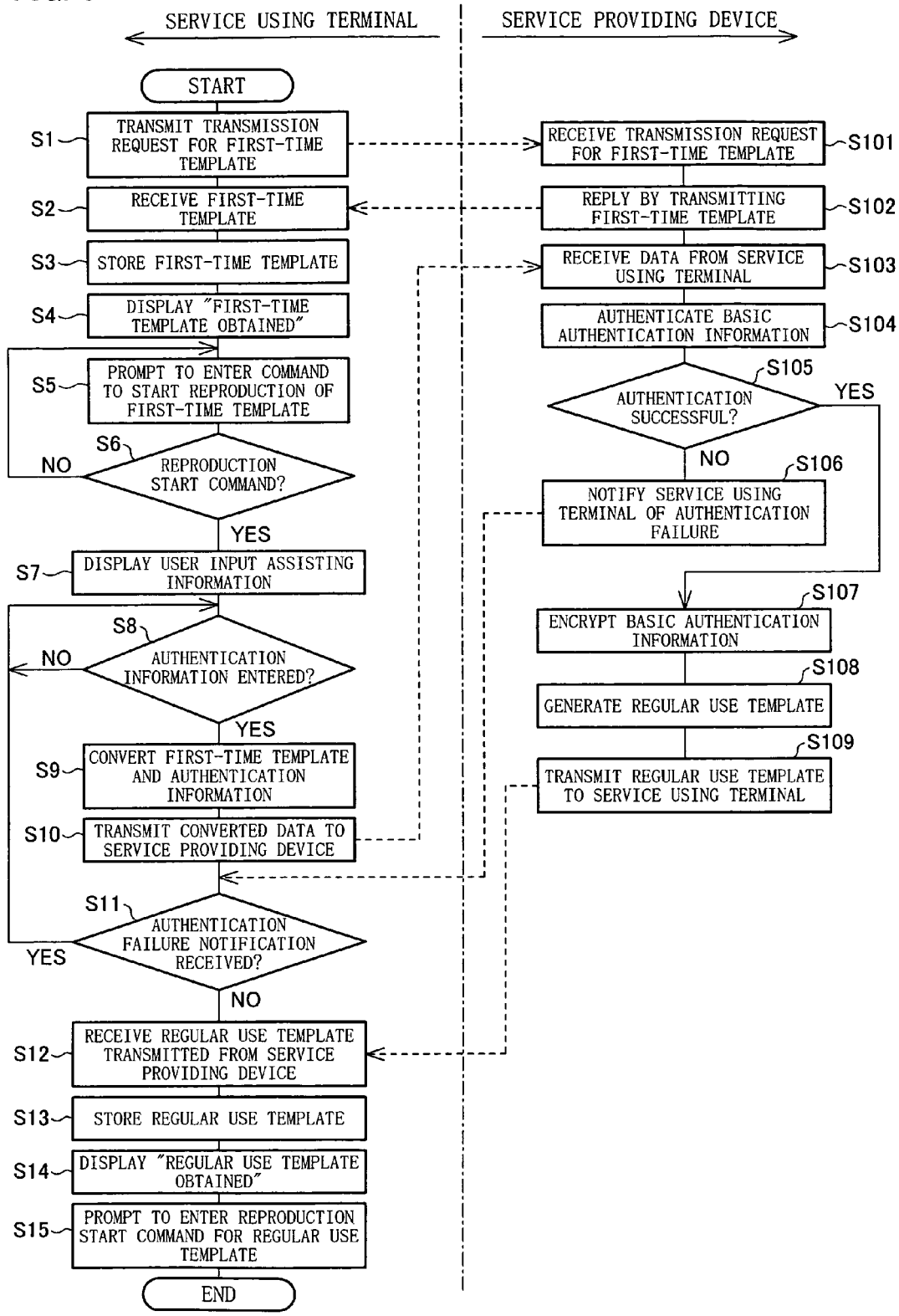
FIG. 6 is a flow diagram depicting steps of a first-time authentication process in a service providing system in accordance with an embodiment of the present invention.

A first-time authentication process will be described. FIG. 6 is a flow diagram depicting steps of the first-time authentication process in the service providing system 1. FIGS. 7(a) to 7(d) are illustrations of screen displays by the display means 15 in the service using terminal 10 during the first-time authentication process. FIG. 7(e) is an illustration of the structure of the first-time template used in the first-time authentication. FIG. 7(f) is an illustration of the structure of a regular use template generated if the first-time authentication is successful.

First, in accordance with a service user command entered through the user input means 16, the control section 10a in the service using terminal 10 transmits a transmission request for a first-time template for a desired service to the first-time template transmitting device 20, in the service providing device 100, which contains the first-time template for the service (S1).

The transmission request may be directly transmitted from the service using terminal 10 to the first-time template transmitting device 20. Alternatively, the request may be transmitted from the service using terminal 10 to the first-time template transmitting device 20 via other devices. For example, the transmission request may be transmitted from the service using terminal 10 to the first-time template transmitting device 20 containing first-time templates for the recommended book purchasing services when the service user, using the service using terminal 10, accesses a Web site where information on the recommended book purchasing services is publicly available and selects an Obtain Recommended Book Purchase Template button (see FIG. 7(a)) at the Web site.

As the transmission request receiving means 23 in the first-time template transmitting device 20 receives the transmission request for the first-time template (S101), the template transmitting means 22 retrieves the first-time template from the template storage means 21 where the template resides. The means 22 then responds by transmitting the retrieved the first-time template to the service using terminal 10 (S102). The means 22 carries out these series of actions under the control of the control section 100a in the service providing device 100.

FIG. 7(e) is an illustration of an example of the first-time template transmitted from the first-time template transmitting device 20 to the service using terminal 10. As shown in the figure, the first-time template contains transmission destination information, basic authentication information, and user input assisting information. The example shows a user ID as part of the basic authentication information; this is not the only possibility. For example, the first-time template may contain no basic authentication information at all so that the service user can enter a user ID from the service using terminal 10 during the first-time authentication.

As the template obtaining means 11 receives/obtains the first-time template transmitted from the first-time template transmitting device 20 (S2), the control section 10a in the service using terminal 10 stores the obtained first-time template in the template storage section 13a in the storage means 13 (S3). The control section 10a then displays on the display means 15 information indicating that the first-time template has been obtained (S4). The section 10a also displays on the display means 15 information prompting the service user to enter a command to start the reproduction of the first-time template (S5).

The information indicating that the first-time template has been obtained and the information prompting the service user to enter a command to start the reproduction of the first-time template may be displayed concurrently. In addition, for example, a button to start the reproduction of the first-time template may be displayed as the information prompting the service user to enter a reproduction start command for the first-time template. FIG. 7(e) shows an exemplary screen display by the display means 15 in this case. In this FIG. 7(e) example, the service user can initiate the reproduction of the first-time template by selecting a Reproduce Template button on the user input means 16. The present embodiment presumes that the service user enters the command for the reproduction of the first-time template. This is not the only possibility. For example, when the first-time template is obtained, the reproduction of the obtained first-time template may be automatically started.

Next, the control section 10a determines whether there has been a reproduction start command for the first-time template (whether there has been received a reproduction start command) (S6). If there has been no reproduction start command, the section 10a continues with S5 where it waits for a reproduction start command.

In contrast, if there has been a reproduction start command, the control section 10a reproduces the first-time template in the template interpretation means and displays the user input assisting information contained in the first-time template on the display means 15 (S7). The user input assisting information contains information based on which to display an interface enabling the service user to enter data. FIG. 7(c) is an illustration depicting an example of the user input assisting information displayed in S7. The figure shows that in S7, the display means 15 displays as the user input assisting information an interface which enables the service user to enter a password for an authentication, for example.

The template interpretation means 14 may superimpose the input information on the screen display produced based on the user input assisting information if the service user has entered authentication information (here, a password) via the user input means 16. For example, if the letters, numbers, symbols, etc. making up a password are entered through the user input means 16, the template interpretation means 14 may sequentially display the entered letters, numbers, symbols, etc. in the password box as shown in FIG. 7(c). Alternatively, to prevent people nearby from sneaking a look at the entered password, symbols (for example, black dots) may be displayed in accordance with the number of entered letters, numbers, and symbols, instead of the entered letters, numbers, symbols, etc. being displayed as they are.

Next, the control section 10a determines whether the necessary authentication information (authentication information that the first-time template specifies that the service user must enter) has been all entered on the user input means 16 (S8). If not all the necessary authentication information is entered, the section 10a continues standing by until the entering of the basic authentication information is completed.

In contrast, if all the necessary authentication information is entered, the control section 10a instructs the data conversion means 18 to convert the first-time template contained in the storage means 13 and the authentication information entered on the user input means 16 to a data format for transmission to the service providing device 100 (S9). The first-time template contains elements transmitted as conversion data to the service providing device 100 (information included in the converted data) and a conversion method.

Next, the control section 10a instructs the data transmitting means 19 to transmit the data converted by the data conversion means 18 to the service providing device 100 (S10). Here, the data is transmitted to a transmission destination in accordance with the transmission destination information in the first-time template, that is, the first-time data receiving device 30.

Figure 1:
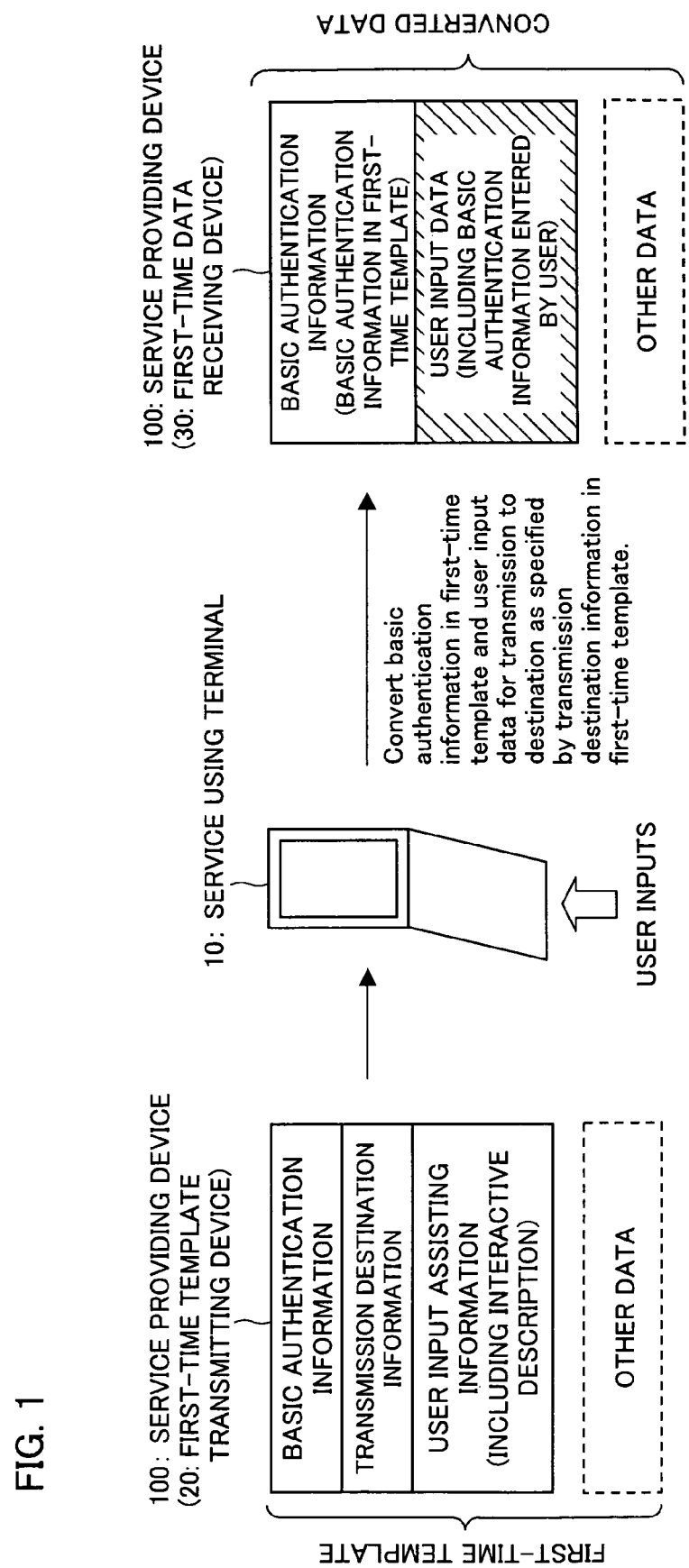
FIG. 1 is a schematic illustration of the structure of the data exchanged between a service providing device 100 and a service using terminal 10 in a first-time authentication process in a service providing system in accordance with an embodiment of the present invention.

FIG. 1 is a schematic illustration of the structure of the first-time template transmitted from the service providing device 100 to the service using terminal 10 and the data transmitted from the service using terminal 10 to the service providing device 100 in the first-time authentication. In the service providing system in accordance with the present embodiment, as shown in the figure, the first-time template is transmitted from the service providing device 100 (first-time template transmitting device 20) to the service using terminal 10. The first-time template contains the basic authentication information, the user input assisting information, and the transmission destination information. The service using terminal 10 converts the information (basic authentication information, etc.) in the received first-time template and the authentication information and other data entered by the service user (user) before transmitting to the service providing device 100 (first-time data receiving device 30). The elements transmitted as the conversion data to the service providing device 100 and a conversion method are described in the first-time template.

As the data receiving means 31 in the first-time data receiving device 30 receives the data transmitted in S10 from the service using terminal 10 (S103), the control section 100a in the service providing device 100 instructs the authentication means 61 in the service authentication and providing device 60 to authenticate the basic authentication information, inclusive of the authentication information entered by the service user, which is contained in the received data (S104).

Specifically, the control section 100a instructs the first-time authentication verification means 32 to extract the basic authentication information from the received data and transfer the extracted basic authentication information to the authentication means 61 in the service authentication and providing device 60. The authentication means 61 checks if the basic authentication information contained in the data from the service using terminal 10 matches with the basic authentication information, contained in the authentication information storage means (not shown), which is predesignated as a user or a service using terminal fro which the service provision is authorized. If the two sets of information match up, the user or service using terminal making the service provision request is authenticated as a user for whom the service provision is authorized. In contrast, if the two sets of information do not match up, the means 61 determines that the authentication has failed. The authentication means 61 transfers an authentication process output to the first-time authentication verification means 32.

Next, the control section 100a determines whether the authentication has been successful (S105). If the authentication is determined to have been a failure, the section 100a notifies the service using terminal 10 by transmitting data indicating the authentication failure from the first-time authentication verification means 32 via the data transmitting means 33 (S106).

In contrast, if the authentication has been successful, the control section 100a instructs the encryption means 34 to partly or entirely encrypt the basic authentication information for which the authentication has been successful (the basic authentication information contained in the data received from the service using terminal 10 in S103) (S107). Specifically, the control section 100a instructs the first-time authentication verification means 32 to transfer the data received from the service using terminal 10 in S103 to the encryption means 34. The section 100a then instructs the encryption means 34 to partly or entirely encrypt the basic authentication information (here, a password) contained in the data. The section 100a causes the data including the encrypted basic authentication information (encrypted authentication information) to be transferred from the encryption means 34 to the template generating means 41 in the template transmitting device 40. The section 100a also causes the information needed in decrypting the encrypted information to be transferred to the decryption means 52 in the data receiving device 50.

Next, the control section 100a instructs the template generating means 41 in the template transmitting device 40 to generate a regular use template (S108). Specifically, the control section 100a instructs the template generating means 41 to retrieve the basic template information stored in the basic template information storage means 42 and generate information containing the retrieved basic template information containing the encrypted authentication information received from the encryption means 34.

FIG. 7(f) is an illustration depicting an example of the regular use template generated by the template generating means 41. The figure shows that the regular use template contains an encryption password, as well as the user ID, as the basic authentication information. The FIG. 7(f) example shows both a regular use template and a first-time template (details of which are not shown in FIG. 7(f)); after the regular use template is generated, however, the first-time template may be deleted.

The transmission destination information in the regular use template differs from the transmission destination information in the first-time template. The transmission destination information in the first-time template is transmission destination information for a data transmission from the service using terminal 10 to the first-time data receiving device 30 (for example, the URL of the first-time data receiving device 30). Meanwhile, the transmission destination information in the regular use template is transmission destination information for a data transmission from the service using terminal 10 to the data receiving device 50 (for example, the URL of the data receiving device 50).

Next, the control section 100a causes the regular use template generated by the template generating means 41 to be transmitted by the template transmitting means 43 to the service using terminal 10 (S109).

The control section 10a in the service using terminal 10 determines whether an authentication failure notification has been received from the service providing device 100 (S11). If an authentication failure notification has been received, S8 and its subsequent steps are repeated.

In contrast, if no authentication failure notification has been received, the control section 10a instructs the template obtaining means 11 to receive/obtain the regular use template transmitted from the template transmitting device 40 (S12). Then, the section 10a stores the obtained regular use template in the template storage section 13a in the storage means 13 (S13).

Next, the control section 10a displays on the display means 15 information indicating that the regular use template has been obtained (S14). The section 10a also displays on the display means 15 information prompting the service user to enter a reproduction start command for the regular use template (S15). This ends the first-time authentication process in the service providing system 1.

Figure 7:
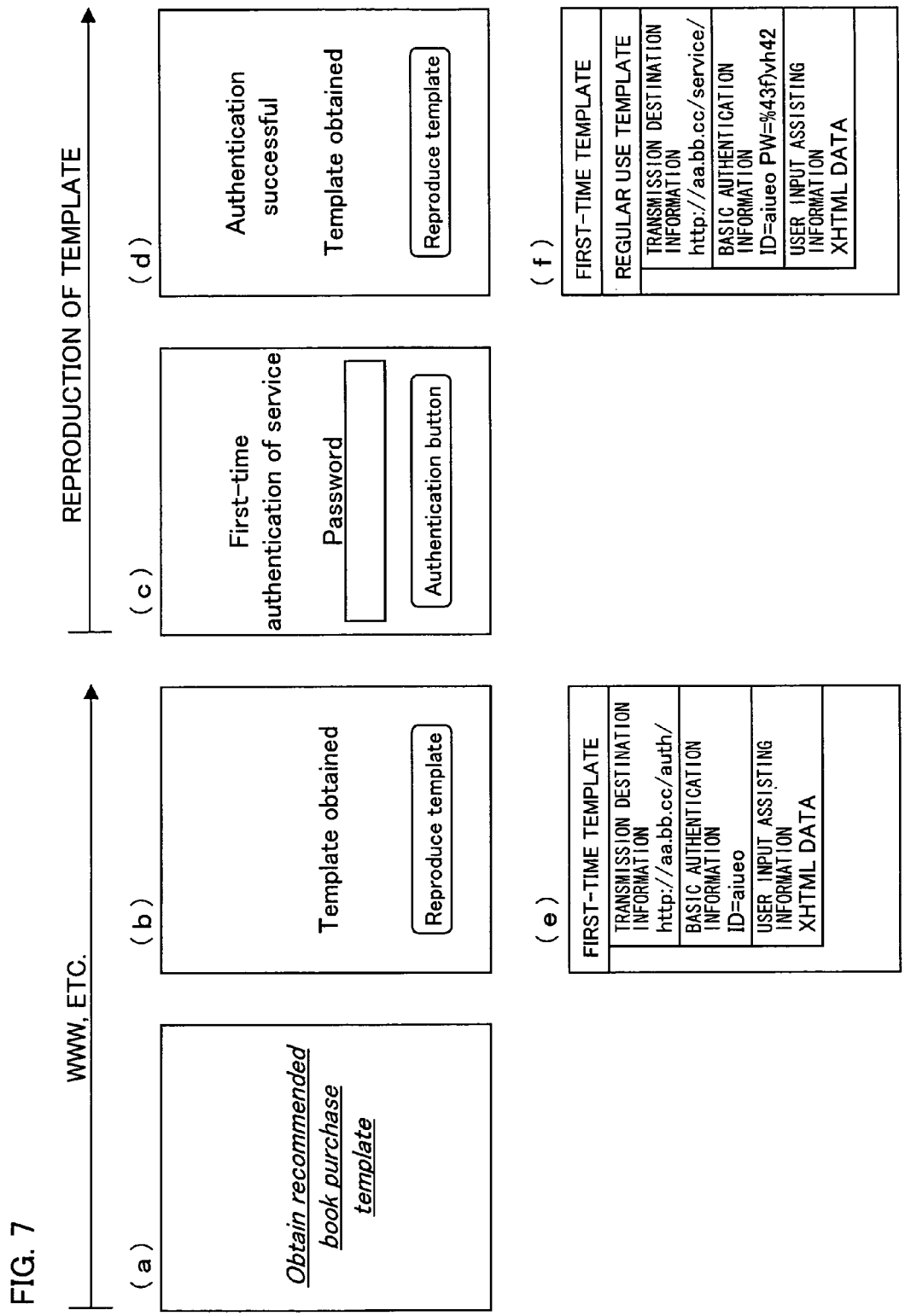
FIGS. 7(a) to 7(d) are illustrations of screen displays by display means of a service using terminal in a service providing system in accordance with an embodiment of the present invention during a first-time authentication process.
FIG. 7(e) is an illustration of the structure of a first-time template used in a first-time authentication in a service providing system in accordance with an embodiment of the present invention.
FIG. 7(f) is an illustration of the structure of a regular use template generated if the first-time authentication is successful in a service providing system in accordance with an embodiment of the present invention.

The information indicating that the regular use template has been obtained and the information prompting the service user to enter a reproduction start command for the regular use template may be displayed concurrently. In addition, a button to start the reproduction of the regular use template may be displayed as the information prompting the service user to enter a reproduction start command for the regular use template. FIG. 7(*d*) shows an exemplary screen display by the display means 15 in this case. In this FIG. 7(*d*) example, the service user can initiate the reproduction of the regular use template by selecting a Reproduce Template button on the user input means 16.

Figure 8:
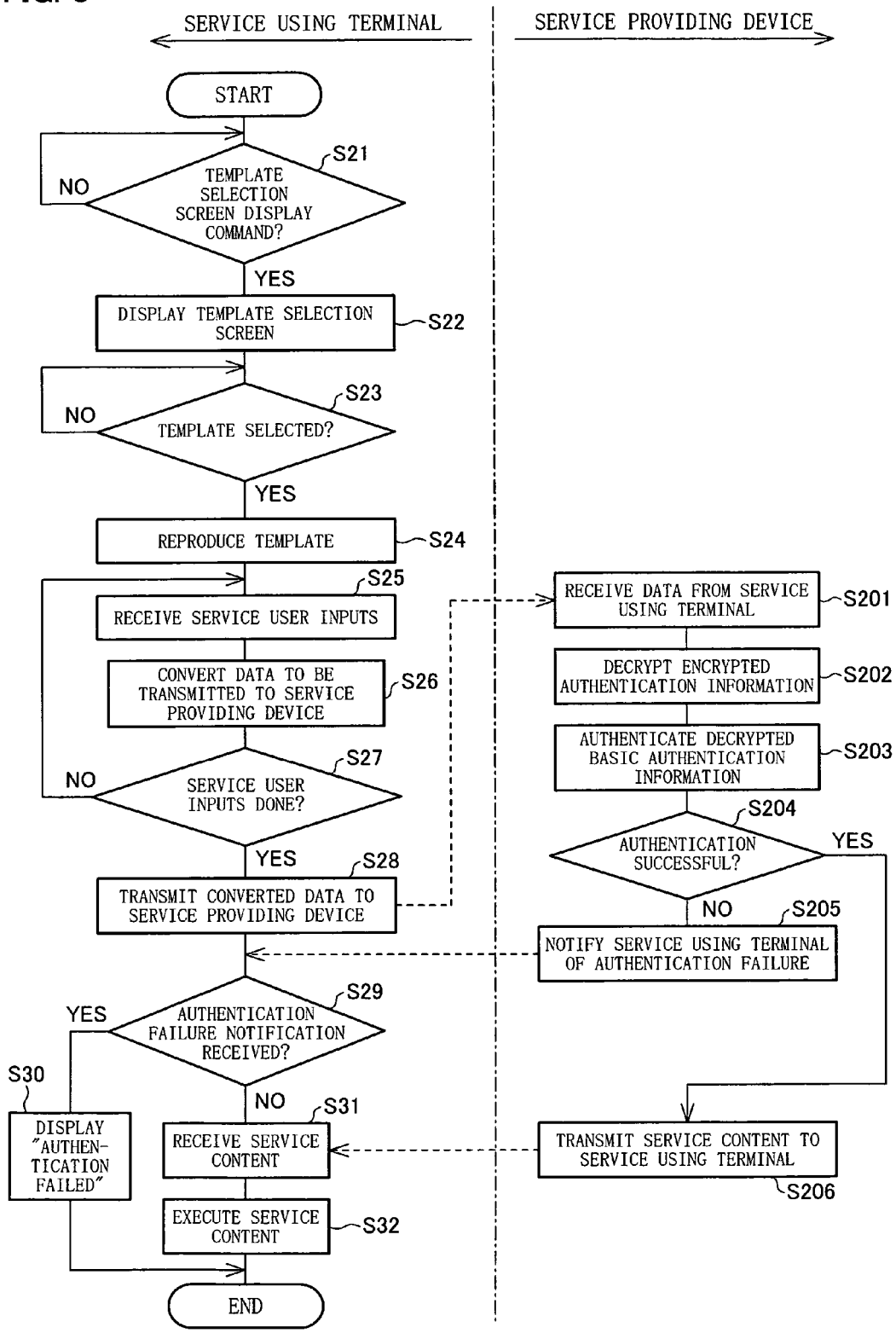
FIG. 8 is a flow diagram depicting steps of the second-time and subsequent authentication and service providing processes in a service providing system in accordance with an embodiment of the present invention.
Figure 9:
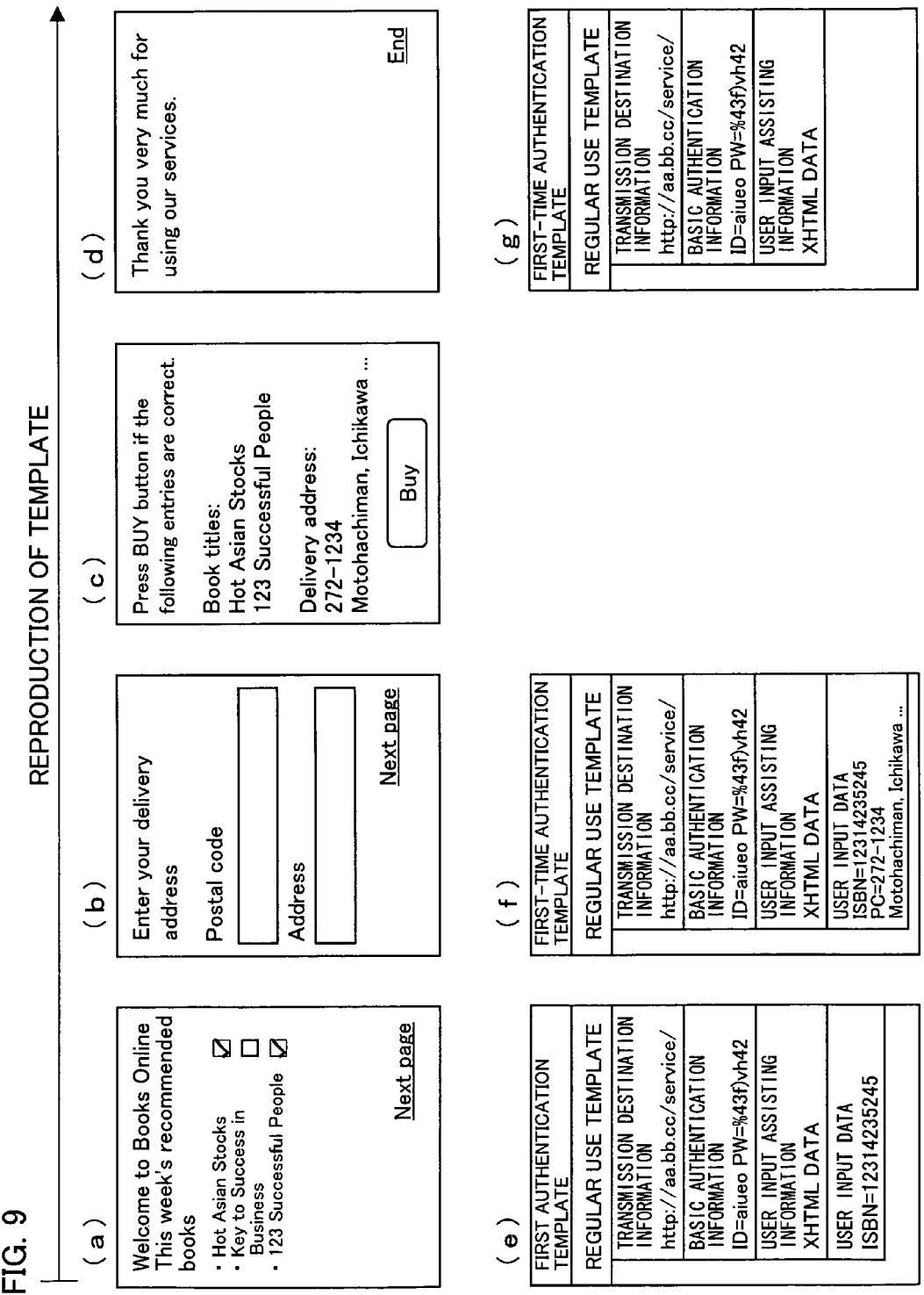
FIGS. 9(a) to 9(d) are illustrations of screen displays by display means of a service using terminal in a service providing system in accordance with an embodiment of the present invention during the second-time and subsequent authentication processes (prior to a service providing process).
FIGS. 9(e) to 9(g) are illustrations of the structure of a template used in the second-time and subsequent authentication processes (prior to a service providing process) in a service providing system in accordance with an embodiment of the present invention.

Next will be described the operation of the service providing system 1 in the second-time and subsequent authentication processes and the service providing process. FIG. 8 is a flow diagram depicting process steps of the second-time and subsequent authentication processes and the service providing process in the service using terminal 10 and the service providing device 100. FIGS. 9(*a*) to 9(*d*) are illustrations of screen displays by the display means 15 of the service using terminal 10 in the FIG. 8 processes. FIGS. 9(*e*) to 9(*g*) are illustrations of the structure of a template used in the FIG. 8 processes. FIG. 8 assumes that the FIG. 6 process is completed, so the template storage section 13a in the service using terminal 10 already contains a regular use template for recommended book purchasing services.

First, the control section 10a in the service using terminal 10 stands by waiting for a display command for a template selection screen from the service user (S21). When a display command for a template selection screen is detected, the control section 10a controls the template selection means 17 to display a template selection screen (see FIG. 5) on the display means 15 (S22).

Next, the control section 10a determines whether a template has been selected for reproduction (S23). If no template has been selected for reproduction, the section 10a continues to stand by waiting for a selection command for a template to be reproduced from the service user.

In contrast, if a template has been selected for reproduction, the control section 10a reproduces the selected template (S24). We suppose here that a regular use template has been selected for recommended book purchasing services. We also suppose here that a template to be reproduced is selected on a template selection screen; this is not the only possibility. For example, the template selected in S24 may be reproduced with S21 to S23 being omitted, if the service user selected the Reproduce Template button on the FIG. 7(*d*) screen display which is displayed by S15 in FIG. 6.

Figure 10:
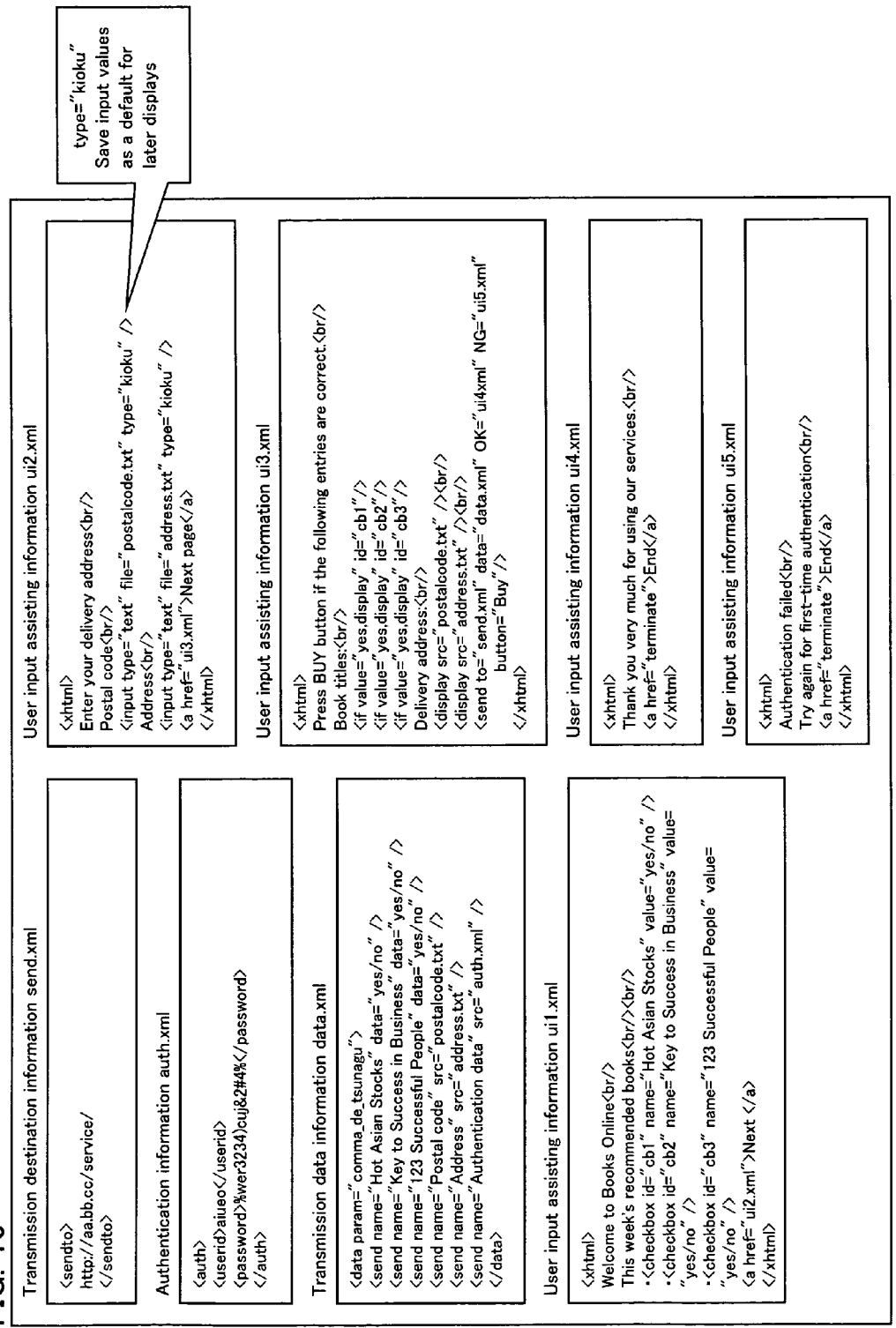
FIG. 10 is an illustration depicting an exemplary regular use template used in a service providing system in accordance with an embodiment of the present invention.

FIG. 10 is an illustration depicting template data for a regular use template for recommended book purchasing services. The regular use template in the figure contains transmission destination information (send.xml), authentication information (auth.xml), transmission data information (data.xml), and user input assisting information (ui1.xml, ui2.xml, ui3.xml, ui4.xml, ui5.xml).

The transmission destination information in the regular use template indicates a transmission destination to which data is transmitted to request service provision. The transmission destination information in the first-time template is transmission destination information for a data transmission from the service using terminal 10 to the first-time data receiving device 30 (for example, the URL of the first-time data receiving device 30). The transmission destination information in the regular use template is transmission destination information for data transmission from the service using terminal 10 to the data receiving device 50 (for example, the URL of the data receiving device 50), The authentication information in the regular use template is encrypted authentication information encrypted by the encryption means 34 in the first-time data receiving device 30 (the basic authentication information encrypted in S107 in FIG. 6) after the first-time authentication process turned out to be successful.

The transmission data information in the regular use template indicates, for example, a conversion method for the data transmitted from the service using terminal 10 to the service providing device 100 to request service provision.

The user input assisting information in the regular use template includes service-related information and information based on which to display an interface for use by the service user when he/she enters data. The user input assisting information includes an interactive description. By reproducing the interactive description, the items which the service user will be requested to enter are displayed on the display means 15 so that the service user can enter necessary items in accordance with the information displayed.

As the regular use template shown in FIG. 10 is reproduced, the content of the user input assisting information ui1.xml is first displayed on the display means 15.

In the recommended book purchasing services, are first displayed the titles (list) of recommended books, check boxes for selecting books to be purchased (appearing next to the recommended book titles), and a Go to Next Page button for the input of a command to open a next screen display. See FIG. 9(*a*).

In the recommended book purchasing services, recommended book information is transmitted (delivered) to the service user who has been successful in the first-time authentication from the service providing device 100 to the service using terminal 10 once every predetermined period (for example, once per week). The service using terminal 10, upon receipt of the information, updates the user input assisting information ui1.xml in the regular use template contained in the template storage section 13a according to the received information. Alternatively, the service providing device 100 may generate an updated book-recommending regular use template once every predetermined period and transmits (delivers) it to the service using terminal 10. The updated information or template may be transmitted from the service providing device 100 to the service using terminal 10 on a recommended-book information update request from the service user via the service using terminal 10. Alternatively, the regular use template may contain information as to the timing of updating the recommended-book information so that the service using terminal 10 can automatically request an information update from the service providing device 100 based on the timing.

The service user then selects a book he/she will purchase on the FIG. 9(a) screen display by checking the box displayed next to that book. As the user inputs a command to proceed to a next page by selecting "Go to Next Page" at the lower right of the screen display, the content of the user input assisting information ui2.xml is displayed on the display means 15. FIG. 9(b) shows a screen display on the display means 15 in this case.

The selection of the book to be purchased is included in the transmission data which will be converted by the data conversion means 18. The transmission data information data.xml in the regular use template contains a description to add the book selection result to the transmission data. The data conversion means 18 adds the book selection result to the transmission data on the basis of this transmission data information data.xml.

FIG. 9(b) shows input boxes for the postal code and address to which the commercial goods will be delivered and a "Go to Next Page" allowing an input of a command to proceed to a next screen display. As described in FIG. 10, the user input assisting information ui2.xml contains a description containing the postal code and address inputs and if the postal code and address are already stored, a description to display the stored postal code and address as a default.

The service user then inputs the postal code and address to which the commercial goods will be dispatched on the FIG. 9(b) screen display. As the user enters a command to proceed to a next screen display, the content of the user input assisting information ui3.xml is displayed on the display means 15. FIG. 9(c) shows a screen display on the display means 15 in this case. The postal code and address inputs are added to the transmission data which will be converted by the data conversion means 18. That is, the transmission data information data.xml in the regular use template contains a description to add the postal code and address to which the commercial goods will be dispatched to the transmission data. Based on this transmission data information data.xml; the data conversion means 18 adds the postal code and address to which the commercial goods will be dispatched to the transmission data. The transmission data which will be converted by the data conversion means 18 contains information (encrypted authentication information) on the authentication information auth.xml contained in the regular use template. FIG. 9(f) is an illustration of a template structure in this case.

In FIG. 9(c) are shown a list of books to be purchased, the postal code and address to which the commercial goods will be dispatched, and a purchase button. As the service user selects the purchase button, as mentioned earlier, the data, containing the book to be purchased and the postal code and address to which the commercial goods will be dispatched, which has been converted by the data conversion means 18 is transmitted to a transmission destination (data receiving device 50 in the service providing device 100) specified in the transmission destination information send.xml in the regular use template.

Thus, the control section 10a in the service using terminal 10 receives service user inputs in accordance with the user input assisting information in the regular use template (S25) by reproducing the regular use template in S24. The section 10a then instructs the data conversion means 18 to convert the input information to transmission data on the basis of the transmission data information data.xml (information on the conversion method for the transmission data contained in the regular use template) (S26).

Figures 11, 12:
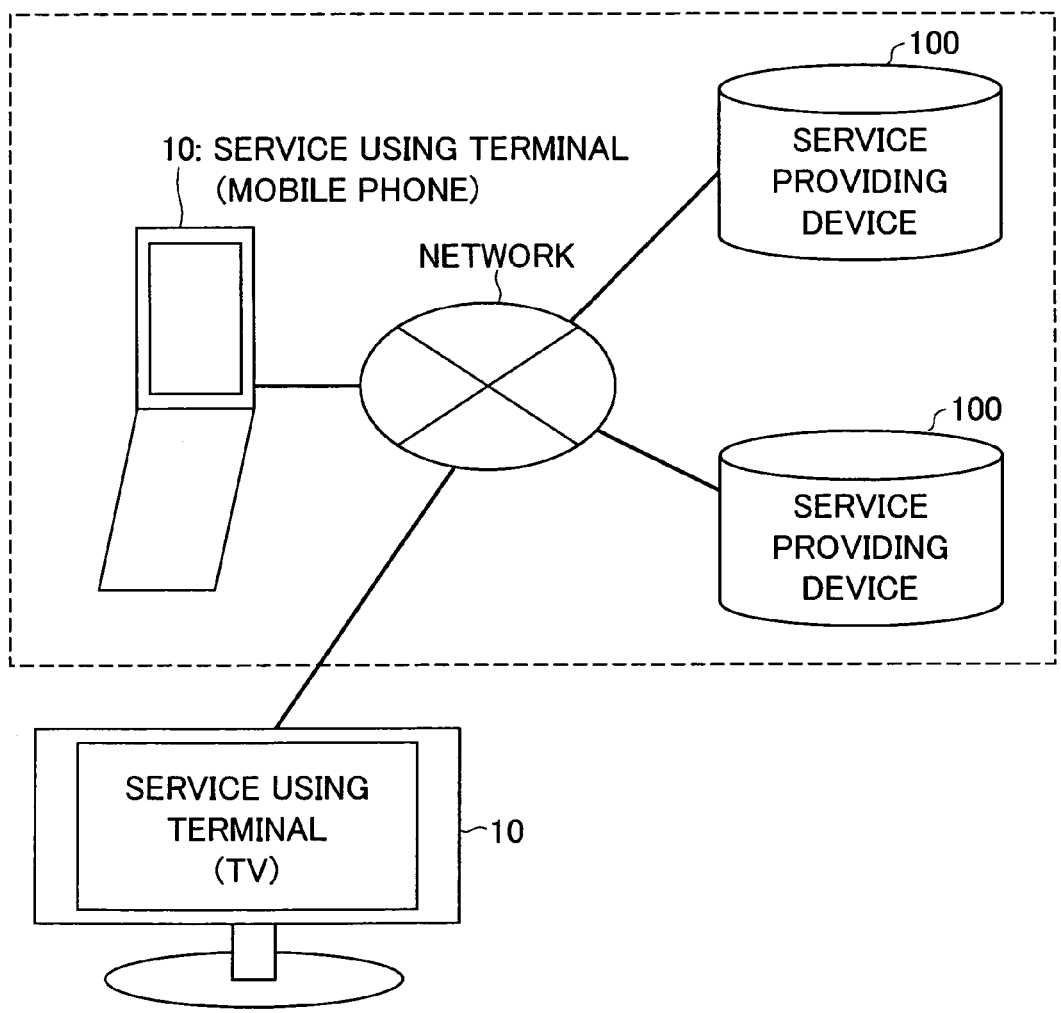
FIG. 11 is an illustration depicting exemplary data transmitted from a service using terminal to a service providing device during the second-time and subsequent authentication processes in a service providing system in accordance with an embodiment of the present invention.
FIG. 12 is a schematic illustration of the configuration of a service providing system in accordance with another embodiment of the present invention.

FIG. 11 is an illustration depicting exemplary transmission data that is transmitted from the service using terminal 10 to the service providing device 100. As shown in the figure, the transmission data contains the information given by the service user (here, information on the book to be purchased and the delivery destination for the commercial goods) and the basic authentication information (authentication information auth.xml, encrypted authentication information).

The control section 10a determines whether the service user inputs are all done (S27). If not, the section 10a repeats S25 and S26.

In contrast, if all the service user inputs are done, the converted data is transmitted to the transmission destination (data receiving device 50) specified in the transmission destination information send.xml in the regular use template (S28). In the service providing process (second-time and subsequent authentication processes) of the service providing system 1 of the present embodiment, communications between the service using terminal 10 and the service providing device 100 occur for the first time at this point.

As the data receiving means 51 in the data receiving device 50 receives the data transmitted from the service using terminal 10 (S201), the control section 100a in the service providing device 100 instructs the decryption means 52 to decrypt the encrypted authentication information (basic authentication information) contained in that data (S202). The control section 100a instructs the authentication means 61 in the service authentication and providing device 60 to authenticate the decrypted basic authentication information (S203).

Next, the control section 100a determines whether the authentication has been successful (S204). If the authentication is determined to have been a failure, the section 100a notifies the service using terminal 10 by transmitting data indicating the authentication failure via the authentication verification means 53 and the data transmitting means 55 (S205).

In contrast, if the authentication has been successful, the control section 100a causes service content to be transmitted from the service execution means 62 in the service authentication and providing device 60 to the service using terminal 10 via the service execution verification means 54 and data transmitting means 55 in the data receiving device 50 S205). Specifically, if the authentication is determined to have been successful in S204, the control section 100a transfers the data received from the service using terminal 10 to the service execution verification means 54. The section 100a then instructs the service execution verification means 54 to make a request with the service execution means 62 in the service authentication and providing device 60 to provide service in accordance with the data received from the service using terminal 10. The section 100a then transfers the service content from the service execution means 62 to the service execution verification means 54. Further, the section 100a instructs the data transmitting means 55 to respond by transmitting the service content to the service using terminal 10.

The control section 10a in the service using terminal 10 determines whether an authentication failure notification has been received from the service providing device 100 (S29). If an authentication failure notification has been received, the section 10a displays information indicating the authentication failure on the display means 15 (S30). In the FIG. 10 regular use template example, a prompt along with an End button is presented on the basis of the user input assisting information ui5.xml. The prompt reads, for example: "Authentication failed. Try again for first-time authentication." Selecting the End button ends the second-time and subsequent authentication processes and the service providing process.

In contrast, if no authentication failure notification has been received, the control section 10a instructs the data receiving means 12 to receive/obtain the service content transmitted from the data receiving device 50 (S31). The obtained service content is then executed (S32), and the second-time and subsequent authentication processes and the service providing process are ended. For example, in the FIG. 10 regular use template example, a message, "Thank you very much for using our services," is displayed along with an End button on the basis of the user input assisting information ui4.xml as shown in FIG. 9(d). Selecting the End button ends the second-time and subsequent authentication processes and the service providing process. When the service content provision is ended, the user input data may be reset as shown in FIG. 9(g) for example.

As described in the foregoing, in the service providing system 1 of the present embodiment, to implement the first-time authentication, the first-time template transmitting device 20 in the service providing device 100 transmits the first-time template to the service using terminal 10. The first-time template contains (1) the transmission destination information giving a transmission destination (first-time data receiving device 30) to which the data for the first-time authentication is transmitted from the service using terminal 10; (2) the basic authentication information by which to identify the user or the service using terminal for authentication or part of that basic authentication information; and (3) the service-related information and the user input assisting information based on which an interface through which the service user enters data is presented.

Accordingly, to implement the first-time authentication, the service user only has to enter necessary items in accordance with the information displayed on the display means 15 in the service using terminal 10 on the basis of the user input assisting information and transmit to the service providing device 100. According to Tokukai 2004-118275 above, at least two rounds of communication process steps are needed for authentication. With the service providing system 1 of the present embodiment, one round of communications process steps is sufficient to implement the first-time authentication. Therefore, the first-time authentication process is done quickly, the financial burdens on the service user to cover the communications cost for the first-time authentication are relieved.

The service using terminal 10 can display an interface enabling the service user to input necessary items for the first-time authentication on the display means 15 in the service using terminal 10 by reproducing the user input assisting information in the first-time template. Therefore, the service user only has to fill in necessary items on the interface presented based on the user input assisting information for the first-time authentication process. Accordingly, the workload of the service user in manipulation in the first-time authentication process is relieved.

The first-time template per se is not a computer program for computer processing. The template has such a data format that the template is interpreted and reproduced by the template interpretation means 14 using a computer program contained in the program storage section 13b. Therefore, if the program storage section 13b in the service using terminal 10 contains a single program which can interpret and reproduce the data in the first-time template, the program can be used for the first-time authentication for multiple services.

Accordingly, to use a new service, the service user only has to obtain a first-time template for the service to implement a first-time authentication process for the service.

The service provider can perform first-time authentication on the service user by merely generating the first-time template, without having to create terminal applications (application programs for the service using terminal) specifically for individual services to be provided. The input items, etc. which need be filled up by the service user in the first-time authentication can be altered by merely correcting/altering the first-time template and transmitting it to the service using terminal.

In the service providing system of the present embodiment, if the first-time authentication process is successful, the template transmitting device 40 in the service providing device 100 transmits a regular use template to the service using terminal 10. The regular use template contains (1) transmission destination information indicating a transmission destination (data receiving device 50) to which data is transmitted from the service using terminal 10 for the second-time and subsequent authentications (request service provision), (2) basic authentication information for which the first-time authentication has been successful, and (3) service-related information and user input assisting information based on which to present an interface for use by the service user when he/she enters data. The service using terminal 10 records the regular use template transmitted from the service providing device 100 in the template storage section 13a. Therefore, the service using terminal 10 contains basic authentication information which has been successful in the first-time authentication.

Thus, the regular use template contains basic authentication information which has been successful in the first-time authentication. Therefore, in the second-time and subsequent authentication processes (in using services), authentication can be done using the basic authentication information in the regular use template for which the first-time authentication is done. Accordingly, the number of communication process steps required for an authentication process is reduced. So are the communications costs.

Also, in the second-time and subsequent authentication processes (in using services), there is no need for the service user to enter authentication information. The service user can use services without remembering the password, for example, which adds to convenience for the service user.

If the first-time authentication is successful, the service providing device 100 generates the encrypted authentication information by encrypting the basic authentication information or part of it in the encryption means 34 and adds the encrypted authentication information to the regular use template. When the device 100 receives data which contains the encrypted authentication information from the service using terminal 10 in the second-time and subsequent authentication processes, the device 100 decrypts the encrypted authentication information for its authentication. Therefore, the basic authentication information contained in the service using terminal 10 and the basic authentication information transmitted/received between the service using terminal 10 and the service providing device 100 after the first-time authentication process are encrypted, which improves security of the basic authentication information.

The regular use template contains user input assisting information based on which to present an interface for use by the service user when he/she enters data. Therefore, by the service using terminal 10 reproducing the user input assisting information contained in the regular use template, the display means 15 in the service using terminal 10 can present an interface enabling the service user to input items which are necessary to utilize the service. Therefore, the service user only has to fill in the necessary items in accordance with the interface produced based on the user input assisting information to have the second-time and subsequent authentication and service request processes implemented. Accordingly, the workload of the service user in manipulation in the second-time and subsequent authentication processes (in using services) is relieved.

Similarly to the first-time template, the regular use template per se is not a computer program for computer processing. The template has such a data format that the template is interpreted and reproduced by the program. Therefore, if the service using terminal 10 contains a single program which can interpret and reproduce the data in the regular use template, the program can be used for the second-time and subsequent authentication processes for multiple services and service utilization.

Accordingly, to use a new service, the service user only has to obtain a regular use template for the service to utilize the service.

The service provider can perform provide the service to the service user by merely generating the regular use template, without having to create terminal applications (application programs for the service using terminal) specifically for individual services to be provided. If the service content to be provided is to be altered, the service content can be altered by merely correcting/altering the regular use template and transmitting it to the service using terminal.

The foregoing first-time template and regular use template contain transmission destination information based on which data is transmitted from the service using terminal 10 to the service providing device 100. The first-time template and the regular use template are also readily transmitted/received between the service using terminal 10 and the service providing device 100 using various communications protocols. Therefore, the service providing system 1 of the present embodiment allows such configuration that the service providing device 100 provides services to the service using terminal 10 over the Internet or other networks. A remote service providing device, such as a mobile terminal, can provide services to the service using terminal. In the present embodiment, the display means 15 is disposed in the service using device 10. The display means 15 however is not necessarily disposed in the service using device 10. The display means 15 may, for example, be communicably connected to the service using device 10 so as to display images in accordance with the data from the service using device 10.

The present embodiment has primarily described configurations where the templates are downloaded from a Web page. This is by no means intended to be limiting the invention. For example, the templates may be given from the service providing device 100 to the service using terminal 10 in the form of attachments to an email. Alternatively, storage media containing the templates may be delivered for the service using terminal 10 to read the templates from the storage medium. The storage medium may be a magnetic tape, such as a video tape or a cassette tape; a magnetic disk, such as a floppy (registered trademark) disk or a hard disk; an optical disc (magneto-optical disc), such as a CD-ROM, a MO, a MD, a DVD, or a CD-R; a memory card, such as an IC card or an optical card; or a semiconductor memory, such as a mask ROM, an EPROM, an EEPROM, or a flash ROM. Further, the first-time template may be stored in the service using terminal 10 in advance (for example, in the manufacture or sale of the service using terminal 10).

By adding the templates obtained in any of these methods to the template storage section 13*a* in the storage means 13 so that the service user can select from the templates, the service user can readily utilize the service corresponding to that template.

The service user who has already obtained a regular use template may be allowed to change the password and other basic authentication information as he/she wishes. When this is the case, for example, it is sufficient if the service user executes the first-time authentication process again. The regular use template may contain user input assisting information based on which an interface (update assisting information) is presented to allow for updating of the password and other basic authentication information.

The embodiments have so far described examples where the service using terminal 10 is a mobile phone or a television. The service using terminal (service using terminal) 10 is not however limited to these examples. The service using terminal 10 may be any device communicable with the service providing device 100: for example, a PHS (Personal Handyphone System; registered trademark), a PDA (personal digital assistant), a personal computer, or a word processing device.

The present embodiment has so far assumed that the first-time template transmitting device 20, the first-time data receiving device 30, the template transmitting device 40, the data receiving device 50, and the service authentication and providing device 60 are provided in the service providing device 100. This is by no means intended to be limiting the invention. For example, the first-time template transmitting device 20, the first-time data receiving device 30, the template transmitting device 40, the data receiving device 50, and the service authentication and providing device 60 may be provided as single devices connected over a network. Alternatively, the first-time template transmitting device 20, the first-time data receiving device 30, the template transmitting device 40, the data receiving device 50, and the service authentication and providing device 60 may be divided into multiple groups connected over a network.

The present embodiment has so far assumed that the first-time template transmitting device 20, the first-time data receiving device 30, the template transmitting device 40, the data receiving device 50, and the service authentication and providing device 60 are provided in the service providing device 100 so that the control section 100*a* can control the operation of the members making up these devices. This is by no means intended to be limiting the invention: for example, a control section may be provided to each of the first-time template transmitting device 20, the first-time data receiving device 30, the template transmitting device 40, the data receiving device 50, and the service authentication and providing device 60, so as to control the operation of the members of the devices. Alternatively, the first-time template transmitting device 20, the first-time data receiving device 30, the template transmitting device 40, the data receiving device 50, and the service authentication and providing device 60 may be divided into multiple groups each of which is provided with a control section controlling the members of the device(s) in that group.

The data transmitted from the service using terminal 10 to the service providing device 100 does not necessarily have the above structure. For example, the data may include the size of data transmitted/received (size of data that can be transmitted/received) between the service using terminal 10 and the service providing device 100. The data transmitted to the service providing device 100 may also include GPS information, a template use count, and other information.

FIG. 32(a) shows an example of the transmission data information data.xml contained in the regular use template when GPS information and template use count are included in the data transmitted from the service using terminal 10 to the service providing device 100. In this shown example, the service using terminal 10 has a function, getGPSData ( ), by which GPS-based location information is obtained. The GPS-based location information obtained by the function is added to the data transmitted to the service providing device 100. The service using terminal 10 has another function, getNumberOfUse ( ), by which a template use count is obtained. The template use count obtained by the function is also added to the data transmitted to the service providing device 100.

FIG. 32(b) shows transmission data converted by the data conversion means 18 on the basis of the transmission data information shown in FIG. 32(a), that is, an example of data transmitted from the service using terminal 10 to the service providing device 100.

Embodiment 2

Another embodiment of the present invention will be described. For convenience, members of the present embodiment that have the same arrangement and function as members of embodiment 1, and that are mentioned in that embodiment are indicated by the same reference numerals and description thereof is omitted.

FIG. 12 is a schematic illustration of the configuration of a service providing system 1a of the present embodiment. The service providing system 1a allows a service using terminal 10 to simultaneously utilize the services provided by multiple service providing devices 100. The service using terminal 10 and the service providing devices 100 are configured similarly to those in embodiment 1. The first-time authentication process of the service providing system 1a is substantially the same as that described in embodiment 1.

Figure 13:
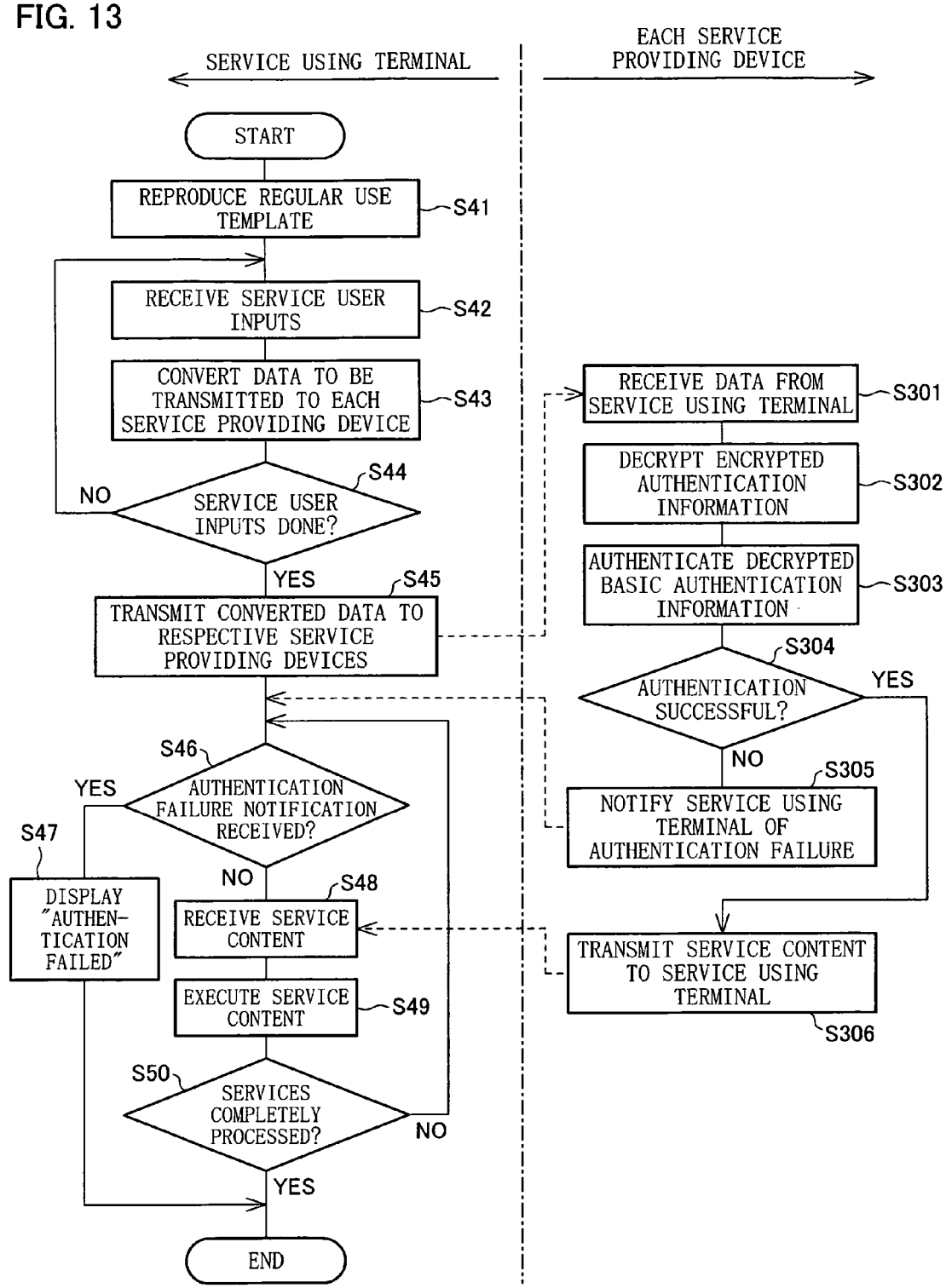
FIG. 13 is a flow diagram depicting steps of the second-time and subsequent authentication and service providing processes in the service providing system shown in FIG. 12.

The operation of the service providing system 1a in the second-time and subsequent authentication and service providing processes will be described. FIG. 13 is a flow diagram of the second-time and subsequent authentication and service providing process steps in the service providing system 1a.

The following description will focus on one service using terminal 10 simultaneously utilizing the recommended book purchasing services described in embodiment 1 and recommended CD purchasing services. In the recommended CD purchasing services, recommended CD information is provided every week, and the service user can purchase by selecting a CD he/she wants from the recommended CDs.

Figure 14:
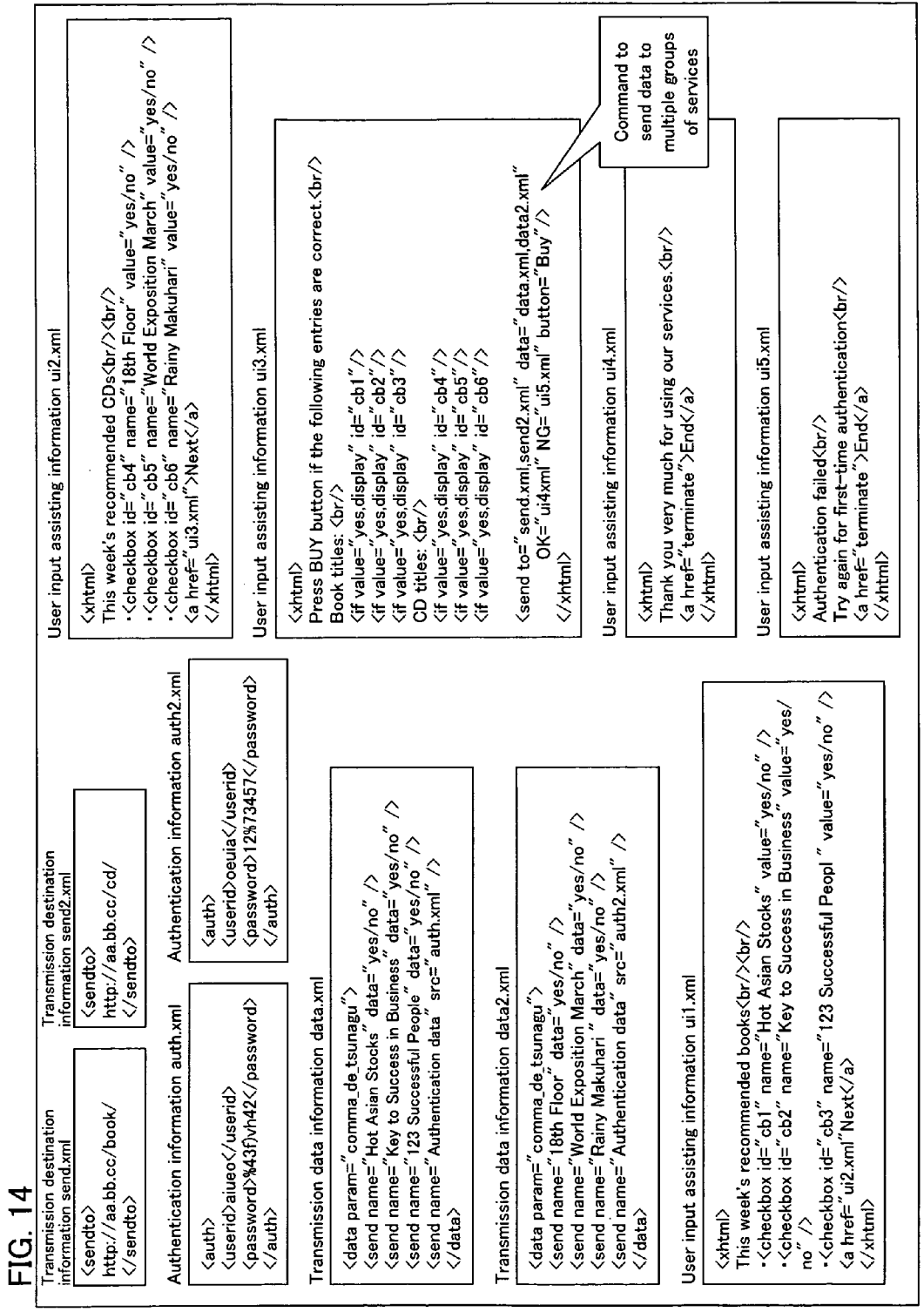
FIG. 14 is an illustration depicting an exemplary regular use template used in the service providing system shown in FIG. 12.

The template storage section 13a contains a regular use template shown in FIG. 14 which enables simultaneous use of the recommended book purchasing services and the recommended CD purchasing services.

As shown in FIG. 14, the regular use template contains transmission destination information send.xml, authentication information auth.xml, and transmission data information data.xml for the recommended book purchasing services and transmission destination information send2.xml, authentication information auth2.xml, and transmission data information data2.xml for the recommended CD purchasing services. The template also contains user input assisting information ui1.xml, ui2.xml, ui3.xml, ui4.xml, and ui5.xml which are common to both groups of services.

The regular use template enabling simultaneous use of both groups of services is transmitted from the service providing device 100 which provides either of the groups of services to the service using terminal 10 if the first-time authentication is successful for both groups, for example. Alternatively, the template may be generated from the regular use templates for the groups of services by converting them in the data conversion means 18, for example. When this is the case, for example, either or both of the regular use templates may contain information on the conversion for the regular use template enabling simultaneous use of both groups of services so that the data conversion means 18, etc. can convert based on the information.

As a template reproduction command is received from the service user, the control section 10a in the service using terminal 10 reproduces the specified template (S41). The template reproduction command from the service user may be entered through a service selection screen as in embodiment 1 or through a Reproduce Template button which appears when the regular use template is obtained. Here is assumed the selection of the FIG. 14 regular use template enabling simultaneous use of both the recommended book purchasing services and the recommended CD purchasing services.

Figure 15:
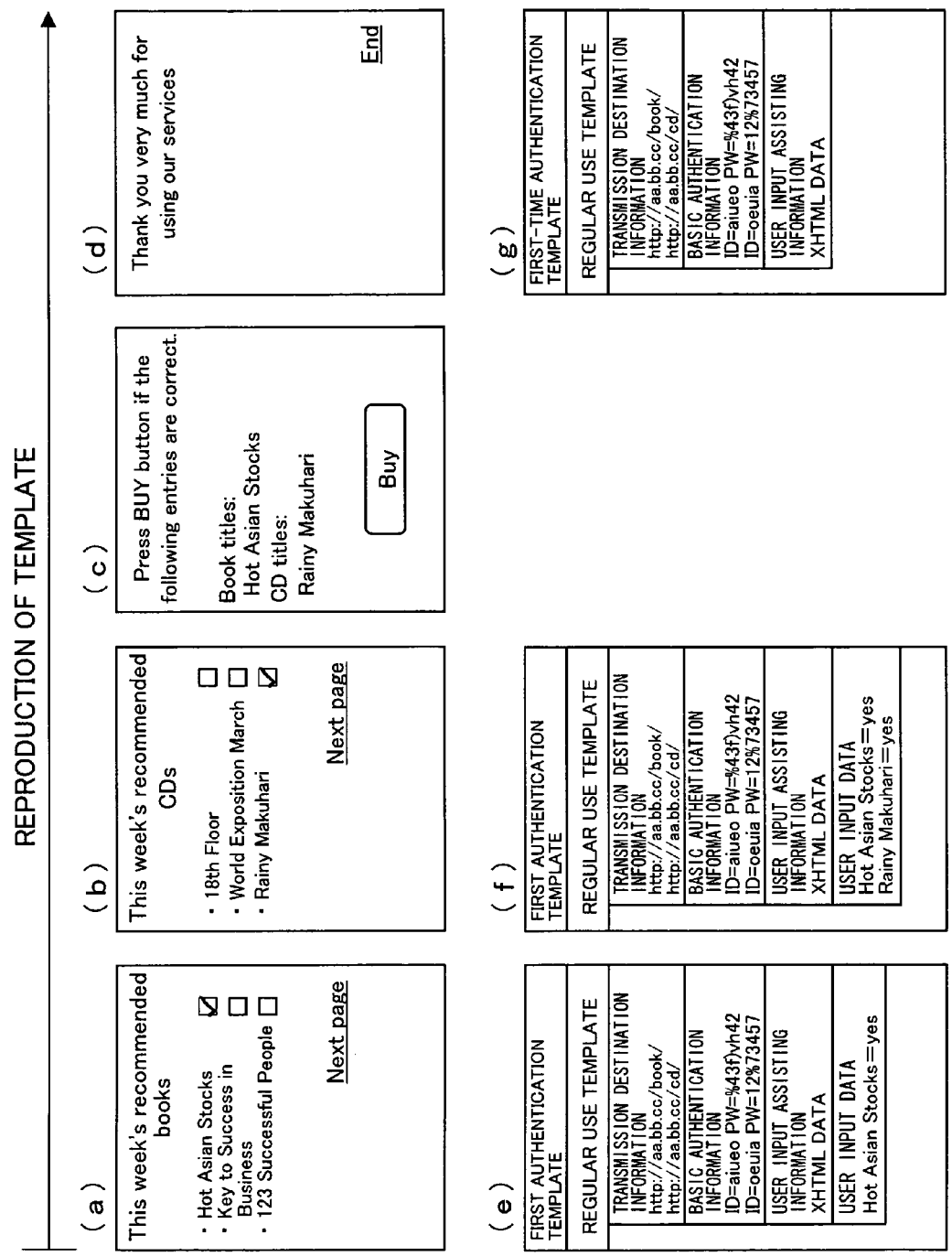
FIGS. 15(a) to 15(d) are illustrations of screen displays by display means of a service using terminal in the service providing system shown in FIG. 12 during the second-time and subsequent authentication processes.
FIGS. 15(e) to 15(g) are illustrations of the structure of a template for the second-time and subsequent authentication processes in the service providing system shown in FIG. 12.

Reproducing the FIG. 14 regular use template first makes the content of the user input assisting information ui1.xml appear on the display means 15. FIG. 15(a) shows the screen display. As shown in the figure, the titles (list) of recommended books, check boxes for selecting books to be purchased (appearing next to the recommended book titles), and a Go to Next Page button for the input of a command to open a next screen display are displayed on the basis of the user input assisting information ui1.xml. The service user can specify a book he/she will purchase on the screen display by checking the check box for the book. The book selected on the FIG. 15(a) screen display as a book to be purchased is added to the user input data in the template data as shown in FIG. 15(e).

The service user then selects a book he/she will purchase on the FIG. 15(a) screen display by checking the check box displayed next to that book. As the user inputs a command to proceed to a next page by selecting "Go to Next Page" at the lower right of the screen display, the content of the user input assisting information ui2.xml is displayed on the display means 15. FIG. 15(b) shows a screen display on the display means 15 in this case.

Here, as shown in FIG. 15(b), the recommended CD titles (list), check boxes for selecting a CD for purchase (appears by the recommended CDs), and the Go to Next Page button to enter a command to proceed to the next page are displayed based on the user input assisting information ui2.xml. The service user can specify a book he/she will purchase by checking the check box for the CD on the screen display. The book selected on the FIG. 15(b) screen display as a CD to be purchased is added to the user input data in the template data as shown in FIG. 15(f).

The service user then selects a CD he/she will purchase on the FIG. 15(b) screen display by checking the check box displayed by that CD. As the user inputs a command to proceed to a next page by selecting "Go to Next Page" at the lower right of the screen display, the content of the user input assisting information ui3.xml is displayed on the display means 15. FIG. 15(c) shows a screen display on the display means 15 in this case.

FIG. 15(c) shows a list of books and CDs to be purchased. As the service user selects the purchase button, the data including information on the book to be purchased is transmitted to the service providing device 100 providing the recommended book purchasing services, and the data including information on the CD to be purchased is transmitted to the service providing device 100 providing the recommended CD purchasing services.

In this manner, by reproducing the regular use template in S41, the control section 10a in the service using terminal 10 receives service user inputs in accordance with the user input assisting information in the regular use template (S42) and instructs the data conversion means 18 to convert the input information to transmission data in accordance with the individual groups of services on the basis of the transmission data information data.xm1 and data2.xml (information on a transmission data conversion method contained in the regular use template) (S43).

The section 10a then determines whether the service user inputs are all done (S44). If not, the section 10a repeats S42 and S43.

In contrast, if all the service user inputs are done, the converted transmission data for the groups of services is transmitted individually to the transmission destinations (data receiving devices 50) specified in the transmission destination information send.xml and send2.xml in the regular use template (S45).

As the data receiving means 51 in the data receiving device 50 receives the data transmitted from the service using terminal 10 (S301), the control section 100a in the service providing devices 100 instructs the decryption means 52 to decrypt the encrypted authentication information contained in the data (S302). The control section 100a instructs the authentication means 61 in the service authentication and providing device 60 to authenticate the decrypted authentication information (S303).

Next, the control section 100a determines whether the authentication has been successful (S304). If the authentication is determined to have been a failure, the section 100a notifies the service using terminal 10 by transmitting data indicating the authentication failure via the authentication verification means 53 and the data transmitting means 55 (S305).

In contrast, if the authentication has been successful, the control section 100a causes service content to be transmitted from the service execution means 62 in the service authentication and providing device 60 to the service using terminal 10 via the service execution verification means 54 and data transmitting means 55 in the data receiving device 50 (S305).

The control section 10a in the service using terminal 10 determines whether an authentication failure notification has been received from the service providing device 100 (S46). If an authentication failure notification has been received, the section 10a displays information indicating the authentication failure on the display means 15 (S47). In the FIG. 14 regular use template example, a prompt along with an End button is presented on the basis of the user input assisting information ui5.xml. The prompt reads: "Authentication failed. Try again for first-time authentication." Selecting the End button ends the second-time and subsequent authentication processes and the service providing process.

In contrast, if no authentication failure notification has been received, the control section 10a instructs the data receiving means 12 to receive/obtain the service content transmitted from the data receiving device 50 (S48). The obtained service content is then executed (S49).

Next, the control section 10a determines whether all services have been completely processed (S50). If there are any services which are not completely processed, the section 10a proceeds to S46 and its subsequent steps for those services.

In contrast, if all services are completely processed, the control section 10a ends the second-time and subsequent authentication processes and the service providing process. In this case, in the FIG. 14 regular use template example, a message, "Thank you very much for using our services," is displayed along with an End button on the basis of the user input assisting information ui4.xml as shown in FIG. 15(d). Selecting the End button ends the second-time and subsequent authentication processes and the service providing process.

As described in the foregoing, in the service providing system 1a of the present embodiment, a regular use template is used which enables simultaneous use of multiple groups of services provided by the different service providing devices 100.

Accordingly, the service user can simultaneously use multiple groups of services on a single service using terminal 10. This adds to convenience for the service user.

Embodiment 3

Another embodiment of the present invention will be described. For convenience, members of the present embodiment that have the same arrangement and function as members of embodiment 1 or 2, and that are mentioned in that embodiment are indicated by the same reference numerals and description thereof is omitted.

Figure 16:
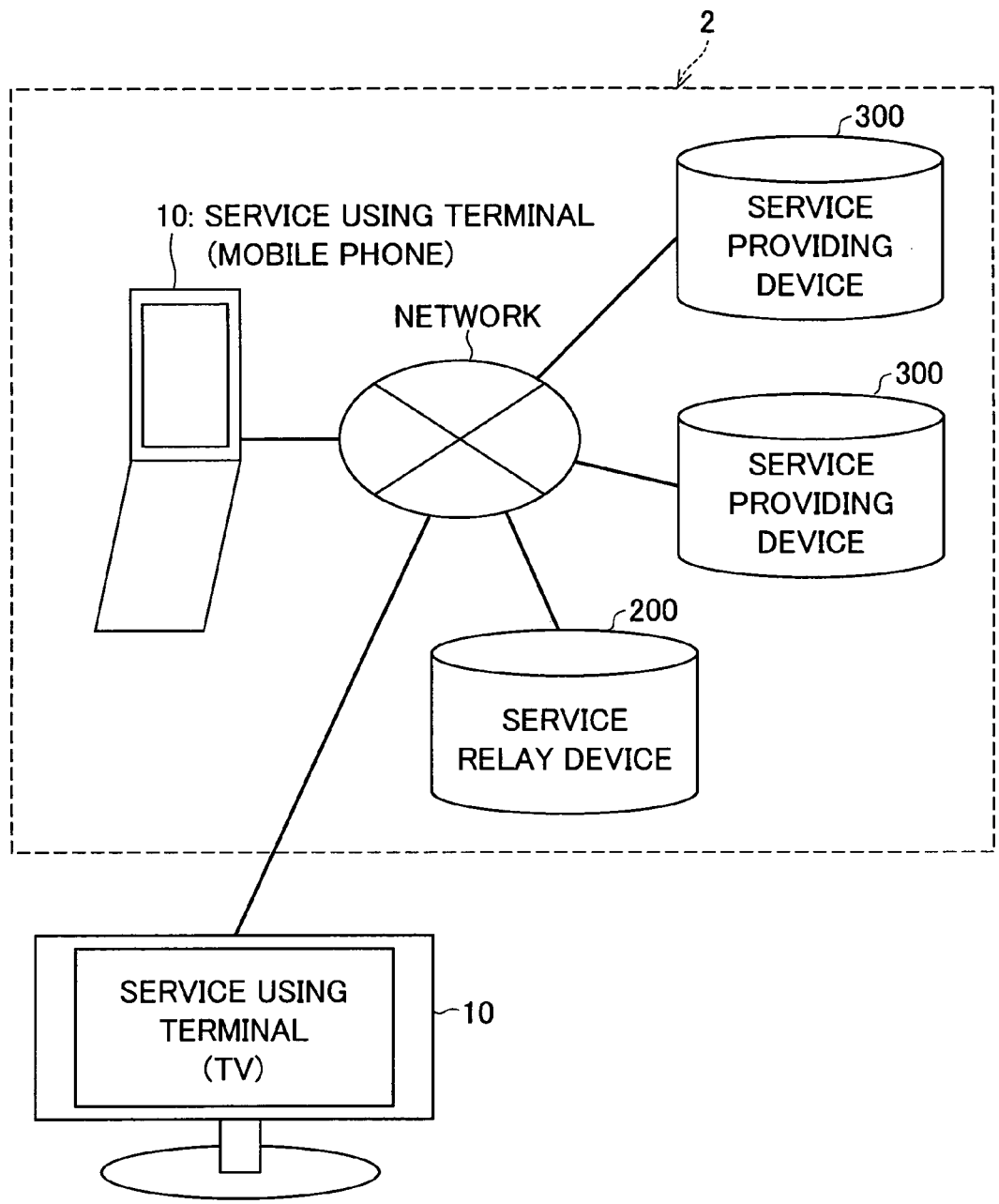
FIG. 16 is a schematic illustration of the configuration of a service providing system in accordance with a further embodiment of the present invention.
Figure 17:
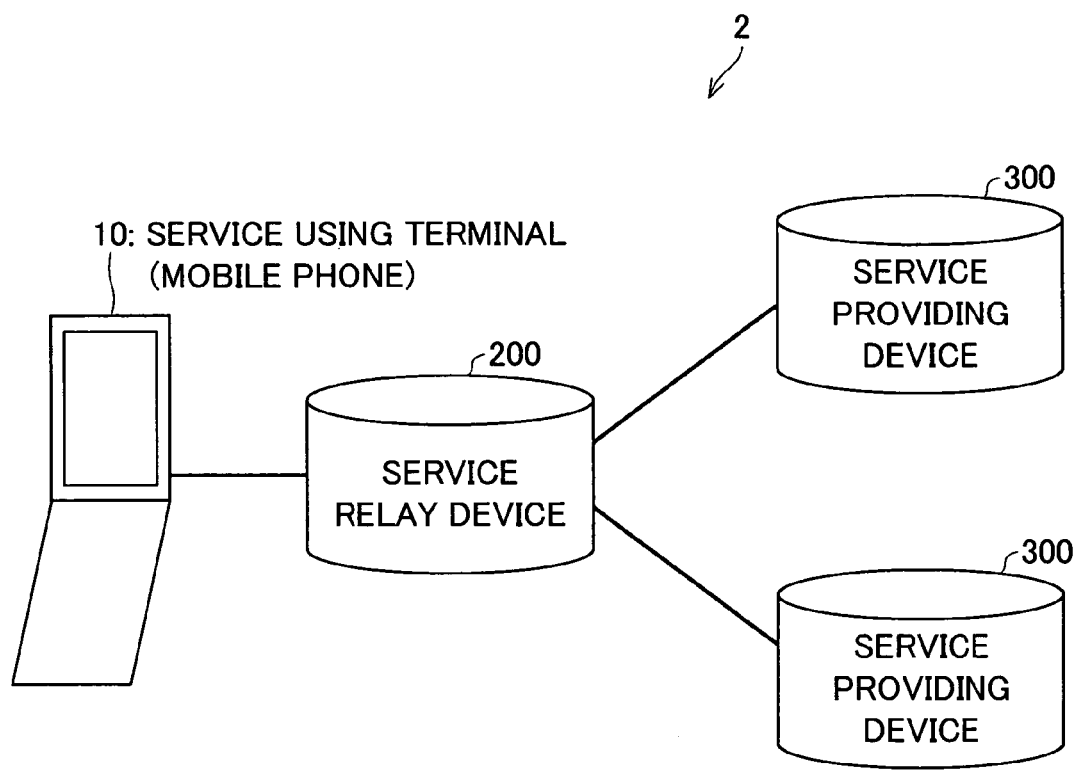
FIG. 17 is a schematic illustration of the configuration of a service providing system in accordance with a still another embodiment of the present invention.

FIG. 16 is a schematic illustration of the configuration of a service providing system 2 of the present embodiment. FIG. 17 is an illustration of the logic configuration the service providing system 2. As shown in these figures, the service providing system 2 includes a service using terminal 10, a service relay device 200, and a service providing device 300. The service using terminal 10 and the service relay device 200 are communicably connected over the Internet or another network. So are the service relay device 200 and the service providing device 300.

Figure 18:
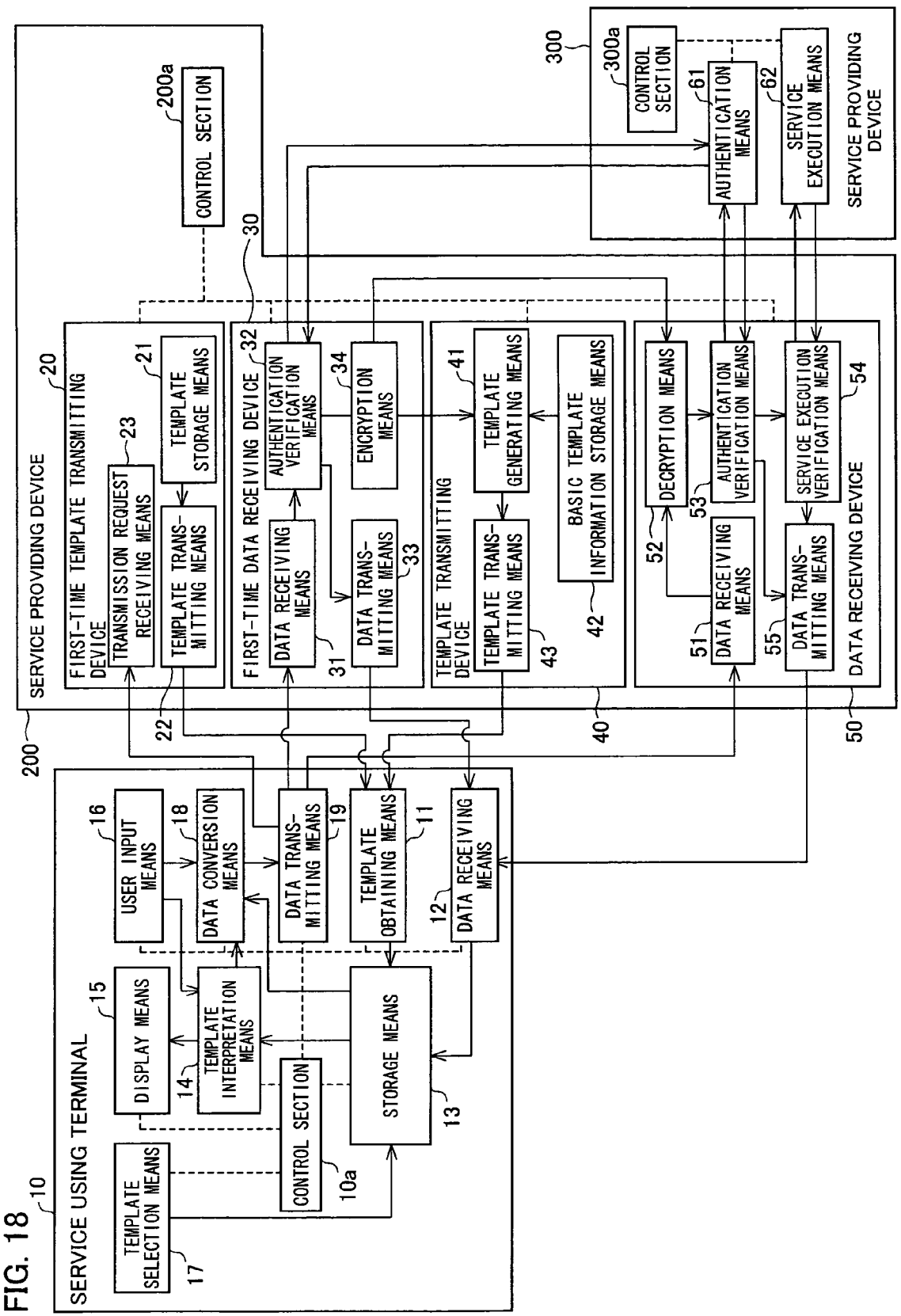
FIG. 18 is a schematic block diagram depicting the configuration of the service providing system shown in FIG. 16.

FIG. 18 is a block diagram of the configuration the service using terminal 10, the service relay device 200, and the service providing device 300 in the service providing system 2.

As shown in this figure, the service relay device 200 differs from the service providing device 100 shown in FIG. 2 where the service authentication and providing device 60 is missing, and the control section 100a is replaced by a control section 200a. The service providing device 300 includes a control section 300a and a service authentication-and providing device 60 which, in FIG. 2, is found in the service providing device 100. The service relay device 200 and the service providing device 300 are provided with individual communications means for mutual communications, which is however omitted in FIG. 18.

The control section 200a has substantially the same functions as the control section 100a in the service providing device 100 shown in FIG. 2, except that the section 200a does not control the members in the service authentication and providing device 60. Also, unlike the control section 100a in FIG. 2, data is transmitted/received between the first-time data receiving device 30 and the service providing device 300 and between the data receiving device 50 and the service providing device 300 via the communications means.

The service providing device 300 has substantially the same configuration as the service authentication and providing device 60 in FIG. 2. They differ from each other where the former includes the control section 300a and a communications section (not shown) to communicate with the service relay device 200.

The control section 300a controls the operation of members in the service providing device 300, that is, authentication means 61, service execution means 62, and the communications section (not shown).

Figure 19:
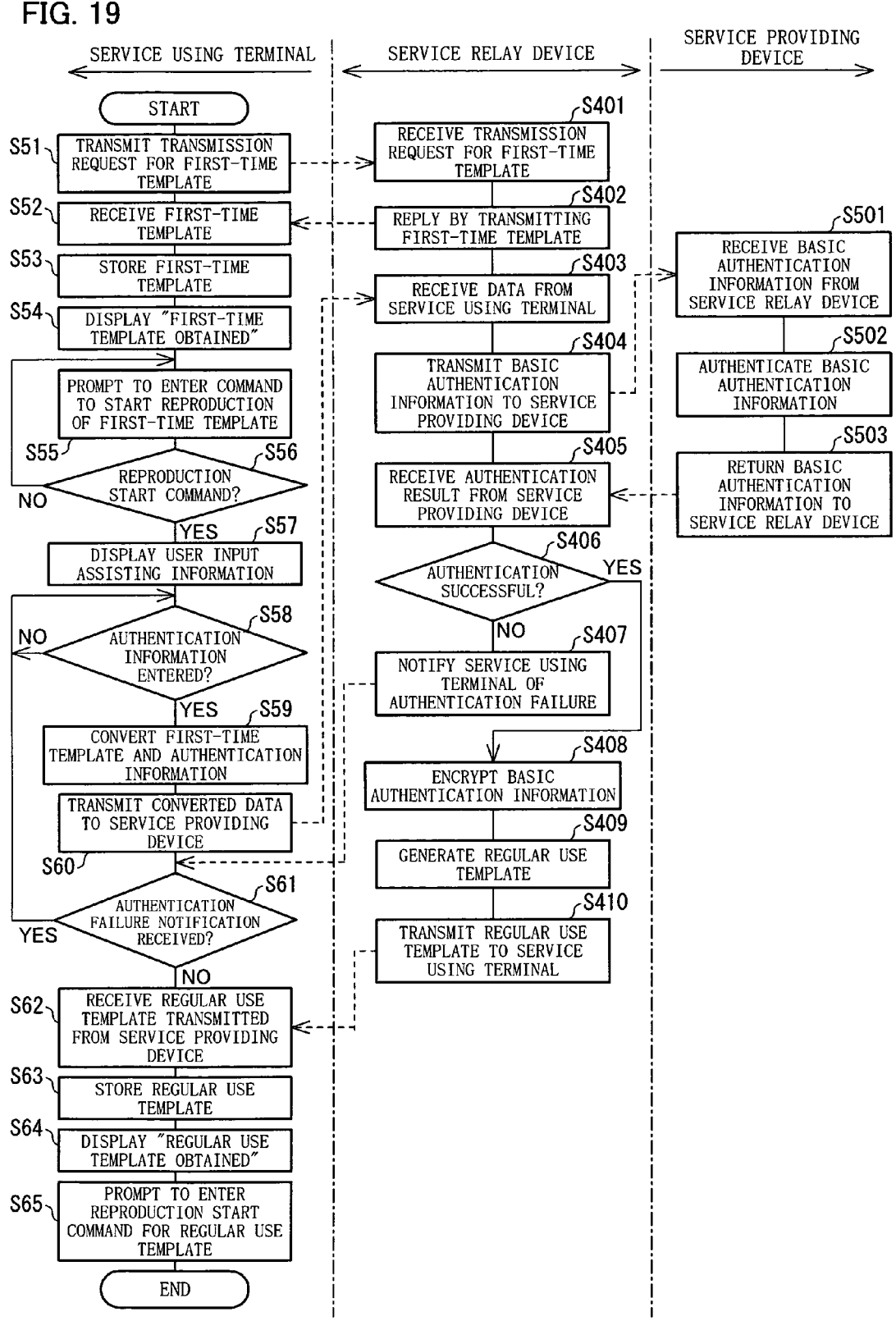
FIG. 19 is a flow diagram depicting steps of a first-time authentication process in the service providing system shown in FIG. 16.

Next, the operation of the service providing system 2 will be described. First will be described a first-time authentication process. FIG. 19 is a flow diagram depicting steps of the first-time authentication process in the service providing system 2.

First, in accordance with a service user command entered through the user input means 16, the control section 10a in the service using terminal 10 transmits a transmission request for a first-time template for a desired service to the first-time template transmitting device 20, in the service relay device 200, which contains the first-time template for the service (S51).

As the transmission request receiving means 23 in the first-time template transmitting device 20 receives the transmission request for the first-time template from the service using terminal 10 (S401), the template transmitting means 22 retrieves the first-time template from the template storage means 21 where the template resides. The means 22 then responds by transmitting the retrieved the first-time template to the service using terminal 10 (S402). The means 22 carries out these series of actions under the control of the control section 200a in the service relay device 200.

As the template obtaining means 11 receives/obtains the first-time template transmitted from the first-time template transmitting device 20 (S52), the control section 10a in the service using terminal 10 stores the obtained first-time template in the template storage section 13a in the storage means 13 (S53). The control section 10a then displays on the display means 15 information indicating that the first-time template has been obtained (S54). The section 10a also displays on the display means 15 information prompting the service user to enter a command to start the reproduction of the first-time template (S55).

Next, the control section 10a determines whether there has been a reproduction start command for the first-time template (whether there has been received a reproduction start command) (S56). If there has been no reproduction start command, the section 10a continues with S55 where it waits for a reproduction start command.

In contrast, if there has been a reproduction start command, the control section 10a reproduces the first-time template in the template interpretation means 14 and displays based on the user input assisting information contained in the first-time template on display means 15 (S57).

Next, the control section 10a determines whether the authentication information (for example, password) has been all entered on the user input means 16 (S58). If not all the authentication information is entered, the section 10a continues standing by until the entering of the authentication information is completed.

In contrast, if all the authentication information is entered, the control section 10a instructs the data conversion means 18 to convert the first-time template contained in the storage means 13 and the authentication information entered on the user input means 16 to a data format for transmission to the service relay device 200 (S59).

Next, the control section 10a instructs the data transmitting means 19 to transmit the data converted by the data conversion means 18 to the service relay device 200 (S60). The transmission destination information in the first-time template contains the transmission destination information of the service relay device 200 to which the convert data is transmitted and the transmission destination information of the service providing device 300 providing the service (service providing device 300 transmitting data via the service relay device 200). See FIG. 21 for the transmission destination information send.xml which will be detailed later.

As the data receiving means 31 in the first-time data receiving device 30 receives the data transmitted from the service using terminal 10 in S60 (S403), the control section 200a in the service relay device 200 instructs communications means (not shown) to transmit the basic authentication information in the received data to the service providing device 300 (S404). The transmission destination information of the service providing device 300 is contained in the first-time template as mentioned earlier and also in the data transmitted from the service using terminal 10 to the service relay device 200 in S60.

As the communications means (not shown) receives the basic authentication information transmitted from the service relay device 200 (S501), the control section 300a in the service providing device 300 instructs the authentication means 61 to authenticate the received basic authentication information (S502). The section 300a then instructs the communications means (not shown) to transmit (respond) an authentication result to the service relay device 200 (S503).

As the control section 200a in the service relay device 200 receives the authentication result from the service providing device 300 (S405), the section 200a determines whether the authentication has been successful (S406). If the authentication is determined to have been a failure, the section 200a causes data indicating the authentication failure to be transmitted (notified) from the first-time authentication verification means 32 to the service using terminal 10 via the data transmitting means 33 (S407).

In contrast, if the authentication has been successful, the control section 200a instructs the encryption means 34 to encrypt the basic authentication information contained in the data received in S403 from the service using terminal 10 (S408). Thereafter, the control section 200a instructs the template generating means 41 in the template transmitting device 40 to generate a regular use template (S409) and instructs the template transmitting means 43 to transmit the generated regular use template to the service using terminal 10 (S410).

The control section 10a in the service using terminal 10 determines whether an authentication failure notification has been received from the service relay device 200 (S61). If an authentication failure notification has been received, the section 10a repeats S58 and its subsequent steps.

In contrast, if no authentication failure notification has been received, the control section 10a instructs the template obtaining means 11 to receive/obtain the regular use template transmitted from the template transmitting device 40 (S62). Then, the section 10a stores the obtained regular use template in the template storage section 13a in the storage means 13 (S63).

Next, the control section 10a displays on the display means 15 information indicating that the regular use template has been obtained (S64). The section 10a also displays on the display means 15 information prompting the service user to enter a reproduction start command for the regular use template (S65). This ends the first-time authentication process in the service providing system 1.

Figure 20:
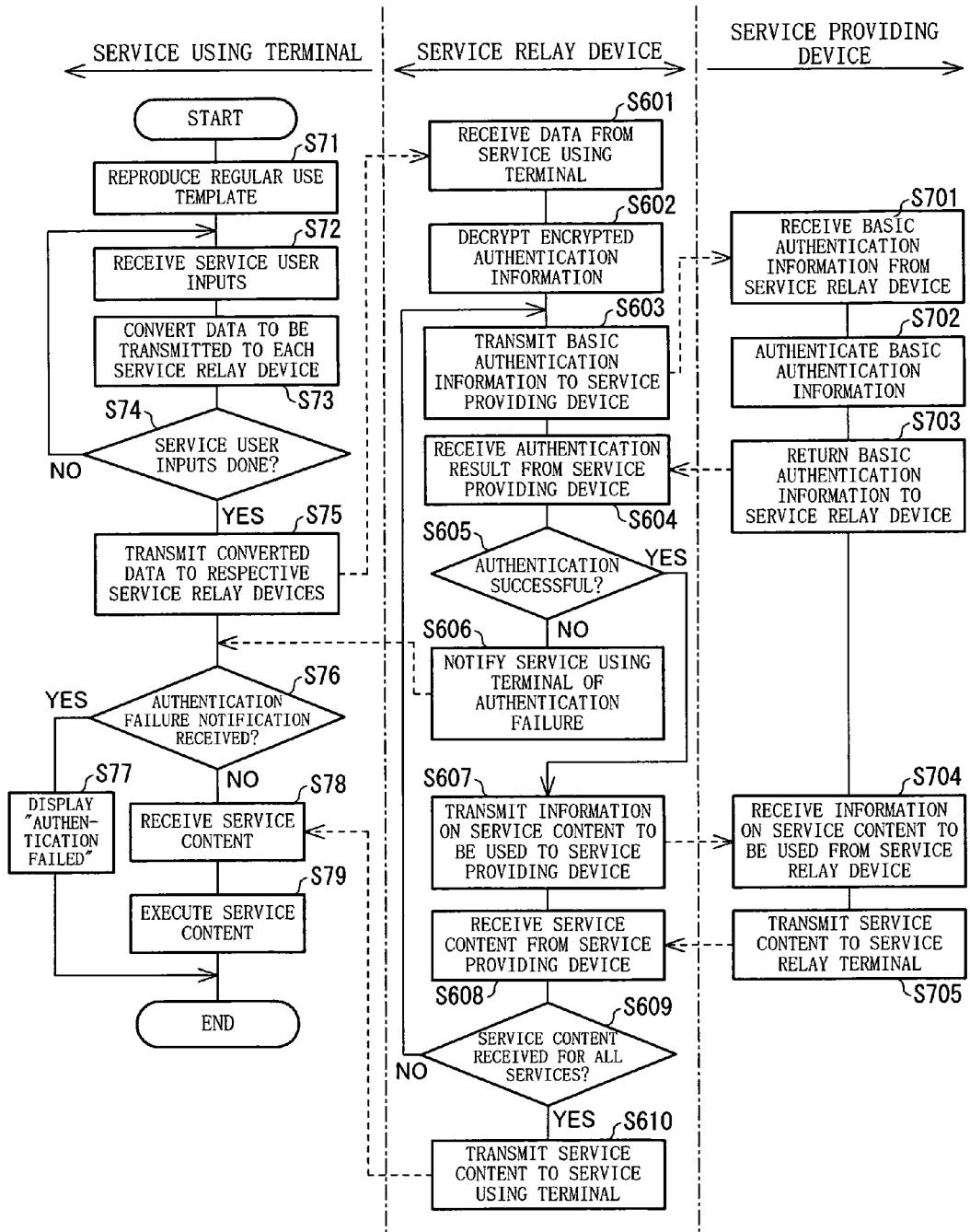
FIG. 20 is a flow diagram depicting steps of the second-time and subsequent authentication and service providing processes in the service providing system shown in FIG. 16.

Next will be described the operation of the service providing system 2 in the second-time and subsequent authentication processes and the service providing process. FIG. 20 is a flow diagram depicting process steps of the second-time and subsequent authentication processes and the service providing process in the service providing system 2.

As a template reproduction command is received from the service user, the control section 10*a* in the service using terminal 10 reproduces the specified template (S71) the template reproduction command from the service user may be entered through a service selection screen as in embodiment 1 or through a Reproduce Template button which appears when the regular use template is obtained. Here is assumed the selection of the FIG. 21 regular use template for the recommended book purchasing services.

Figure 21:
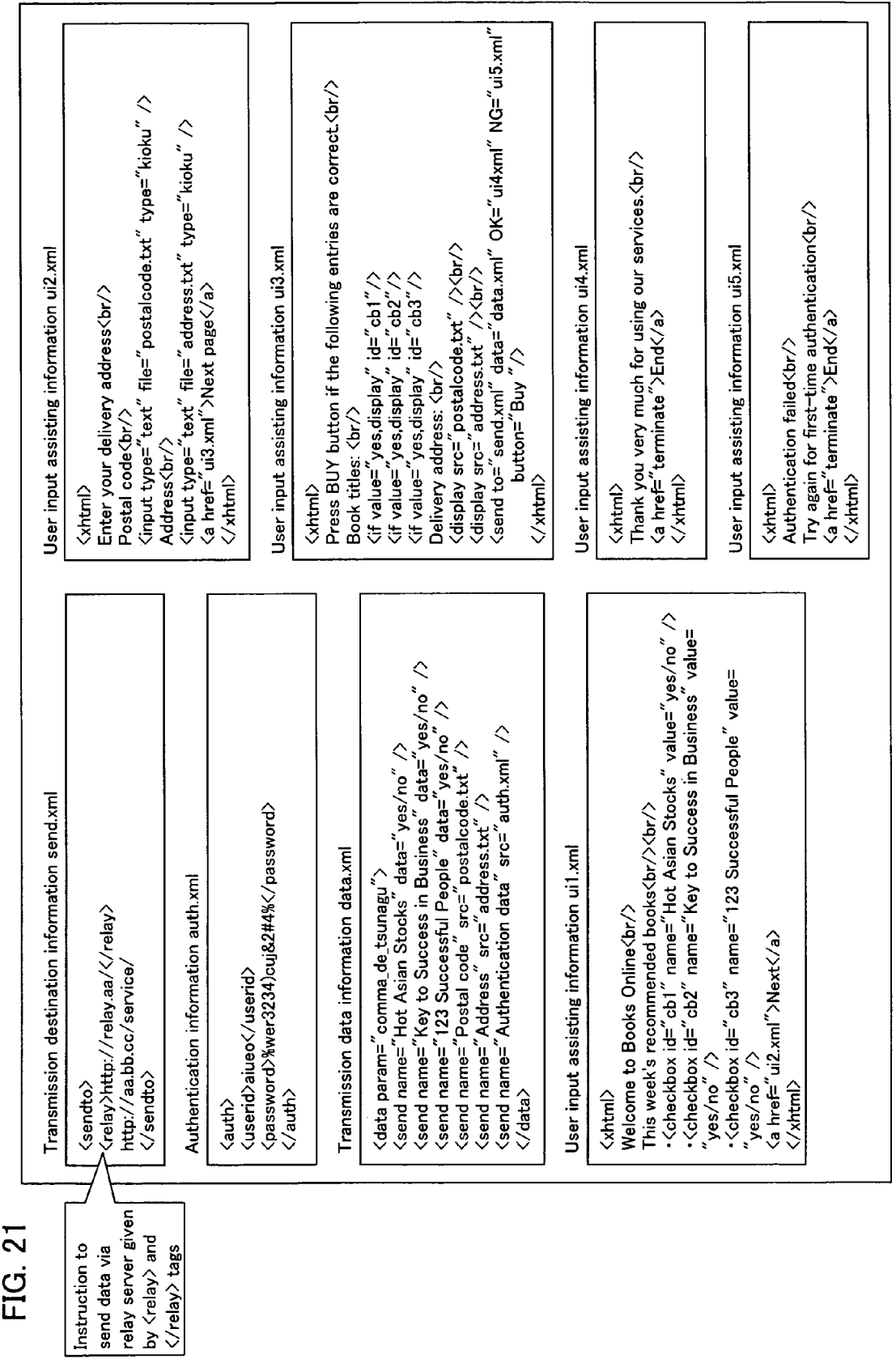
FIG. 21 is an illustration depicting an exemplary regular use template used in the service providing system shown in FIG. 16.

Reproducing the FIG. 21 regular use template makes interfaces sequentially appear on the display means 15 based on the user input assisting information ui1.xml to ui3.xml so that the service user can sequentially enter necessary data to utilize the service on the individual displays. The information entered by the service user is converted by the data conversion means 18 to transmission data on the basis of the transmission data information data.xml contained in the regular use template.

In other words, by reproducing a regular use template in S71, the control section 10*a* in the service using terminal 10 receives a service user input in accordance with the user input assisting information in the regular use template (S72), and instructs the data conversion means 18 to convert the input information to transmission data on the basis of the transmission data information data.xml (information on the conversion method for the transmission data contained in the regular use template) (S73).

The control section 10*a* then determines whether the service user inputs are all done (S74), If not, the section 10*a* repeats S72 and S73.

In contrast, if all the service user inputs are done, the converted transmission data is transmitted to the specified service relay device 200 (data receiving device 50) specified in the transmission destination information send.xml in the regular use template (S75).

As the data receiving means 51 in the data receiving device 50 receives the data transmitted from the service using terminal 10 (S601), the control section 200*a* in the service relay device 200 instructs the decryption means 52 to decrypt the encrypted authentication information in the data (S602). The control section 200*a* then instructs the communications means (not shown) to transmit the decrypted basic authentication information to the service providing device 300 (S603).

As the communications means (not shown) receives the basic authentication information transmitted from the service relay device 200 (S701), the control section 300*a* in the service providing device 300 instructs the authentication means 61 to authenticate the received basic authentication information (S702). The section 300*a* then instructs the communications means (not shown) to transmit (respond) an authentication result to the service relay device 200 (S703).

As the control section 200*a* in the service relay device 200 receives the authentication result from the service providing device 300 (S604), the section 200*a* determines whether the authentication has been successful (S605). If the authentication is determined to have been a failure, the section 200*a* causes data indicating the authentication failure to be transmitted (notified) from the first-time authentication verification means 32 to the service using terminal 10 via the data transmitting means 33 (S606).

In contrast, if the authentication has been successful, the control section 200*a* causes information on the service content to be used to be transmitted via communications means (not shown) from the service execution verification means 54 to the service providing device 300 via communications means (not shown) (S607).

As the information on the service content to be used is received from the service relay device 200 (S704), the control section 300*a* in the service providing device 300 causes service content to be transmitted from the service execution means 62 to the service relay device 200 via the communications means (not shown) (S705).

The control section 200*a* in the service relay device 200 receives the service content from the service providing device 300 via the communications means (not shown) (S608). If the data received in S601 from the service using terminal 10 contains a request for services from multiple service providing devices, the control section 200*a* determines whether service content have been received from all the services (S609). If there is missing service content, S603 and its subsequent steps are repeated. In contrast, if service content has been received for all the services, the section 200*a* causes the entire service content received to be transmitted to the service using terminal 10 via the data transmitting means 55 (S610). When only the service provided by a single service providing device 300 is to be used, S609 may be omitted.

The control section 10*a* in the service using terminal 10 determines whether an authentication failure notification has been received from the service relay device 200 (S76). If an authentication failure notification has been received, the section 10*a* displays on the display means 15 information indicating the authentication failure (S77) and ends the second-time and subsequent authentication processes and the service providing process.

In contrast, if no authentication failure notification has been received, the control section 10*a* instructs the data receiving means 12 to receive/obtain the service content transmitted from the data receiving device 50 in the service relay device 200 (S78). The obtained service content is then executed (S79), and the second-time and subsequent authentication processes and the service providing process are ended.

As described in the foregoing, in the service providing system 2 in the present embodiment, the service relay device 200 includes the first-time template transmitting device 20, the first-time data receiving device 30, the template transmitting device 40, and the data receiving device 50. The first-time template and the regular use template, which are needed when utilizing a service, are used only between the service relay device 200 and the service using terminal 10.

Therefore, there is no need to provide the service providing device 300 with a means of handling the first-time template and the regular use template. This enables service providing devices in the conventional service providing system to be used in the service providing system 2 without any changes or modifications.

The service providing device can be configured simply as with conventional ones. New service providing devices can be readily provided. Therefore, the service provider can provide new services easily at low cost.

Embodiment 4

Another embodiment of the present invention will be described. For convenience, members of the present embodiment that have the same arrangement and function as members of any of embodiments 1 to 3, and that are mentioned in that embodiment are indicated by the same reference numerals and description thereof is omitted.

The present embodiment will describe the obtaining of a regular use template, related to a certain service, which will however be used for a different service. The present embodiment is applicable to any of the configurations described in the foregoing embodiments. In the following, the embodiment is applied to the configuration of embodiment 1.

Figure 22:
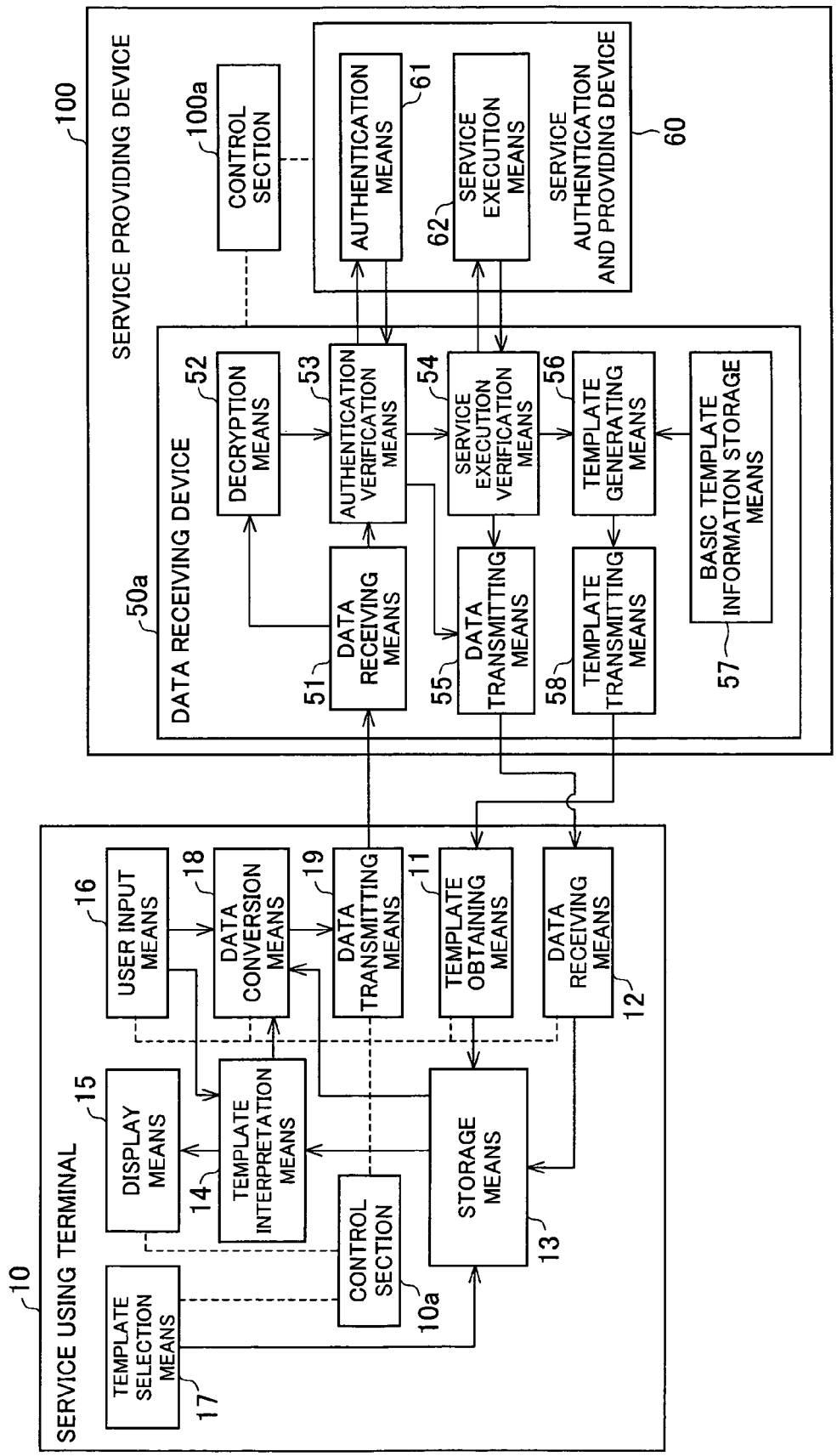
FIG. 22 is a schematic block diagram depicting the configuration of a service providing system in accordance with yet another embodiment of the present invention.

FIG. 22 is a schematic block diagram depicting the configuration of a service providing system 1c of the present embodiment. As shown in the figure, the service providing system 1c of the present embodiment includes a data receiving device 50a whose configuration partly differs from that of the data receiving device 50 in the service providing system 1 described in embodiment 1. The service providing device 100 is otherwise the same as embodiment 1. The description is not repeated for FIG. 22.

As shown in FIG. 22, the data receiving device 50a includes a data receiving means 51, a decryption means 52, an authentication verification means 53, a service execution verification means 54, and a data transmitting means 55. The device 50a further includes a template generating means 56, a basic template information storage means 57, and a template transmitting means 58.

The basic template information storage means 42 contains basic template information. Here, the basic template information gives a proto-template from which the template generating means 56 generates a template.

The template generating means 56 retrieves the basic template information from the basic template information storage means 57. The means 56 then combines the retrieved basic template information with the information received from the service using terminal 10 to generate a new template.

The template transmitting means 58 is for transmitting the template generated by the template generating means 56 to the service using terminal 10.

Next, the operation of the service providing system 1c will be described. The first-time authentication process is the same as in embodiment 1: its description is not repeated.

Figure 23:
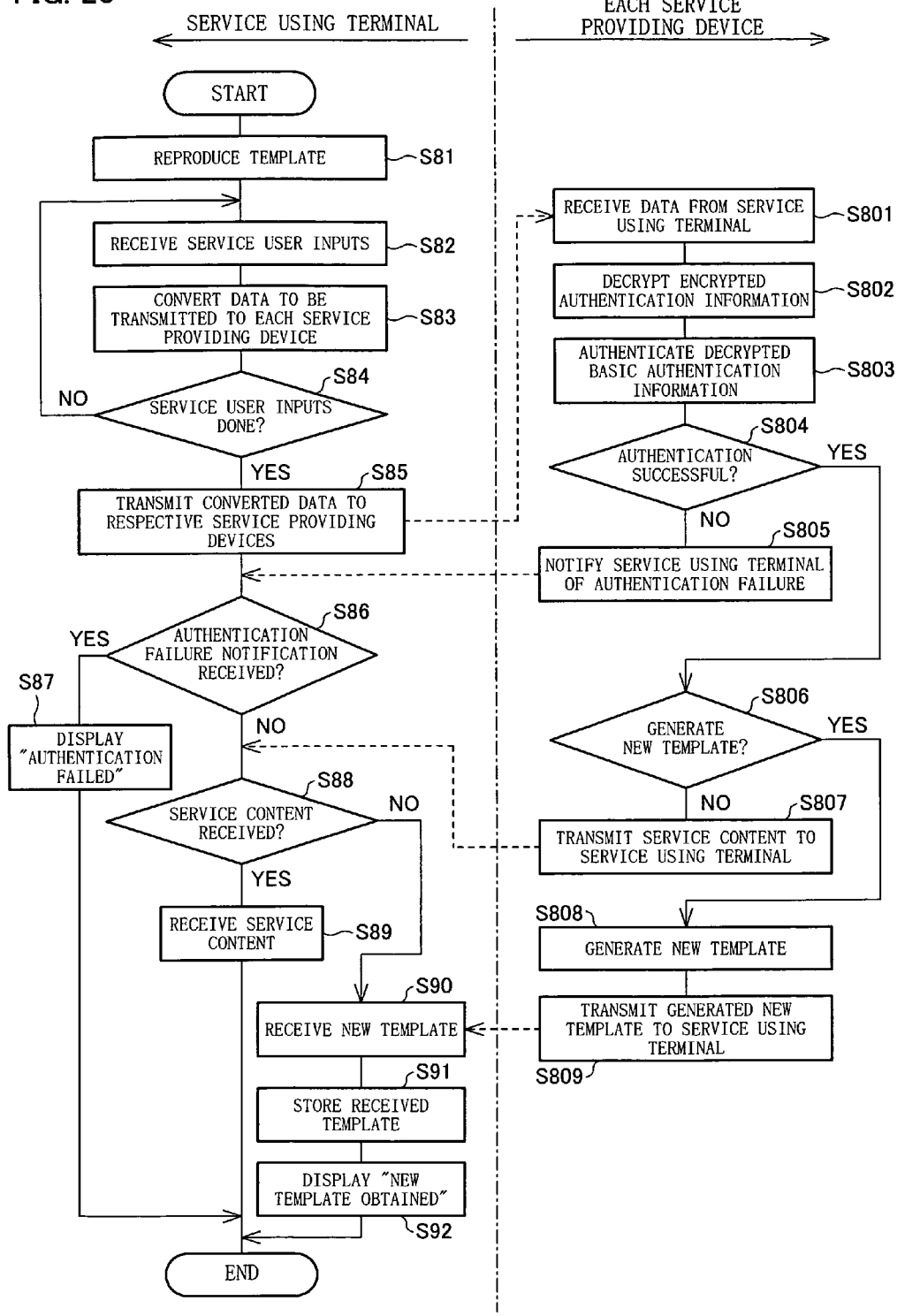
FIG. 23 is a flow diagram depicting steps of the second-time and subsequent authentication and service providing processes in the service providing system shown in FIG. 22.

FIG. 23 is a flow diagram depicting steps of the second-time and subsequent authentication and service providing processes in the service providing system 1c.

First, as a template reproduction command is received from the service user, the control section 10a in the service using terminal 10 reproduces a specified template (S41). Here is assumed the selection of the FIG. 24 template.

Figure 24:
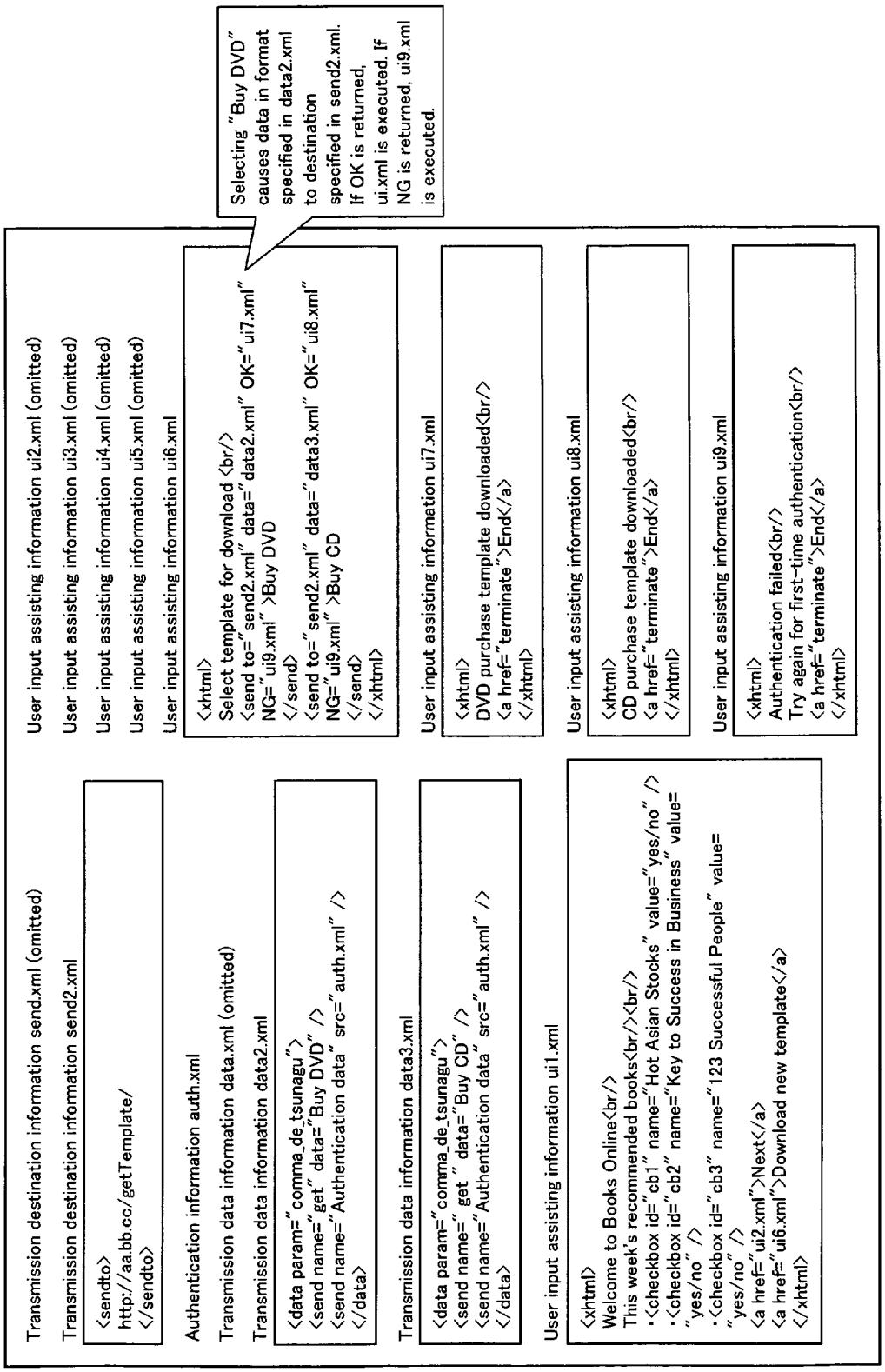
FIG. 24 is an illustration depicting an exemplary template used in the service providing system shown in FIG. 22.
Figure 25:
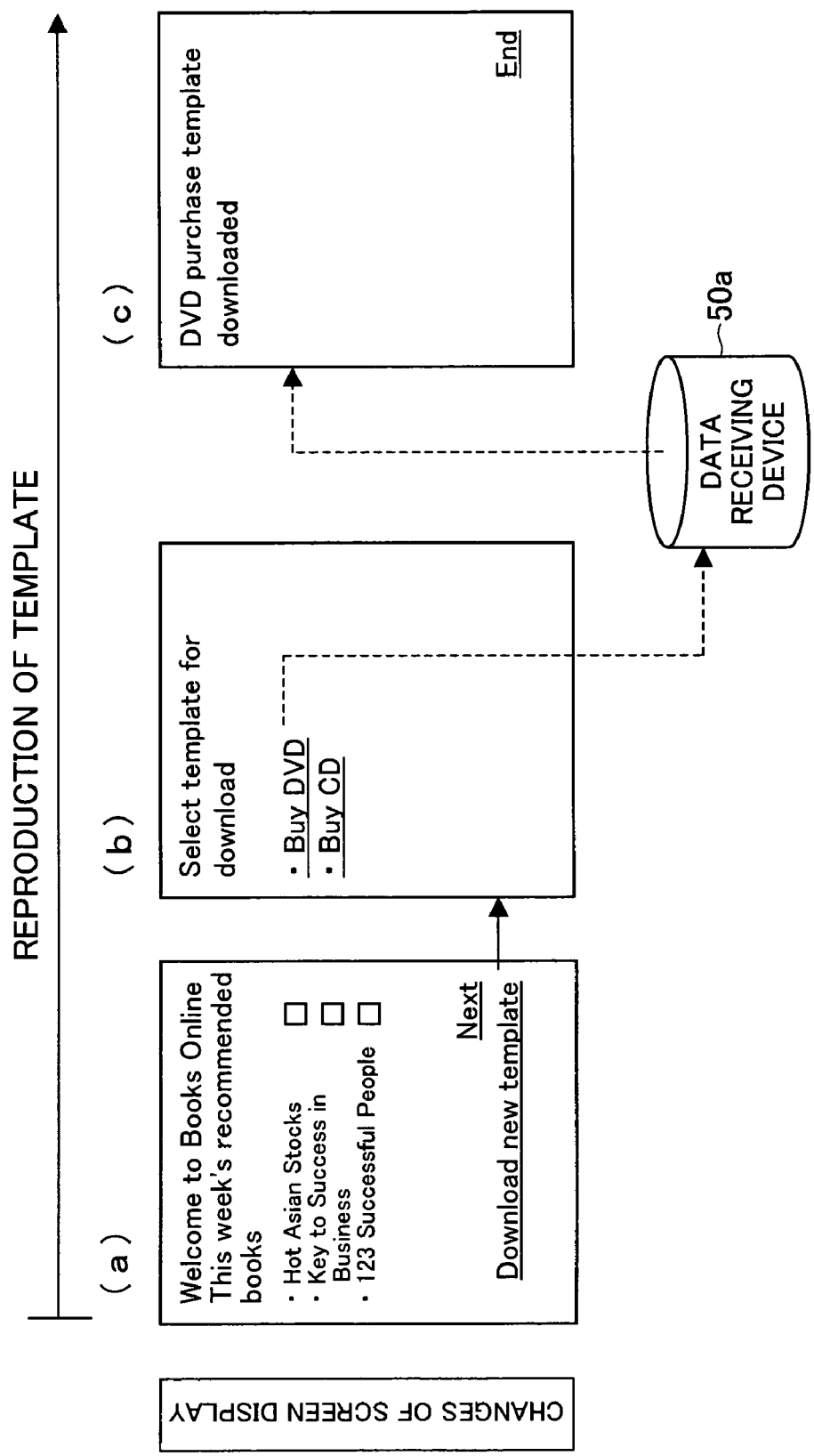
FIG. 25(a) to 25(c) are illustrations of screen displays by display means of a service using terminal in the service providing system shown in FIG. 22 during the second-time and subsequent authentication processes.

After the reproduction of the FIG. 24 regular use template, first, the display means 15 displays the content of the user input assisting information ui1.xml. FIG. 25(a) is an illustration of the screen display. As shown in the figure, on the basis of the user input assisting information ui1.xml are displayed the titles (list) of recommended books, check boxes for selecting books to be purchased (appearing next to the recommended book titles), a Go to Next Page button for the input of a command to open a next screen display, and a Download New Template button to send a command to download a new template.

As the service user selects the Download New Template button, the display means 15 displays the content of the user input assisting information ui6.xml. FIG. 25(b) is an illustration of the screen display on the display means 15. As shown in the figure, a list of new templates now available for download is displayed on the basis of the user input assisting information ui6.xml.

As the service user selects the template for the service he/she wants to utilize on the FIG. 25(b) screen display, the data conversion means 18 converts transmission data on the basis of transmission data information (data2.xml or data3.xml) corresponding to the selected template. The data transmitting means 19 transmits the converted data to the transmission destination specified in the transmission destination information send2.

In this manner, by reproducing the regular use template in S81, the control section 10a in the service using terminal 10 receives service user inputs in accordance with the user input assisting information in the regular use template (S82) and instructs the data conversion means 18 to convert the input information to transmission data on the basis of the transmission data information (information on a transmission data conversion method in the regular use template) (S83).

The section 10a then determines whether the service user inputs are all done (S84). If not, the section 10a repeats S82 and S83.

In contrast, if all the service user inputs are done, the converted transmission data for the services is transmitted to the transmission destination (data receiving device 50a) specified in the transmission destination information in the regular use template (S85). FIG. 26 is an illustration depicting exemplary data transmitted from the service using terminal 10 to the service -providing device 100 (data receiving device 50a) in S85.

As the data receiving means 51 in the data receiving device 50a receives the data transmitted from the service using terminal 10 (S801), the control section 100a in the service providing device 100 instructs the decryption means 52 to decrypt the encrypted authentication information contained in the data (S802). The control section 100a instructs the authentication means 61 in the service authentication and providing device 60 to authenticate the decrypted authentication information (S803).

Next, the control section 100a determines whether the authentication has been successful (S804). If the authentication is determined to have been a failure, the section 100a notifies the service using terminal 10 by transmitting data indicating the authentication failure via the authentication verification means 53 and the data transmitting means 55 (S805).

In contrast, if the authentication has been successful, the control section 100a determines with the service execution verification means 54 whether the data received from the service using terminal 10 is a request for a new service template (regular use template), that is, whether it is necessary to generate a new template (regular use template) (S806).

If there is no need to generate a new template, the control section 100a instructs the service execution verification means 54 to make a request to the service execution means 62 in the service authentication and providing device 60 for service content and further instructs the service execution means 62 to transmit the service content to the service using terminal 10 via the service execution verification means 54 and the data transmitting means 55 (S807).

In contrast, if there is a need to generate a new template, the control section 100a instructs the template generating means 56 to generates a new template (S808). Specifically, the control section 100a instructs the template generating means 41 to retrieve the basic template information from the basic template information storage means 42 and to generate a new template by combining the retrieved basic template information with the information received from the service using terminal 10.

Further, the control section 100a instructs the template transmitting means 58 to transmit the template thus generated to the service using terminal 10 (S809). FIG. 27 is an illustration depicting exemplary data transmitted from the service providing device 100 (data receiving device 50a) to the service using terminal 10 in S809.

The control section 10a in the service using terminal 10 determines whether an authentication failure notification has been received from the service providing device 100 (S86). If no authentication failure notification has been received, the section 10a displays information indicating the authentication failure on the display means 15 (S87), thereby ending the second-time and subsequent authentication processes and the service providing process.

In contrast, if no authentication failure notification has been received, the control section 10a determines whether service content has been received from the data receiving device 50 (S88). If service content has been received, the section 10a executes the received (obtained) service content (S89), thereby ending the second-time and subsequent authentication processes and the service providing process.

In contrast, no service content is received, the section 10a instructs the template obtaining means 11 to receive (obtain) a new template (S90) and stores the obtained template in the template storage section 13a in the storage means 13 (S91). The control section 10a then displays information indicating that a new template has been obtained on the display means 15 (S92). FIG. 25(c) is an example of a screen display in this case. This ends the new template obtain process.

As described in the foregoing, in the service providing system 1c of the present embodiment, the regular use template contains user input assisting information based on which a new template is obtained. In addition, in the service providing device 100, the data receiving device 50a generates a new template in accordance with the data received the service using terminal 10 and transmits the generated template to the service using terminal 10.

Accordingly, if the service user wants to obtain a new service template, he/she can utilize a template which is already obtained to obtain the new service template.

The present embodiment has so far assumed that the data receiving device 50a generates a new template. This is by no means intended to be limiting the invention.

For example, if the data receiving device 50a receives information from the service using terminal 10 requesting a new template, necessary information may be transferred to the template generating means 41 in the template transmitting device 40 so that the template transmitting device 40 can generate a new template and a new template can be transmitted to the service using terminal 10.

Alternatively, if the data receiving device 50a receives information from the service using terminal 10 requesting a new template, necessary information may be transferred to the first-time template transmitting device 20 so that the first-time template transmitting device 20 can transmit a new first-time template to the service using terminal 10.

In addition, the present embodiment has so far assumed that if the authentication is successful, the service providing device 100 (data receiving device 50a) sends the service using terminal 10 either service content or a new template. This is by no means intended to be limiting the invention. For example, both the service content and the new template may be transmitted.

Embodiment 5

Another embodiment of the present invention will be described. For convenience, members of the present embodiment that have the same arrangement and function as members of any of embodiments 1 to 4, and that are mentioned in that embodiment are indicated by the same reference numerals and description thereof is omitted.

Figures 28, 29:
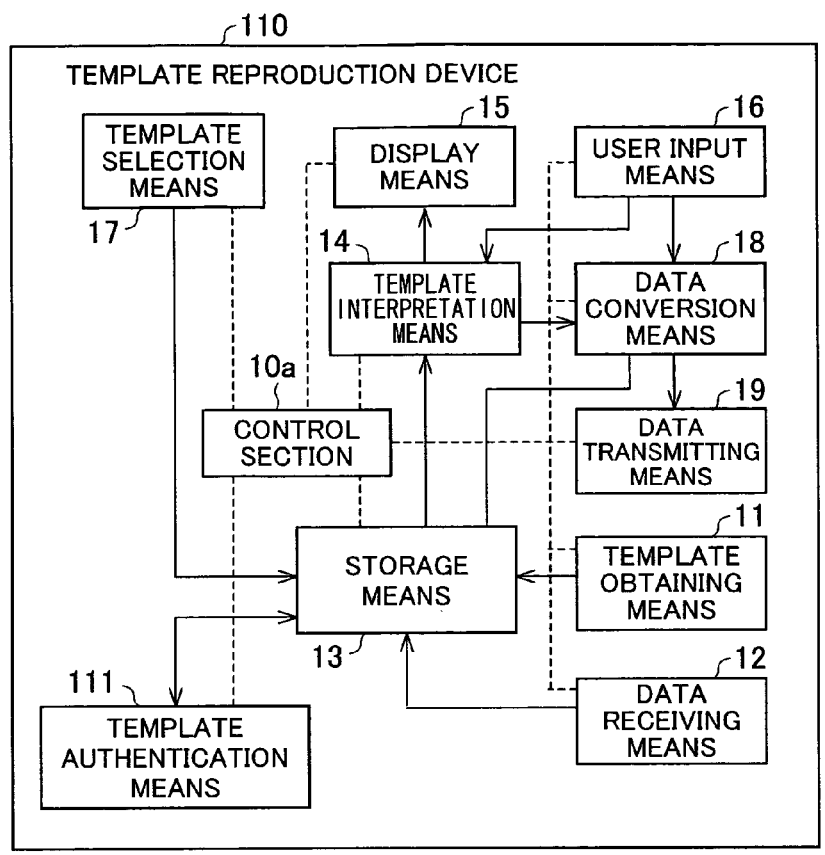
FIG. 28 is a block diagram depicting the configuration of a service using terminal in accordance with another embodiment of the present invention.
FIG. 29 is an illustration depicting exemplary template information contained in a template stored in the service using terminal shown in FIG. 28.

The present embodiment will describe the service using terminal (service using device) authenticating the template. FIG. 28 is a block diagram depicting the configuration of a service using terminal (service using device) 110 of the present embodiment. As shown in the figure, the service using terminal 110 has the same configuration as the service using terminal 10 of embodiments 1 to 4 and additionally includes a template authentication means 111.

The template authentication means 111 is for determining whether a template is reproducible on the basis of the template information contained in the template (authentication).

Here, the template information is information including, for example, the title and lifetime of the template and information by which is identified a service using terminal capable of reproducing the template (for example, terminal ID). FIG. 29 is an illustration depicting exemplary template information contained in a template. In the shown example, the template information includes the template's lifetime and the terminal ID which is capable of reproducing the template.

Figure 30:
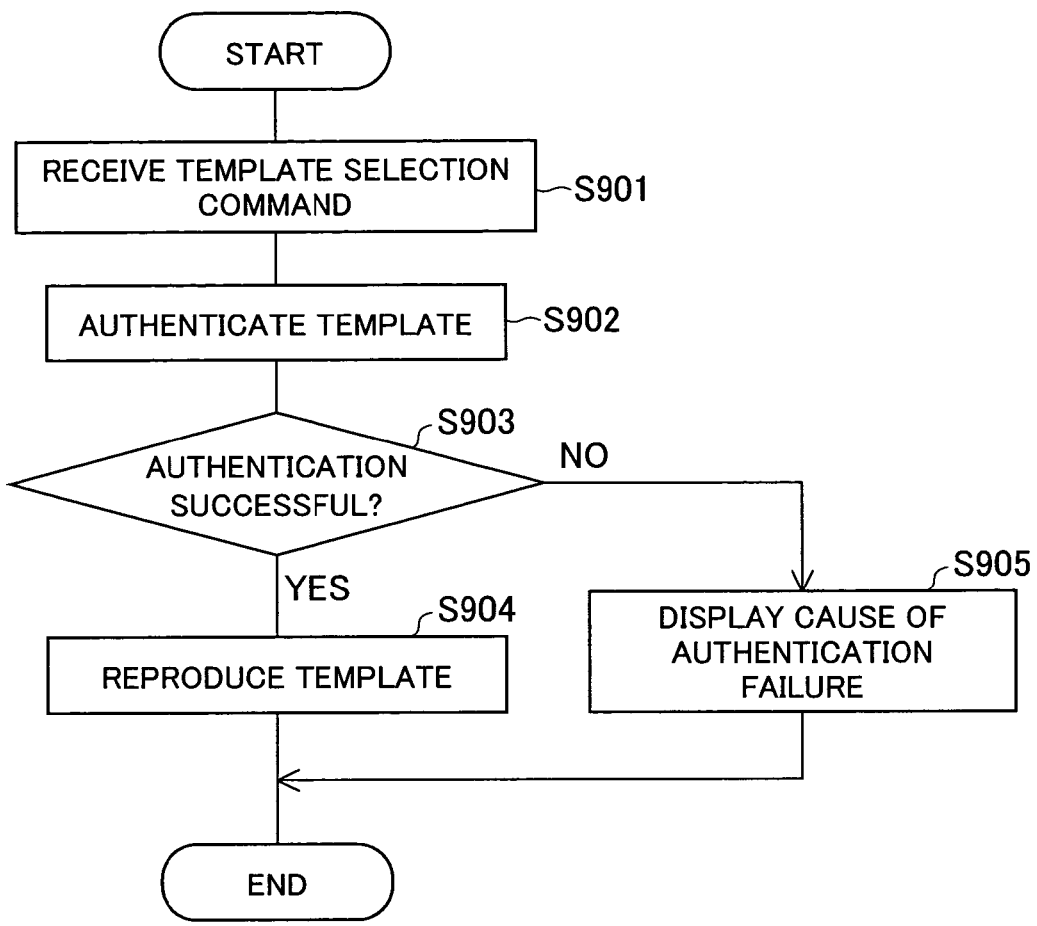
FIG. 30 is a flow diagram depicting an operation flow in template reproduction in a service using terminal in a service providing system in accordance with yet another embodiment of the present invention.

Next, the operation of the service using terminal 110 in template reproduction will be described. FIG. 30 is a flow diagram depicting an operation flow in template reproduction in the service using terminal 110.

As shown in the figure, as a template selection command is received from the service user (S901), the control section 10a in the service using terminal 10 implements an authentication process according to the template (S902). For example, if the template contains the template information shown in FIG. 29, the section 10a checks if the lifetime is exceeded and if the terminal ID of the service using terminal 110 matches with any of terminal IDs capable of reproducing the template.

The control section 10a then determines whether the authentication has been successful (S903), If the authentication has been successful, the template is reproduced for predetermined operation.

Figure 31:
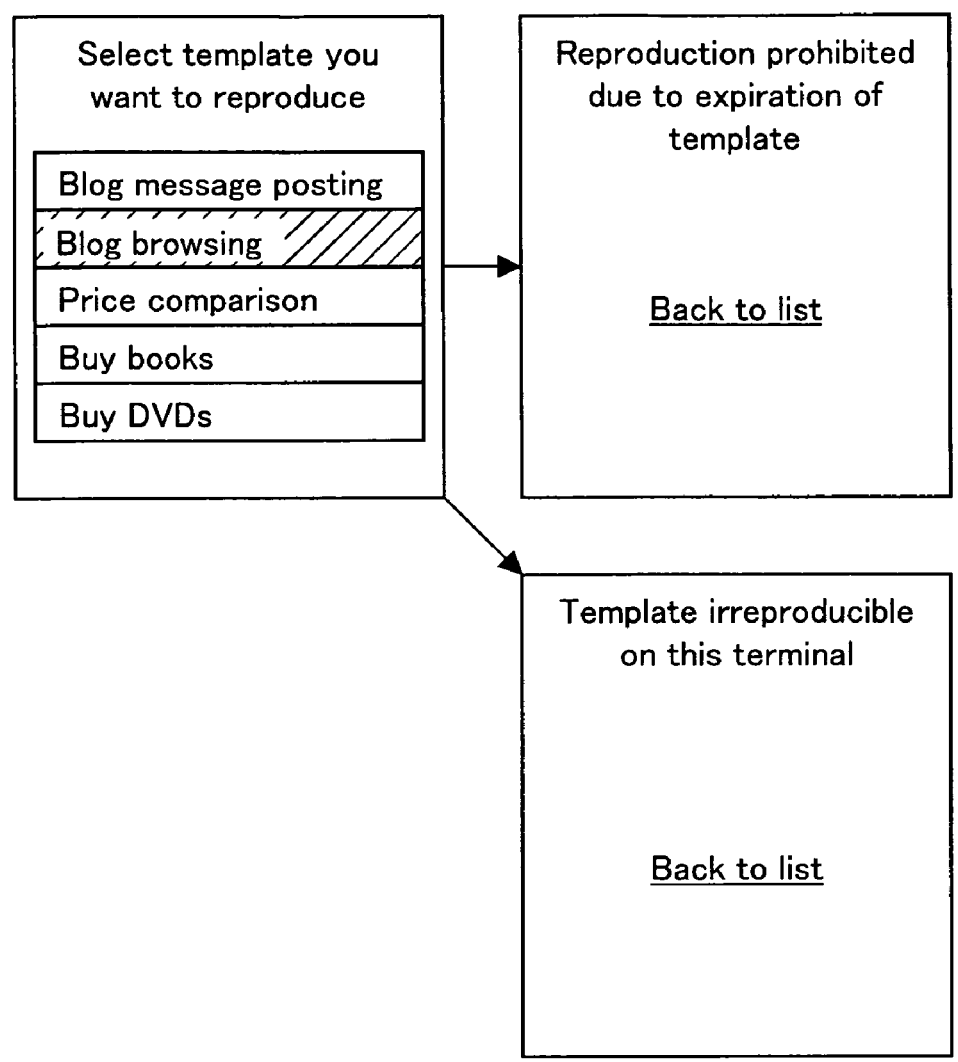
FIG. 31 is an illustration of a screen display by display means of a service using terminal in the service providing system shown in FIG. 30.

In contrast, if the authentication has been a failure, the display means 15 displays the cause of the authentication failure (S904). FIG. 31 is an illustration of changing screen displays in this case. As shown in the figure, as a template is selected on the template selection screen in S901, S902 and S903 are implemented. If the authentication has been a failure, its cause is displayed. For example, if the lifetime has been exceeded, a prompt appears: "Reproduction prohibited due to expiration of template." If the terminal ID of the service using terminal 110 does not match with any terminal IDs capable of reproducing the template, a prompt appears: "Template irreproducible on this terminal."

As described in the foregoing, in the present embodiment, the service using terminal 110 authenticates the template. In this case, the template can be authenticate without the service using terminal 110 transmitting data to the service providing device or the service relay device. The number of communication process steps is thus reduced.

Embodiment 6

Another embodiment of the present invention will be described. For convenience, members of the present embodiment that have the same arrangement and function as members of any of embodiments 1 to 5, and that are mentioned in that embodiment are indicated by the same reference numerals and description thereof is omitted.

In the foregoing embodiments, the first-time authentication was done using the first-time template, the second-time and subsequent authentication were done using the regular use template. Specifically, in the first-time authentication, the service user entered the password and other authentication information according to the first-time template. Upon a successful authentication, part of the authentication information is encrypted to generate a regular use template.

In contrast, in the service providing system of the present embodiment, no first-time template is used. The first-time authentication is done using the regular use template.

Figure 33:
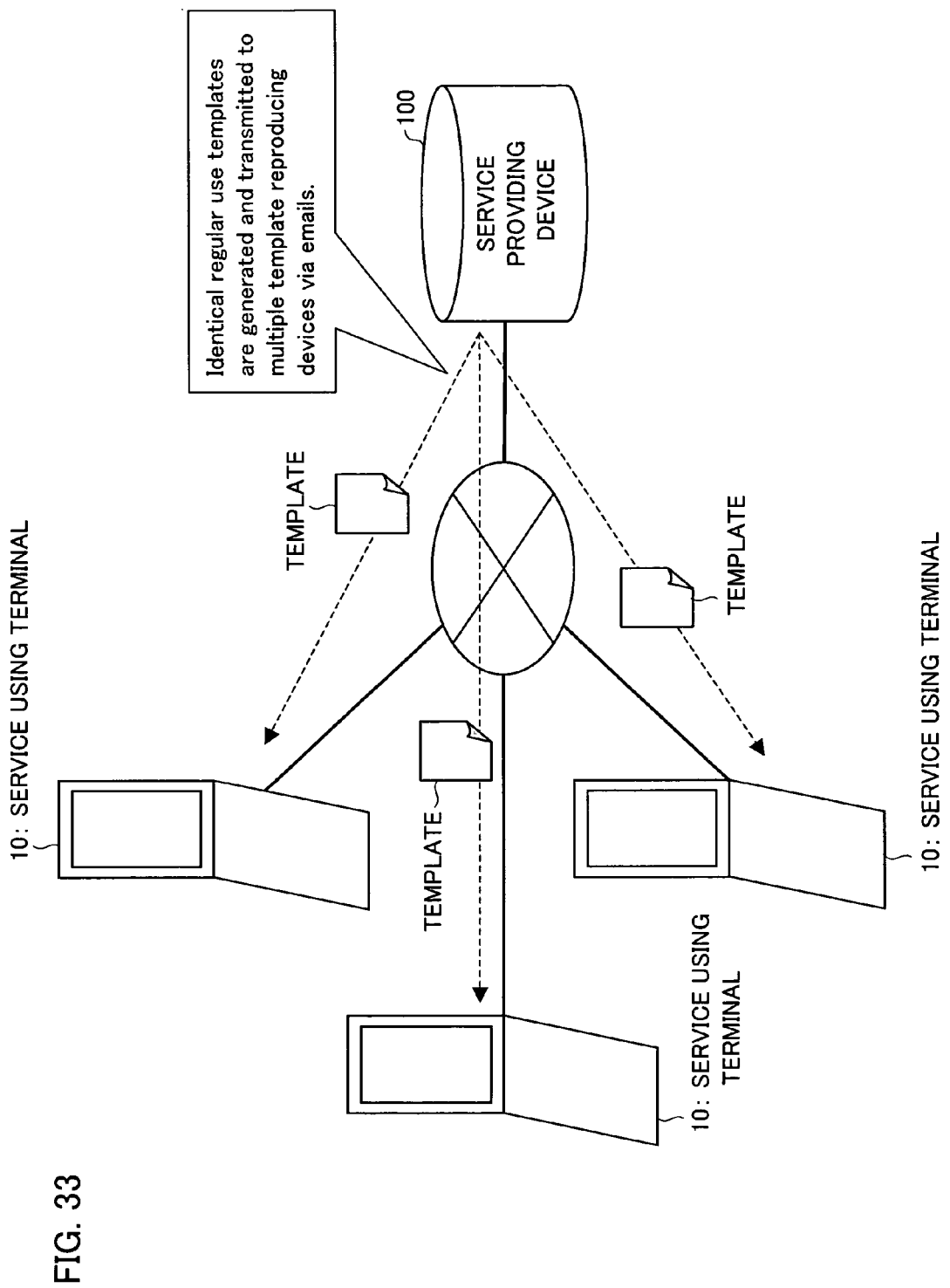
FIG. 33 is a schematic illustration of the configuration of a service providing system in accordance with another embodiment of the present invention.

FIG. 33 is a schematic illustration of the configuration of a service providing system of the present embodiment. The present embodiment is applicable to any of the foregoing embodiments. In the following, the embodiment is applied to embodiment 1.

In the present embodiment, the template storage means 21 in the first-time template transmitting device 20 contains a common regular use template for all service using terminals 10. As the transmission request receiving means 23 receives a template transmission request, the regular use template is transmitted from the template storage means 21 to the service using terminal 10.

FIG. 34(*a*) is an illustration depicting an example of the transmission data information data.xml contained in the regular use template. FIG. 34(*b*) is an illustration depicting exemplary transmission data converted by the data conversion means 18 based on the FIG. 34(*a*) transmission data information, that is, the data transmitted from the service using terminal 10 to the service providing device 100.

In these illustrated examples, the terminal ID obtained from the storage means (not shown) in the service using terminal 10 by the function, getTerminalID ( ), by which the terminal ID is obtained from the service using terminal 10 is included as authentication data in the transmission data transmitted from the service using terminal 10 to the service providing device 100. For example, by adding, to transmission data information, a description for instructions to obtain the terminal ID from the storage means (not shown) in the service using terminal 10 and add the obtained terminal ID to the transmission data, the terminal ID is automatically transmitted to the data conversion means 18 in data transmission.

In addition, in the present embodiment, the basic authentication information contains no service user identifying information (user ID, password, etc.). There is no need for the service user to enter such information for the first-time authentication. So, there is no need to customize the template for individual service users.

As described in the foregoing, in the service providing system of the present embodiment, the service providing device 100 transmits the same regular use template to all the service using terminals 10. Since the basic authentication information in the regular use template contains no user identifying information, there is no need to transmit the user information entered by the service user for the first-time authentication from the service using terminal 10 to the service providing device 100.

Accordingly, the number of communication process steps required to use the services is reduced. So are the convenience and communications cost for the service user.

In addition, the transmission data information in the regular use template contains a description instructing the service using terminal 10 to obtain the terminal ID of the service using terminal 10 for transmission to the service providing device 100.

Accordingly, the service using terminal 10 can be authenticated using the terminal ID automatically transmitted from the service using terminal 10 to the service providing device 100.

The present embodiment has so far assumed that the terminal ID is transmitted as authentication data. The authentication data is actually not limited to terminal ID. The authentication data may be of any type so long as the data is information about the individual person (service user) or the terminal (service using terminal). For example, a system may be built in which. GPS information is transmitted so as to allow authentication to only those terminals which access from particular geographic regions. Alternatively, a system may be built in which the ring tone music the terminal is set up to play is transmitted so as to allow authentication to only those terminals set up to play ring tone music of a particular musician.

Embodiment 7

Another embodiment of the present invention will be described. For convenience, members of the present embodiment that have the same arrangement and function as members of any of embodiments 1 to 5, and that are mentioned in that embodiment are indicated by the same reference numerals and description thereof is omitted.

Figure 35:
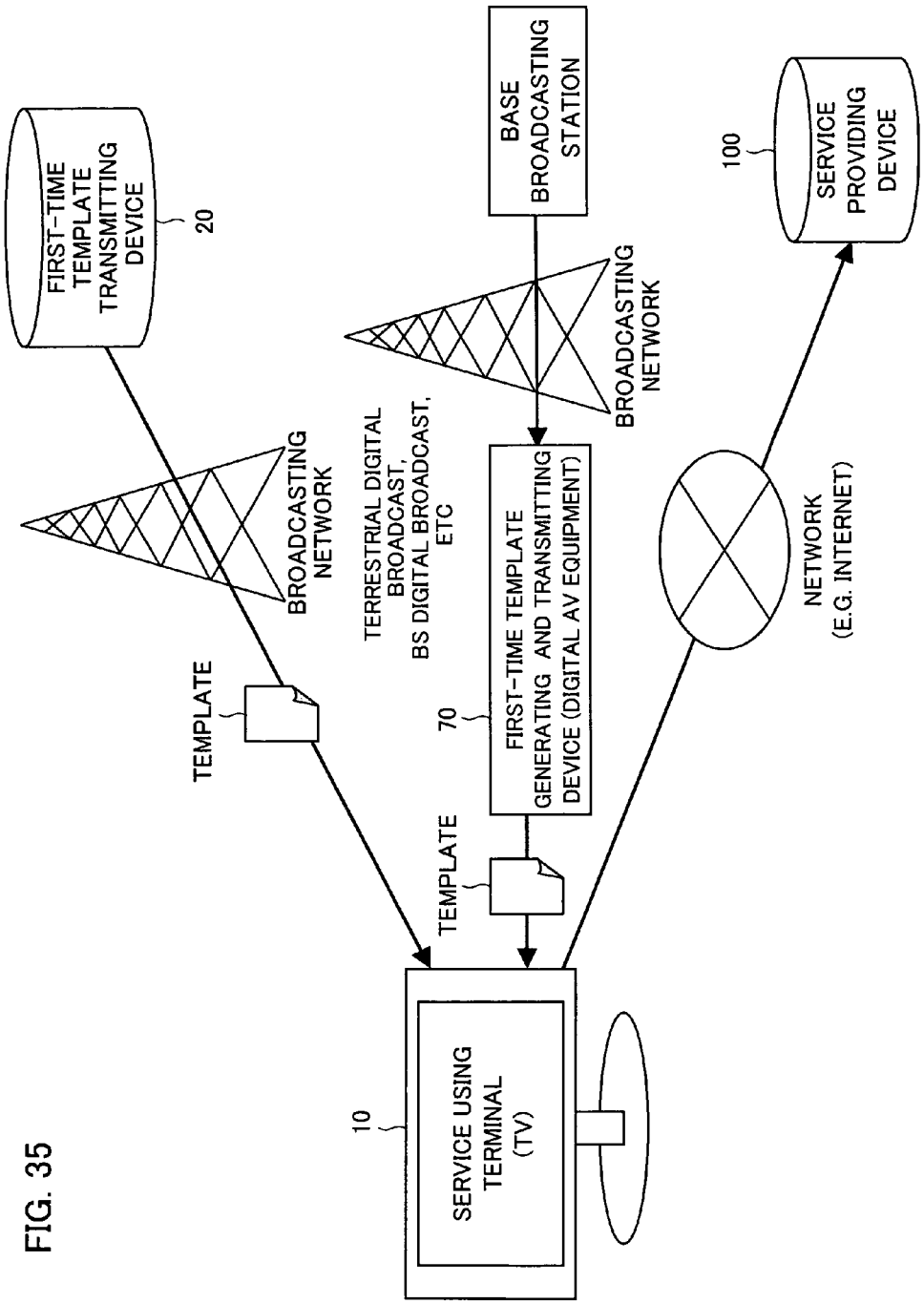
FIG. 35 is a schematic illustration of the configuration of a service providing system in accordance with another embodiment of the present invention.

FIG. 35 is a schematic illustration of the configuration of a service providing system 3 of the present embodiment. As shown in the figure, in the present embodiment, a television is used as the service using terminal 10.

To this service using terminal 10, the first-time template is transmitted from the first-time template transmitting device 20 via a terrestrial digital broadcast, BS digital broadcast, and other broadcasting network, for example. The service using terminal 10 which has received the first-time template can use the same services as in the foregoing embodiments by reproducing the first-time template.

In the first-time, second-time, and subsequent authentications, data and templates may be transmitted over the Internet or another network to the service providing device 100 (or service relay means 200, first-time data receiving device 30, data receiving device 50) specified in the transmission destination information in the first-time template. In addition, in this case, the service providing device 100 or service relay device 200 specified by the transmission destination information in the first-time template may be configured without the first-time template transmitting device 20.

In addition, a digital AV equipment (first-time template generating and transmitting device) 70 may receive the data transmitted from a base broadcasting station via a terrestrial digital broadcast, BS digital broadcast, or other broadcasting network so that the first-time template generating and transmitting device 70 can generate a template based on the received data for transmission to the service using terminal 10.

Figure 36:
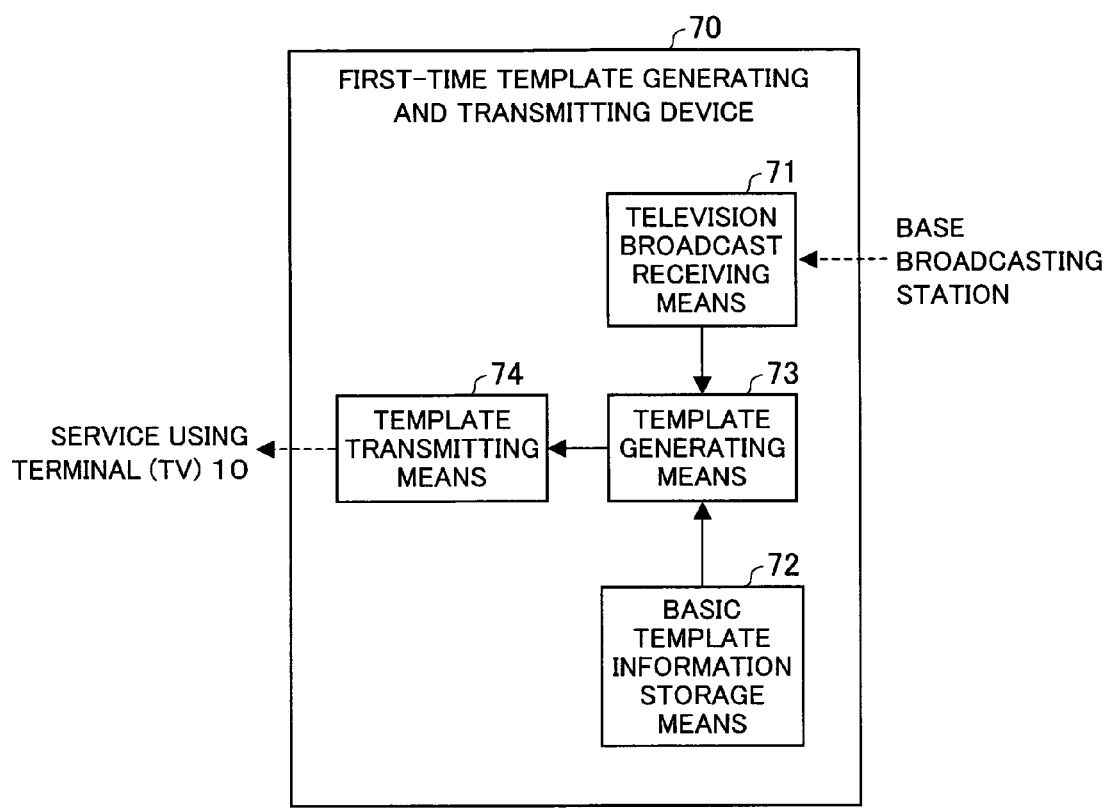
FIG. 36 is a block diagram depicting the configuration of a first-time template generating and transmitting device provided in the service providing system shown in FIG. 35.

FIG. 36 is a block diagram depicting the configuration of the first-time template generating and transmitting device 70 in this case. As shown in the figure, the first-time template generating and transmitting device 70 contains television broadcast receiving means 71, basic template information storage means 72, template generating means 73, and template transmitting means 74.

The television broadcast receiving means 71 is for receiving data transmitted over a terrestrial digital broadcast, BS digital broadcast, or other broadcasting network.

The basic template information storage means 72 contains first-time basic template information. Here, the first-time basic template information gives a proto-template for the template generating means 73 to combine the first-time template.

The template generating means 73 is for retrieving the first-time basic template information from the basic template information storage means 72 and generating the first-time template by combining the retrieved first-time basic template information with the data received by the television broadcast receiving means 71.

The template transmitting means 74 is for transmitting the first-time template generated by the template generating means 73 to the service using terminal 10.

The inclusion of the first-time template generating and transmitting device 70 thus configured, the first-time template can be generated from the broadcast data on a terrestrial digital broadcast, BS digital broadcast, or other broadcasting network, so as to allow the user to utilize various services based on the first-time template.

Also, the service provided to the service using terminal 10 may be related with television broadcast content, for example. For example, the service may enable the service user to cast a vote on television broadcast content.

FIG. 37 is an illustration depicting an exemplary regular use template for the provision of such a service. If there is no need to identify the individual service user, as in embodiment 6, the first-time template transmitting device 20 or the first-time template generating and transmitting device 70 may transmit a regular use template which contains no service user identifying information.

Figure 38:
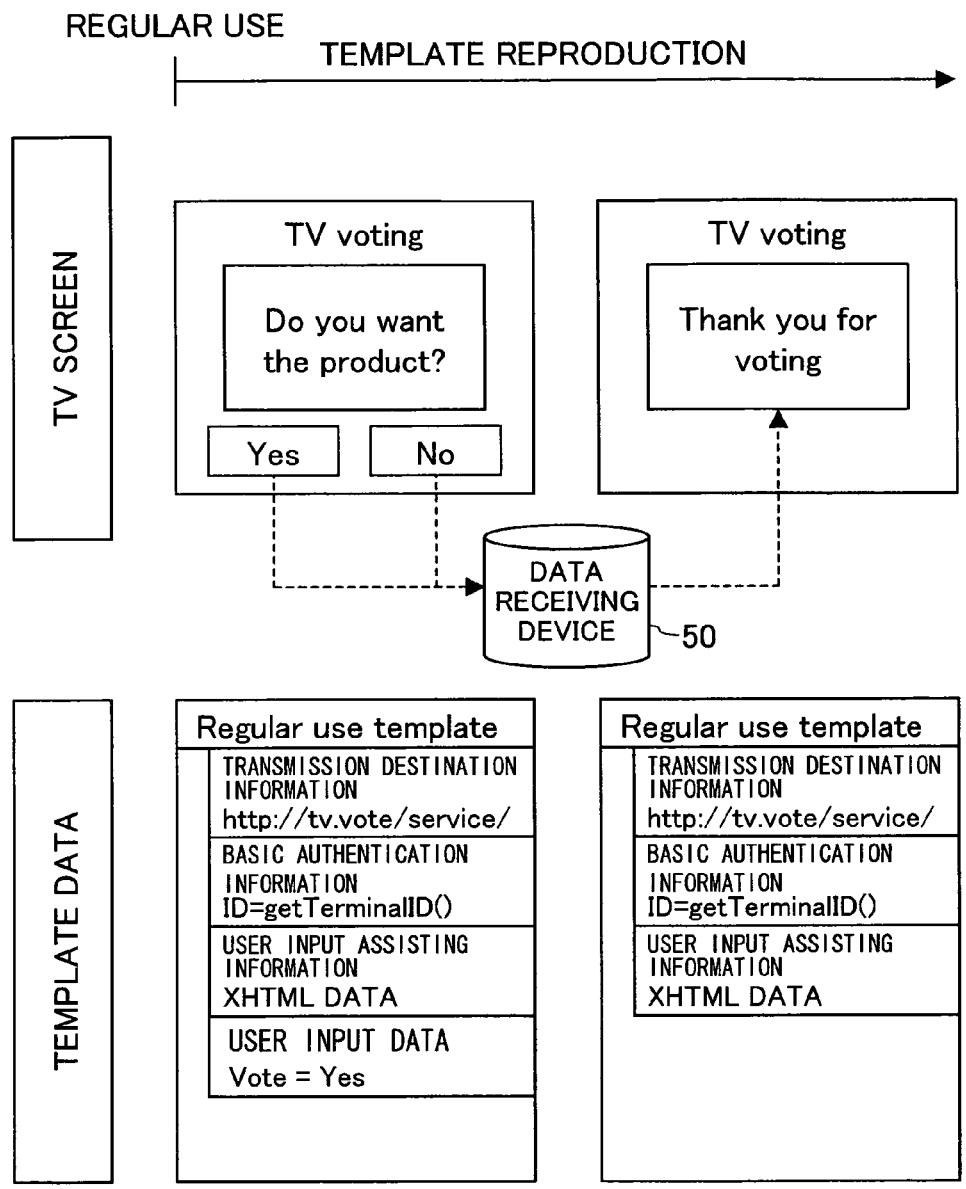
FIG. 38 is an illustration of a screen display by display means of a service using terminal and the structure of template data in the service providing system shown in FIG. 35.

Reproducing the FIG. 37 template displays a "I Want It" and "I don't Want it" buttons on the screen of the service using terminal 10, along with the television broadcast content, as shown in FIG. 38.

As the service user selects either of the buttons, information in accordance with the selection is added to the user input data in the template as shown in FIG. 38 and then to the transmission data which will be transmitted to the service providing device 100 (data receiving device 50). The latter is transmitted to the service providing device 100 (data receiving device 50).

As the service providing device 100 receives the transmission data, service content in accordance with an authentication result and the transmission data is returned to the service using terminal 10. In the FIG. 38 example, a signal indicating that the service providing device 100 has successfully authenticated the transmission data is returned to the service using terminal 10 so that a message appears on the display means of the service using terminal 10: "Thank you for voting."

As described in the foregoing, in the service providing system of the present embodiment, television broadcast is used to transmit a template (first-time template or regular use template) to the service using terminal 10.

Therefore, the template can be efficiently delivered to many service using terminals 10.

In addition, in the service providing system of the present embodiment, services can be provided which are related to ongoing television broadcast content. For example, television voting (TV voting) becomes possible where service users cast votes on television broadcast content.

To solve the problems, a service providing system of the present invention is characterized as follows. The service providing system includes: a service using device; and a service providing device for providing a service to the service using device. The service providing device is communicably connected to the service using device. The service providing system includes a template transmitting device for transmitting a template to the service using device. The template contains: transmission destination information indicating a transmission destination to which the service using device transmits data for use in authentication; and user input assisting information based on which display means either provided in the service using device or communicably connected to the service using device displays an interface for use by a service user entering data to the service using device. The service using device includes: template storage means for storing the template received from the template transmitting device; user input means for receiving input operation by the service user; and data transmitting means for transmitting transmission data to the transmission destination indicated in the transmission destination information, the transmission data containing user input information entered by the service user through the user input means.

According to the configuration, the service user can implement an authentication process by entering necessary information for the authentication through the user input means and the interface displayed on the display means on the basis of the user input assisting information and transmitting the transmission data containing the entered user input information to the transmission destination indicated in the transmission destination information.

In this case, the service providing system needs to perform only two communication process steps: (1) The template transmitting means transmits the template to the service using device. (2) The service using device transmits the transmission data containing the user input information to the transmission destination indicated in the template. Aforementioned Tokukai 2004-118275 technology requires at least two rounds of (at least four) communication process steps for an authentication. On the other hand, the service providing system can perform the authentication in the two communication process steps. Thus, the authentication takes less time and reduced communications cost. The service user is charged a smaller amount of fees.

The configuration may be adapted as follows. The service providing system further includes: data receiving means for receiving the data for use in authentication from the service using device; and basic template information storage means for storing basic template information. The basic template information includes second transmission destination information indicating a transmission destination to which the service using device transmits data on requested service content, and user input assisting information based on which display means either provided in the service using device or communicably connected to the service using device displays an interface for use by the service user entering data to the service using device. The service providing system also includes: template generating means for generating a second template by combining the basic template information stored in the basic template information storage means and the data received by the data receiving means; and a second template transmitting device for transmitting the second template generated by the template generating means to the service using device. The transmission destination, to which the service using device transmits the data for use in authentication, in the transmission destination information is set to provide the second template transmitting device.

According to the configuration, the data for use in authentication is received from the service using device. A new template is generated by combining the received data and the basic template information. The generated template is transmitted to the service using device. Accordingly, the template stored in the template storage means in the service using device additionally contains the user input information entered by the service user through the user input means.

The configuration may be adapted as follows. The second template transmitting device includes: basic authentication information generating means for generating basic authentication information on the basis of the data received by the data receiving means; and authentication verification means for transferring the basic authentication information generated by the basic authentication information generating means to authentication means provided in the service providing device for authentication, so as to receive a result of the authentication. The template generating means, if the authentication is successful, generates the template by combining the basic authentication information used in the authentication and the basic template information stored in the basic template information storage means.

According to the configuration, basic authentication information is generated on the basis of the data received by the data receiving means. The generated basic authentication information is transferred to the authentication means in the service providing device for authentication of the basic authentication information. If the authentication is successful, a new template is generated by combining the basic authentication information used in the authentication and the basic template information stored in the basic template information storage means. The generated template is transmitted to the service using device.

Thus, the template storage means in the service using device contains a template containing the basic authentication information that has been successfully authenticated. Therefore, when a service corresponding to the template is to be utilized next time or on subsequent occasions, the service user does not have to enter data for use in authentication; the service user only needs to enter data related to the service to be requested.

In addition, in this case, to receive the service content from the service providing device, the service using device only needs to transmit to the transmission destination indicated in the second transmit information the authenticated basic authentication information and the data entered by the service user in relation to the requested service. This further reduces the number of communications process steps needed to perform authentication.

The configuration may be adapted as follows. The service providing system further includes: encryption means for encrypting part or all of the basic authentication information to generate encrypted authentication information. The encryption means, if the authentication is successful, encrypts the basic authentication information used in the authentication to generate the encrypted authentication information. The template generating means generates the new template by combining the encrypted authentication information generated by the encryption means and the basic template information stored in the basic template information storage means.

According to the configuration, the successfully authenticated basic authentication information is partly or entirely encrypted to generate encrypted authentication information. The encrypted authentication information and the basic template information are combined to generate the new template which is then transmitted to the service using device.

Thus, the template storage means in the service using device contains the template containing the encrypted authentication information which is the successfully authenticated basic authentication information that is encrypted. This improves security of the basic authentication information. In addition, according to the configuration, when a service corresponding to the template is to be utilized next time or on subsequent occasions, the service user does not have to enter data for use in authentication; the service user only needs to enter data related to the service to be requested. In addition, in this case, the service content is received from the service providing device by the service using device transmitting to the transmission destination indicated in the second transmit information the encrypted authentication information which is the authenticated basic authentication information that is encrypted and the data entered by the service user in relation to the requested service and the decryption means provided at the transmission destination indicated in the second transmit information decrypting the encrypted authentication information. This further reduces the number of communications process steps needed to perform authentication.

The configuration may be adapted as follows. The template enables the service using device to simultaneously utilize services provided by multiple service providing devices and contains the second transmission destination information for the services.

According to the configuration, the service user can simultaneously utilize multiple services on one service using device. This adds to convenience for the service user.

The configuration may be adapted as follows. The template contains information on a data conversion method for converting the user input information entered by the service user through the user input means to the transmission data transmitted from the data transmitting means. The service using device includes data conversion means for converting the transmission data on the basis of the information on the data conversion method contained in the template.

According to the configuration, the data conversion means converts the transmission data transmitted from the data transmitting means on the basis of the information on the data conversion method contained in the template. In this case, the service provider can obtain necessary information from the service user by adding the information on the data conversion method to the template in accordance with the provided service. Thus, the service using device can readily obtain necessary data in accordance with the service.

The configuration may be adapted as follows. The user input assisting information contains information based on which the display means either provided in the service using device or communicably connected to the service using device displays an interface for use by the service user entering data to the service using device, so as to obtain a template for another service. The service using device transmits the user input information as part of the transmission data to the transmission destination indicated in the transmission destination information. The user input information is entered by the service user through the user input means and used to obtain the template for another service. In the second template transmitting device, as the data receiving means receives the transmission data, the template generating means generates the new template by combining the basic template information stored in the basic template information storage means for the another service and the data received by the data receiving means.

According to the configuration, the service user can obtain a template for a new service using the template already stored in the service using device.

The configuration may be adapted as follows. The template contains template information unique to the template. The service using device includes template authentication means for authenticating the template for reproducibility thereof on the basis of the template information. Here, the unique information to the template may be, for example, the title and lifetime of the template and information on an terminal ID where the template is reproducible.

According to the configuration, the service using device can authenticate the template. Therefore, for example, no service provision requesting data is transmitted if the service cannot be utilized on the service using device.

The configuration may be adapted as follows. The template transmitted from the template transmitting device to the service using device contains terminal ID obtaining information based on which the data conversion means obtains a terminal ID of the service using device stored in storage means provided in the service using device.

According to the configuration, the template transmitted from the template transmitting device to the service using device contains terminal ID obtaining information based on which the data conversion means obtains the terminal ID of the service using device. In this case, the basic authentication information contains no information identifying the service user. The service user therefore does not need to enter data for authentication. This adds to convenience for the service user. In addition, there is no need to transmit the user information entered by the service user from the service using device to the service providing device for authentication. The number of communication process steps required to use the services is reduced.

The configuration may be adapted as follows. The template transmitting device transmits the template to the service using device over a broadcasting network. Here, the broadcasting network may be, for example, a terrestrial digital broadcast, BS digital broadcast, or other television broadcasting network.

According to the configuration, templates can be efficiently delivered to many service using devices.

To solve the problems, a service using device of the present invention is characterized as follows. The service using device is for receiving service provision from a service providing device communicably connected thereto. The service using device includes: user input means for receiving input operation by a service user; template obtaining means for obtaining a template containing: transmission destination information indicating a transmission destination to which data for authentication is transmitted and user input assisting information based on which display means either provided in the service using device or communicably connected to the service using device displays an interface for use by the service user entering data; and data transmitting means for transmitting transmission data to the transmission destination indicated by the transmission destination information, the transmission data containing user input information entered by the service user through the user input means and basic authentication information contained in the template.

According to the configuration, the service user can implement an authentication process by entering necessary information for the authentication through the user input means and the interface displayed on the display means on the basis of the user input assisting information and transmitting the transmission data containing the entered user input information to the transmission destination indicated in the transmission destination information.

In this case, only two communication process steps need be performed between the service using device and another device: (1) The service using device obtains the template. (2) The service using device transmits the transmission data containing the user input information to the transmission destination indicated in the template. Aforementioned Tokukai 2004-118275 technology requires at least two rounds of (at least four) communication process steps for an authentication. On the other hand, the configuration can perform the authentication in the two communication process steps. Thus, the authentication takes less time and reduced communications cost. The service user is charged a smaller amount of fees.

The configuration may be adapted as follows. The service using device further includes template storage means for storing the template obtained by the template obtaining means.

In this case, by storing the obtained template in the template storage means, the authentication can be performed or the service can be utilized using the stored template. Therefore, the template-obtaining process (communications) does not need to be performed every time the service is utilized.

The configuration may be adapted as follows. The template contains information on a data conversion method for converting the user input information entered by the service user through the user input means to the transmission data transmitted from the data transmitting means. The service using device further includes data conversion means for converting the transmission data on the basis of the information on the data conversion method contained in the template.

According to the configuration, the data conversion means converts the transmission data transmitted from the data transmitting means on the basis of the information on the data conversion method contained in the template. Thus, necessary information in utilizing the service can be suitably and readily transmitted in accordance with the service to be utilized.

The configuration may be adapted as follows. The template contains template information unique to the template. The service using device further includes template authentication means for authenticating the template for reproducibility thereof on the basis of the template information.

According to the configuration, the service using device can authenticate the template. Therefore, for example, no service provision requesting data is transmitted if the service cannot be utilized on the service using device.

To solve the problems, a template transmitting device of the present invention is characterized as follows. The template transmitting device includes: template storage means for storing a template containing: transmission destination information indicating a transmission destination to which a service using device for receiving service provision from a communicably connected service providing device transmits data for authentication; and user input assisting information based on which display means either provided in the service using device or communicably connected to the service using device displays an interface for use by a service user entering data to the service using device; and template transmitting means for transmitting the template stored in the template storage means to the service using device.

According to the configuration, the service user can implement an authentication process by entering necessary information for the authentication through the interface displayed on the display means on the basis of the user input assisting information and the user input means provided to the service using device and transmitting the transmission data containing the entered user input information from the service using device to the transmission destination indicated in the transmission destination information.

In this case, the service providing system containing the template transmitting device and the service using device needs to perform only two communication process steps: (1) The template transmitting means transmits the template to the service using device. (2) The service using device transmits the transmission data containing the user input information to the transmission destination indicated in the template. Aforementioned Tokukai 2004-118275 technology requires at least two rounds of (at least four) communication process steps for an authentication. On the other hand, the service providing system can perform the authentication in the two communication process steps. Thus, the authentication takes less time and reduced communications cost. The service user is charged a smaller amount of fees.

In the configuration, the template may be transmitted to the service using device over a broadcasting network. Here, the broadcasting network may be, for example, a terrestrial digital broadcast, BS digital broadcast, or other television broadcasting network.

According to the configuration, templates can be efficiently delivered to many service using devices.

To solve the problems, another template transmitting device of the present invention is characterized as follows. The template transmitting device includes: data receiving means for receiving data from a service using device for receiving service provision from a communicably connected service providing device, the data being used in authentication of the service using device or a service user utilizing a service on the service using device; basic template information storage means for storing basic template information including: second transmission destination information indicating a transmission destination to which the service using device transmits data requesting service provision; and user input assisting information based on which display means either provided in the service using device or communicably connected to the service using device displays an interface for use by the service user entering data to the service using device; template generating means for generating a template by combining the basic template information stored in the basic template information storage means and the data received by the data receiving means; and template transmitting means for transmitting the template generated by the template generating means to the service using device.

According to the configuration, the data for use in authentication is received from the service using device. A new template is generated by combining the received data and the basic template information. The generated template is transmitted to the service using device. Thus, the template transmitted to the service using device additionally contains the user input information entered by the service user through the user input means.

The configuration may be adapted as follows. The template transmitting device further includes: basic authentication information generating means for generating basic authentication information on the basis of the data received by the data receiving means; and authentication verification means for transferring the basic authentication information generated by the basic authentication information generating means to authentication means provided in the service providing device for authentication, so as to receive a result of the authentication. The template generating means, if the authentication is successful, generates the template by combining the basic authentication information used in the authentication and the basic template information stored in the basic template information storage means.

According to the configuration, basic authentication information is generated on the basis of the data received by the data receiving means. The generated basic authentication information is transferred to the authentication means in the service providing device for authentication of the basic authentication information. If the authentication is successful, a new template is generated by combining the basic authentication information used in the authentication and the basic template information stored in the basic template information storage means. The generated template is transmitted to the service using device.

Thus, a template containing the successful authenticated basic authentication information is transmitted to the service using device. Therefore, when a service corresponding to the template is to be utilized on the service using device next time or on subsequent occasions, the service user does not have to enter data for use in authentication; the service user only needs to enter data related to the service to be requested.

In addition, in this case, to receive the service content from the service providing device, the service using device only needs to transmit to the transmission destination indicated in the second transmit information the authenticated basic authentication information and the data entered by the service user in relation to the requested service. This further reduces the number of communications process steps needed to perform authentication.

The configuration may be adapted as follows. The template transmitting device further includes encryption means for encrypting part or all of the basic authentication information to generate encrypted authentication information. The encryption means, if the authentication is successful, encrypts the basic authentication information used in the authentication to generate the encrypted authentication information. The template generating means generates the template by combining the encrypted authentication information generated by the encryption means and the basic template information stored in the basic template information storage means.

According to the configuration, the successfully authenticated basic authentication information is partly or entirely encrypted to generate encrypted authentication information. The encrypted authentication information and the basic template information are combined to generate a new template which is then transmitted to the service using device.

Thus, the template storage means in service using device receives the template containing the encrypted authentication information which is the successfully authenticated basic authentication information that is encrypted. This improves security of the basic authentication information. In addition, according to the configuration, when a service corresponding to the template is to be utilized on the service using device next time or on subsequent occasions, the service user does not have to enter data for authentication; the service user only needs to enter data related to the service to be requested. In addition, in this case, the service content is received from the service providing device by the service using device transmitting to the transmission destination indicated in the second transmit information the encrypted authentication information which is the authenticated basic authentication information that is encrypted and data entered by the service user in relation to the requested service and the decryption means provided at the transmission destination indicated in the second transmit information decrypting the encrypted authentication information. This further reduces the number of communications process steps needed to perform authentication.

The invention being thus described, it will be obvious that the same way may be varied in many ways. Such variations are not to be regarded as a departure from the spirit and scope of the invention, and all such modifications as would be obvious to one skilled in the art are intended to be included within the scope of the claims.

The present invention is applicable to service providing systems including a information terminal device and a service providing device providing services to the information terminal device, and also to information terminal devices, service providing devices, service relay devices, and authentication methods for use in the service providing systems.

What is claimed is:
1. A service providing system, comprising:
a service using device;

a service providing device for providing a service to the service using device, the service providing device being communicably connected to the service using device; and a template transmitting device for transmitting a template to the service using device over a communications network or a broadcasting network, the template containing: transmission destination information indicating a transmission destination to which the service using device transmits data for use in authentication; and user input assisting information based on which display means either provided in the service using device or communicably connected to the service using device displays an interface for use by a service user entering data to the service using device, wherein the service using device includes:

template storage means for storing the template received from the template transmitting device;

user input means for receiving input operation to select a template from the template storage means and to start reproduction of the selected template by the service user; and data transmitting means for transmitting transmission data to the transmission destination indicated in the transmission destination information, the transmission data containing user input information entered by the service user through the user input means.

2. The service providing system of claim 1, further comprising:

data receiving means for receiving the data for use in authentication from the service using device;

basic template information storage means for storing basic template information including: second transmission destination information indicating a transmission destination to which the service using device transmits data on requested service content; and user input assisting information based on which display means either provided in the service using device or communicably connected to the service using device displays an interface for use by the service user entering data to the service using device;

template generating means for generating a new template by combining the basic template information stored in the basic template information storage means and the data received by the data receiving means; and a second template transmitting device for transmitting the template generated by the template generating means to the service using device, wherein the transmission destination, to which the service using device transmits the data for use in authentication, in the transmission destination information is set to provide the second template transmitting device.

3. The service providing system of claim 2, wherein:

the second template transmitting device includes: basic authentication information generating means for generating basic authentication information on the basis of the data received by the data receiving means; and authentication verification means for transferring the basic authentication information generated by the basic authentication information generating means to authentication means provided in the service providing device for authentication, so as to receive a result of the authentication, the template generating means, if the authentication is successful, generates the new template by combining the basic authentication information used in the authentication and the basic template information stored in the basic template information storage means.

4. The service providing system of claim 3, further comprising encryption means for encrypting part or all of the basic authentication information to generate encrypted authentication information, wherein:

the encryption means, if the authentication is successful, encrypts the basic authentication information used in the authentication to generate the encrypted authentication information; and the template generating means generates the new template by combining the encrypted authentication information generated by the encryption means and the basic template information stored in the basic template information storage means.

5. The service providing system of claim 2, wherein the template enables the service using device to simultaneously utilize services provided by multiple service providing devices and contains the second transmission destination information for the services.

6. The service providing system of claim 1, wherein:

the template contains information on a data conversion method for converting the user input information entered by the service user through the user input means to the transmission data transmitted from the data transmitting means; and the service using device includes data conversion means for converting the transmission data on the basis of the information on the data conversion method contained in the template.

7. The service providing system of claim 2, wherein:

the user input assisting information contains information based on which the display means either provided in the service using device or communicably connected to the service using device displays an interface for use by the service user entering data to the service using device, so as to obtain a template for another service;

the service using device transmits the user input information as part of the transmission data to the transmission destination indicated in the transmission destination information, the user input information being entered by the service user through the user input means and used to obtain the template for another service; and in the second template transmitting device, as the data receiving means receives the transmission data, the template generating means generates the new template by combining the basic template information stored in the basic template information storage means for the other service and the data received by the data receiving means.

8. The service providing system of claim 1, wherein:

the template contains template information unique to the template; and the service using device includes template authentication means for authenticating the template for reproducibility thereof on the basis of the template information.

9. The service providing system of claim 6, wherein the template transmitted from the template transmitting device to the service using device contains terminal ID obtaining information based on which the data conversion means obtains a terminal ID of the service using device stored in storage means provided in the service using device.

10. A service using device for receiving service provision from a service providing device communicably connected thereto, said service using device comprising:

template obtaining means for obtaining a template transmitted over a communications network or a broadcasting network, the template containing: transmission destination information indicating a transmission destination to which data for authentication is transmitted, basic authentication information and user input assisting information based on which display means either provided in the service using device or communicably connected to the service using device displays an interface for use by the service user entering data;

template storage means for storing the template obtained by the template obtaining means;

user input means for receiving input operation to select a template from the template storage means and to start reproduction of the selected template by a service user; and data transmitting means for transmitting transmission data to the transmission destination indicated in the transmission destination information, the transmission data containing user input information entered by the service user through the user input means and the basic authentication information contained in the template.

11. The service using device of claim 10, wherein:

the template contains information on a data conversion method for converting the user input information entered by the service user through the user input means to the transmission data transmitted from the data transmitting means; and the service using device further includes data conversion means for converting the transmission data on the basis of the information on the data conversion method contained in the template.

12. The service using device of claim 10, wherein the template contains template information unique to the template; and the service using device further includes template authentication means for authenticating the template for reproducibility thereof on the basis of the template information.

13. A template transmitting device: comprising:

data receiving means for receiving data from a service using device for receiving service provision from a communicably connected service providing device, the data being used in authentication of the service using device or a service user utilizing a service on the service using device;

basic template information storage means for storing basic template information including: second transmission destination information indicating a transmission destination to which the service using device transmits data requesting service provision; and user input assisting information based on which display means either provided in the service using device or communicably connected to the service using device displays an interface for use by the service user entering data to the service using device;

template generating means for generating a template by combining the basic template information stored in the basic template information storage means and the data received by the data receiving means; and template transmitting means for transmitting the template generated by the template generating means to the service using device.

14. The template transmitting device of claim 13, further comprising:

basic authentication information generating means for generating basic authentication information on the basis of the data received by the data receiving means; and authentication verification means for transferring the basic authentication information generated by the basic authentication information generating means to authentication means provided in the service providing device for authentication, so as to receive a result of the authentication, wherein the template generating means, if the authentication is successful, generates the template by combining the basic authentication information used in the authentication and the basic template information stored in the basic template information storage means.

15. The template transmitting device of claim 14, further comprising encryption means for encrypting part or all of the basic authentication information to generate encrypted authentication information, wherein:

the encryption means, if the authentication is successful, encrypts the basic authentication information used in the authentication to generate the encrypted authentication information; and the template generating means generates the template by combining the encrypted authentication information generated by the encryption means and the basic template information stored in the basic template information storage means.

* * * * *